United States Patent [19]
Zander

[11] Patent Number: 5,923,906
[45] Date of Patent: Jul. 13, 1999

[54] APPARATUS AND METHODS FOR LOADING OF FILM INTO AND VENDING OF PHOTOGRAPHIC CAMERAS

[75] Inventor: Dennis R. Zander, Penfield, N.Y.

[73] Assignee: Eastman Kodak Company, Rochester, N.Y.

[21] Appl. No.: 08/966,467

[22] Filed: Nov. 7, 1997

[51] Int. Cl.⁶ .................................................... G03B 17/24
[52] U.S. Cl. ............................... 396/6; 396/388; 396/429
[58] Field of Search ................................. 396/6, 388, 429

[56] References Cited

U.S. PATENT DOCUMENTS

| | | |
|---|---|---|
| 3,373,644 | 3/1968 | Bjelland . |
| 3,499,376 | 3/1970 | Swift . |
| 3,691,921 | 9/1972 | Isbell . |
| 4,059,211 | 11/1977 | Brizzolara . |
| 4,338,644 | 7/1982 | Staar . |
| 4,370,041 | 1/1983 | Katsuyama . |
| 4,443,077 | 4/1984 | Tanikawa . |
| 4,500,183 | 2/1985 | Tanikawa . |
| 4,806,958 | 2/1989 | Momot et al. . |
| 4,813,321 | 3/1989 | Landsman . |
| 4,894,674 | 1/1990 | Radov . |
| 4,928,897 | 5/1990 | Satou et al. . |
| 5,109,242 | 4/1992 | Massarsky . |
| 5,148,198 | 9/1992 | Shiba . |
| 5,202,713 | 4/1993 | Nakai et al. . |
| 5,221,404 | 6/1993 | Oya et al. . |
| 5,362,008 | 11/1994 | Nagel et al. . |
| 5,416,548 | 5/1995 | Kataoka . |
| 5,418,585 | 5/1995 | Petruchik et al. . |
| 5,502,529 | 3/1996 | Zander . |
| 5,517,265 | 5/1996 | Zander et al. . |
| 5,530,500 | 6/1996 | Matsusita . |
| 5,555,054 | 9/1996 | Zander . |
| 5,572,271 | 11/1996 | Pelican . |
| 5,628,032 | 5/1997 | Zander . |
| 5,630,178 | 5/1997 | Zander et al. . |
| 5,649,258 | 7/1997 | Bergstresser et al. . |
| 5,655,155 | 8/1997 | Bergstresser et al. . |
| 5,675,835 | 10/1997 | Zander . |
| 5,721,960 | 2/1998 | Zander et al. . |

FOREIGN PATENT DOCUMENTS

| | | |
|---|---|---|
| 4-306628 | 4/1991 | Japan . |
| 6-332062 | 12/1994 | Japan . |
| 8-069091 | 3/1996 | Japan . |

Primary Examiner—David M. Gray
Attorney, Agent, or Firm—Gordon M. Stewart

[57] ABSTRACT

Apparatus (10, 800) is disclosed for loading film into and vending photographic cameras (106), the cameras including an external housing (320) having at least one movable closure (322, 324) which, in an open position of the closure, enables a discrete filmstrip (332) to be loaded from an exterior of the camera into the camera, the apparatus including a frame (40–50); a station (14, 138, 142; 804) to support a camera to be loaded, or unloaded, or vended; a first source (60; 826) supported by said frame for a plurality of cameras to be loaded, or vended, or both; a guide (66; 806) for moving a camera from the first source to the station; a second source (150, 168) supported by the frame for at least one type of unexposed photographic film; a film loading member (522) supported by the frame and extended between the second source and the station for guiding film from the second source to a camera; and a mechanism (176, 246, 248) supported by the frame for driving film from the second source, via the film loading member, and to a camera.

80 Claims, 29 Drawing Sheets

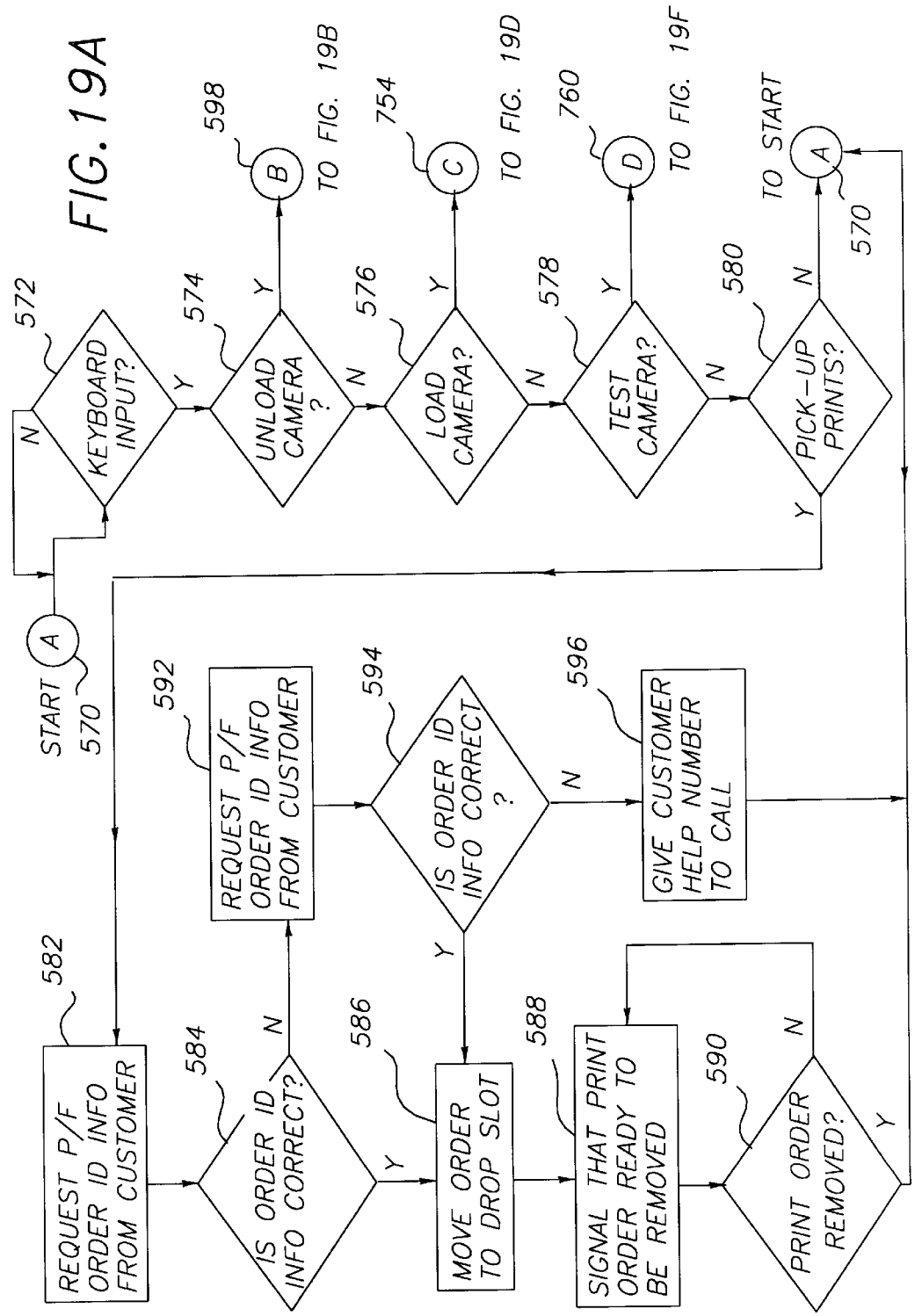

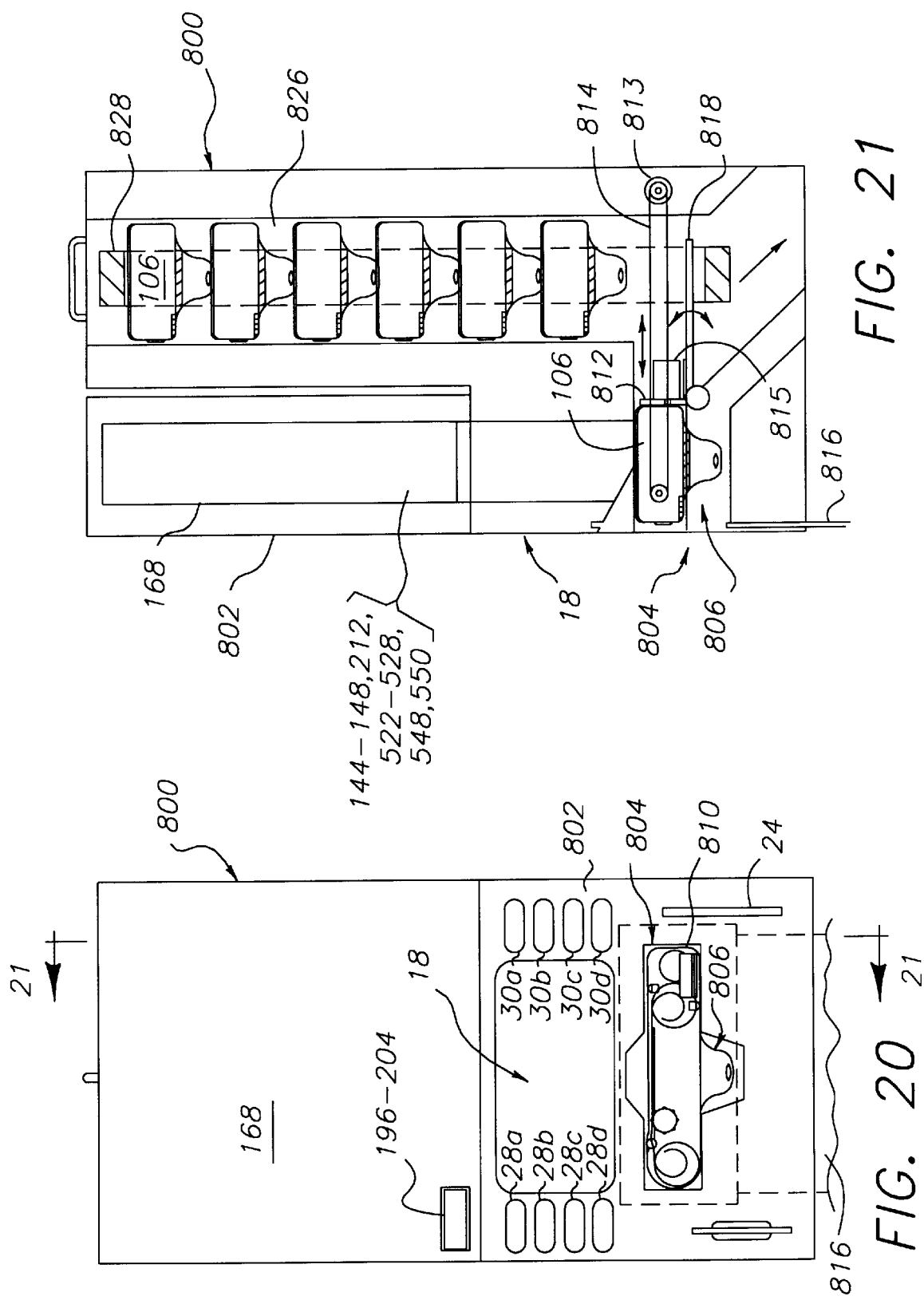

APPARATUS AND METHODS FOR LOADING OF FILM INTO AND VENDING OF PHOTOGRAPHIC CAMERAS

CROSS REFERENCE TO RELATED APPLICATIONS

This application is related to copending, commonly assigned application Ser. Nos. U.S. 08/569,464, filed Dec. 8, 1995, titled APPARATUS FOR LOADING AND UNLOADING PHOTOGRAPHIC FILM INTO OR FROM A CAMERA by Eric P. Hochreiter et al; U.S. Pat. No. 08/569,543, filed Dec. 8,1995, titled APPARATUS AND METHOD FOR LOADING AND PARTIALLY UNLOADING A CAMERA WITH A DISCRETE FILM STRIP, by Dennis R. Zander et al; and U.S. Pat. No. 08/569,634, filed Dec. 8, 1995, titled APPARATUS AND METHOD FOR LOADING AND UNLOADING A CAMERA WITH A DISCRETE FILM STRIP, by Dennis R. Zander et al.

FIELD OF THE INVENTION

The invention concerns apparatus and methods for loading a discrete filmstrip into or removing such a filmstrip from a photographic camera, cassettes for supplying unexposed film to such apparatus, and features of cameras adapted to be loaded by such apparatus. More particularly, the invention concerns such an apparatus which can load film into a camera and vend the camera to a customer. After all exposures have been made by the customer, the apparatus can receive the camera from the customer, unload it and, if desired by the customer, return the camera with or without fresh film. The apparatus also can vend empty cameras.

BACKGROUND OF THE INVENTION

Commonly assigned U.S. Pat. No. 5,555,054 (the '054 patent) discloses a camera which can be loaded with a discrete filmstrip having an essentially arbitrary number of frames selected by a customer. The '054 patent also discloses methods of using such a camera. The disclosure of the '054 patent is hereby incorporated by reference into the present application. The filmstrip can be loaded into the camera through a slot in the body of the camera and scrolled within an unexposed film chamber. During use of the camera, a film advancing sprocket of the camera is used to move the film frame by frame to an exposed film chamber. After exposure, the film can be driven from the camera through the same slot used for loading or through a separate slot used only for unloading. Light-tight closures are provided for the load and unload slots.

Commonly assigned U.S. Pat. Nos. 5,628,032; 5,630,178; 5,649,258; 5,655,155; and 5,675,835 disclose improved features of such cameras, plus a compact apparatus and methods useful for loading such cameras. The disclosures of these patents are hereby incorporated by reference into the present application. When the customer wishes to rent such a camera, the retailer places an empty camera in the apparatus, enters information about the customer and the number of frames selected by the customer, and then operates the apparatus to load the camera as instructed. After exposure of the filmstrip, the customer returns to the camera to the retailer, who places the camera in the apparatus where the filmstrip is removed and placed in a transfer cartridge for delivery to a film processor and printer.

While the camera and the apparatus described in the commonly assigned patents and in the related applications have many advantageous features, it would be desirable to provide an apparatus for vending such cameras at which the customer could enter directly the appropriate information about a selected number of frames of film of a desired type, a desired type of camera, and, if appropriate, instructions for photofinishing. The customer then would pay a fee determined by the apparatus and receive the camera. Preferably, the apparatus would be capable of loading cameras with various types of films and of communicating with cassettes of such films to confirm that the film is acceptable for loading. The customer could rent or purchase a camera. Later the customer could return to the apparatus to have the rented or purchased camera unloaded, reloaded, or just tested. Preferably, the camera would include features for self-testing and for storing information and communicating with the apparatus regarding camera characteristics and customer selections. It would also be desirable if such an apparatus could be connected directly to a film processor and printer to facilitate return of prints to the customer.

SUMMARY OF THE INVENTION

An apparatus in accordance with the invention is particularly suited for loading film into and vending photographic cameras of a type including an external housing having at least one movable closure which, in an open position of the closure, enables a discrete filmstrip to be loaded from an exterior of the camera into the camera. As such, in its simplest embodiment, the apparatus includes a frame; a station to support a camera to be loaded, or vended, or both; a first source supported by the frame for a plurality of cameras to be loaded, or vended, or both; a guide for moving a camera from the first source to the station; a second source supported by the frame for at least one type of unexposed photographic film; a film loading member supported by the frame and extended between the second source and the station for guiding film from the second source to a camera; and a mechanism supported by the frame for driving film from the second source, via the film loading member, and to a camera.

When the at least one movable closure of the camera alternatively enables a discrete filmstrip to be unloaded from the camera to the exterior, the apparatus may further include a film unloading member supported by the frame and extended away from the station for guiding a filmstrip from a camera. The film unloading member may be connected to a means for processing a filmstrip removed from a camera and the means for processing may be connected to a means for printing photographs from the filmstrip. When the camera includes a memory feature for storing and communicating information about appropriate photographic film for the camera, the second source may provide a plurality of types of unexposed photographic film. The apparatus also may include means supported by the frame for communicating with a camera to receive from the memory feature a first signal corresponding to a type of film appropriate for the camera; and means responsive to the first signal for controlling the second source and the mechanism to deliver the appropriate film to the camera.

When the second source provides a plurality of types of unexposed photographic film, the apparatus may include a customer interface supported by the frame for inputting a first signal corresponding to a desired type of film for the camera; and means supported by the frame and responsive to the first signal for controlling the second source and the second mechanism to deliver the desired film to the camera. Whether or not different types of film are provided, the customer interface may be used to input a first signal corresponding to a desired number of exposures for a filmstrip to be loaded into a camera; and means may be included which respond to the first signal for controlling the second source and the mechanism to deliver to a camera a filmstrip having the desired number of exposures.

When the camera includes a memory feature for storing and communicating information about a film type and a number of frames loaded in the camera, the apparatus also may include means supported by the frame for communicating with a camera at the station to receive from the memory feature a first signal about a film type and second signal about a number of frames loaded in the camera; means for processing a filmstrip removed from a camera; means for printing photographs from a processed filmstrip received from the means for processing; and means supported by the frame for communicating the first and second signals to the means for processing, or the means for printing, or both. The apparatus also may include a customer interface supported by the frame for inputting to the memory feature of a camera at least one signal about a desired manner of photofinishing; means supported by the frame for communicating with the customer interface and a camera to transmit to or receive from the camera information about a desired manner of photofinishing; and means supported by the frame for communicating the information about a desired manner of photofinishing to the means for processing, or the means for printing, or both.

When the camera includes a memory feature for storing and communicating information about appropriate photographic film for the camera; and the second source provides a plurality of types of unexposed photographic film, the apparatus may include means supported by the frame for communicating with a camera to receive from the memory feature a first signal corresponding to a type of film appropriate for the camera; means responsive to the first signal for displaying to a customer a selection of appropriate film types available from the second source; and a customer interface for signaling to the second source and the mechanism to deliver one of the selection of film types to the camera.

The second source may include a plurality of cassettes, each cassette comprising a hollow housing having an exit slit, a roll of unexposed photographic film mounted for rotation within the housing, and means for engaging a leading end of the film to drive the film through the exit slit; a support for the plurality of cassettes, the support being movably supported by the frame; and means for moving the support to present each cassette to drive the film to the film loading member. The support for the cassettes may include a drum rotatably supported by the frame; a plurality of cassette platforms extended radially from the drum, there being one platform for each of the cassettes; and the mechanism comprises a plurality of drive motors, one mounted on each of the platforms, for engaging and operating the means for driving of each cassette to drive film via the loading member to a camera. When each of the cassettes includes a cutter for the film; the apparatus may include a plurality of cutter actuators, one mounted on each of the platforms, for engaging and operating the cutters.

Each of the cassettes may include means for sending first signals corresponding to a type of film within the cassette, or a length of film remaining within said cassette, or both. In that case, the apparatus may include means supported by the frame for receiving the first signals; and a customer interface supported by the frame for inputting second signals corresponding to a desired type of film for a camera or a desired number of exposures for a filmstrip to be loaded into a camera, or both; and a controller responsive to the first and second signals to control the second source to deliver to a camera a desired type of film, or a desired number of exposures, or both.

When the camera includes a memory feature for storing and communicating information about at least one type of film appropriate for the camera; and each of said cassettes includes means for sending first signals corresponding to a type of film within the cassette, or a length of film remaining within the cassette, or both, then the apparatus may include means supported by the frame for communicating with a camera to receive a second signal corresponding to a type of film appropriate for the camera; means supported by the frame for receiving the first signals; a customer interface supported by the frame for inputting a third signal corresponding to a desired number of exposures for a filmstrip to be loaded into a camera, or both; and a controller responsive to the first, second and third signals to control the second source to deliver to a camera a desired type of film, or a desired number of exposures, or both.

When the camera includes a feature for self-testing one or more functions of the camera and for producing a signal indicative of results of the self-testing, the apparatus may include a sensor supported by said frame for receiving said signal and a controller for controlling loading of the camera in response to the signal. Similarly, when the camera includes a feature for tracking a number of permitted times for the camera to be reloaded and for producing a signal indicative of the number, the apparatus may include a sensor supported by the frame for receiving the signal and a controller for controlling loading of the camera in response to the signal.

Another embodiment of the apparatus also may include the features previously summarized, but has separate stations for receiving a camera from a customer, dispensing a camera from the source of cameras, and loading or unloading a camera. This embodiment may include a frame; a nest to support a camera to be loaded and vended; a first source supported by the frame for a plurality of cameras to be loaded and vended; a first station supported by the frame at which a camera can be received from the first source; a second station supported by the frame at which a camera can be loaded with a discrete filmstrip; a first mechanism supported by the frame and connected to the nest to position the nest at the first station to receive a camera from the first source and at the second station to receive a filmstrip; a second source supported by the frame for at least one type of unexposed photographic film; a film loading member supported by the frame and extended between the second source and the second station for guiding film from the second source to a camera; and a second mechanism supported by the frame for driving film from the second source, via the film loading member, and to a camera. The apparatus also may include a third station supported by the frame at which a camera can be vended to a customer.

The first source may include at least one rack sized to hold a plurality of cameras; and at least one third mechanism for moving cameras along the at least one rack to dispense a camera to the nest at the first station. The nest may include a base member and a plurality of upwardly extended guide members defining a space for receiving a camera. The first mechanism may include an arm pivotably mounted to the frame, the base member being supported by the arm; and a motor for moving the arm between said first and second stations. The base member may be rotatably supported by the arm and a motor may be provided for rotating the base member to orient the nest for the first and second stations. Means may be included for latching a camera to the base member. When the camera comprises a first electrical connector module for communicating with the apparatus, the apparatus may include a second electrical connector module for communicating with the camera; and the means for latching may include a rotatable latch shaft having contacts for connecting the first and second electrical connector modules when a camera is latched to the base member.

Another embodiment of the apparatus may include a frame; a source supported by the frame for at least one type of unexposed photographic film; a nest for receiving a camera to be loaded; a film loading member supported by the frame and extended between the source and the nest for guiding film from the source to a camera; a controller for the apparatus; a mechanism supported by the frame and responsive to the controller for driving film from the source, via the film loading member, into a camera; first means associated with the source for sending to the controller at least one first signal corresponding to at least one characteristic of the unexposed photographic film; second means responsive to the controller for sending to the memory feature of the camera at least one second signal corresponding to a characteristic of a discrete filmstrip to be loaded into the camera from the source; third means for receiving from the memory feature and passing to the controller at least one third signal corresponding to at least one condition of the camera; and a customer interface supported by the frame for inputting to the controller at least one fourth signal corresponding to a desired characteristic of a filmstrip to be loaded into a camera. The first means may send a signal corresponding to at least one of film type, number of frames remaining in the source, and a date the source was loaded with film. The said second means may send the second signal corresponding to at least one of film type to be loaded, number of exposures to be loaded, and need for flash feature on camera. The third means may pass the third signal corresponding to at least one of film type and number of exposures. The customer interface may input the fourth signal corresponding to at least one of film type, number of exposures, camera type, and photofinishing instructions.

A method in accordance with the invention is useful for loading or unloading a photographic camera of the type previously described and may include steps of providing a source of at least one type of unexposed photographic film; providing a camera to be loaded or unloaded; opening the closure of the camera; communicating from the source a first signal corresponding to a condition of the film in the source; communicating to the camera a second signal corresponding to a characteristic of a discrete filmstrip to be loaded into the camera; communicating from the camera a third signal corresponding to at least one of film type suitable for the camera, numbers of exposures that have been made, number of times said camera has been reloaded, or photofinishing instructions; communicating a fourth signal corresponding to a number of frames of film to be loaded into the camera; loading film into the camera or unloading film from the camera; and controlling the loading or the unloading in response to the first, second, third, and/or fourth signals. When the camera includes a feature for self-testing one or more functions of the camera and for producing a fifth signal indicative of results of the self-testing, the method further may include a step of controlling loading of the camera in response to the fifth signal.

When the camera includes a feature for tracking a number of permitted times for the camera to be reloaded and for producing a sixth signal indicative of the number, the method may further include a step of controlling loading of the camera in response to said sixth signal.

The invention provides various advantages. The apparatus and method are capable of loading and vending various types of cameras with various types of films, in accordance with instructions received from customers. Customers can enter photofinishing instructions when a camera is initially loaded or when it is returned for unloading. Defective or out of date cameras can be removed from circulation automatically and the customer can be provided with a fresh camera. Film which has been exposed to extreme conditions or is out of date is prevented from being dispensed to a camera. Cameras and cassettes of unexposed film can be easily loaded into the apparatus.

BRIEF DESCRIPTION OF THE DRAWINGS

FIGS. 19A to 19F show flow charts of the overall logic of the controller of the apparatus.

FIG. 20 shows an elevation view of a compact apparatus for loading and unloading discrete filmstrips.

FIG. 21 shows a schematic sectional view along line 21—21 of FIG. 20.

DETAILED DESCRIPTION OF THE INVENTION

Figure 1:
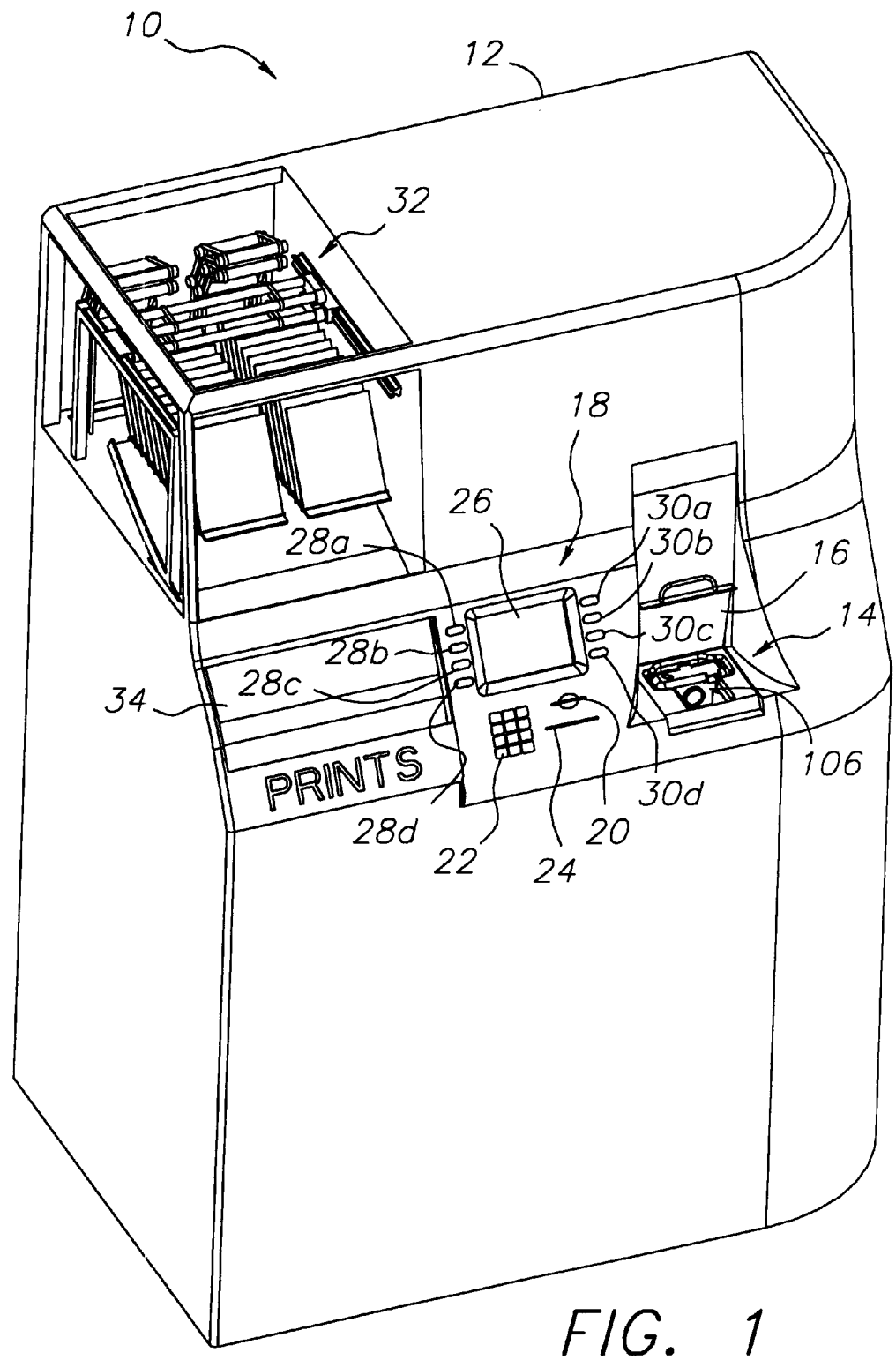
FIG. 1 shows a perspective view of an apparatus for loading discrete filmstrips into and removing them from cameras, with a camera sitting at an open station for receiving cameras from and vending cameras to a customer.

The following is a description of various embodiments of the invention, reference being made to the drawings, in which like elements of structure are identified by like reference numerals in the several Figures.

FIG. 1 shows a perspective view of an apparatus 10 in accordance with the invention, which is specially suited for loading discrete filmstrips into and unloading them from cameras. The apparatus also could be used to dispense empty cameras. An exterior light-tight enclosure 12 shields the internal components of the apparatus from ambient light to prevent fogging of unexposed photographic film. At a station 14 accessible from the front of the apparatus, a customer can deposit a previously rented or purchased camera which the customer desires to be loaded, unloaded, unloaded and reloaded, or only tested. A hinged, light-tight closure 16 is provided to close station 14 to prevent entry of light. Closure 16 would be provided with a position sensor, not illustrated, to signal a controller of apparatus 10 when the closure is open; and a suitable interlock would be provided to prevent unloading or loading film from or into a camera unless the position sensor signals that the closure is closed.

Next to station 14, a customer interface 18 is mounted to enable the customer to enter information for use by the apparatus and to receive information and prompts from the apparatus. In the familiar manner, interface 18 may include an access slot 20 for insertion and return of a credit or debit card, a key pad 22 for entry of information, a slot 24 for dispensing a receipt to the customer, and a display 26 such as a cathode ray tube or liquid crystal panel. On either side of display 26 are provided function keys 28a, b, c and d and 30a, b, c and d, to enable the customer to respond to prompts or queries presented on adjacent portions of the display. Although such a feature is not shown, those skilled in the art will appreciate that the apparatus also could include a known type of device for accepting the customer's payment in cash and providing change. A delivery mechanism 32 may be included for returning packages of completed photographic prints to the customer, who would remove the prints by opening an access door 34 in the enclosure. As will be explained later in this description, the apparatus can vend a loaded or an unloaded camera in response to the customer's original request, return a camera deposited by the customer with or without film, retain a camera if reload is not requested or the camera is defective, or receive a camera from the customer and then vend a different camera to the customer.

In use of the apparatus of FIG. 1, the customer would approach the apparatus and insert a credit or debit card to provide suitable identification and credit information. If the customer desires to rent or purchase a camera, display 26 would provide various prompts, for example, regarding the customer's intended use of the camera (which could influence the type of camera and film to be vended), different types or operating configurations of cameras available to be loaded with film and vended to the customer, types of film available for such cameras, numbers of frame exposures to be loaded as desired by the customer, and various types of photofinishing to be pre-selected by the customer. The customer could be asked whether the prints will be picked up at the apparatus or should be mailed to the customer; and in the latter case, the customer would be prompted to enter an address. The customer would respond to the prompts and the apparatus would prepare and vend to the customer the desired type of camera and a receipt for charges for the rental or purchase of the camera, the film and the cost of photofinishing. The customer's photofinishing instructions would be saved in a memory feature within the camera, but could be saved in a memory within the apparatus for use upon return of the camera for unloading. Or the customer's instructions could be downloaded to a communications network for delivery to another functionally similar or identical apparatus to which the customer later may choose to bring the camera for unloading and reloading.

After taking all of the pictures, the customer would return to the same or another apparatus, place the camera in station 14, lower closure 16, and insert a credit or debit card or use the keypad to enter a unique identification number. A station separate from station 14, not shown, could be provided for returning cameras; however, a station for both deposit and return is advantageous. It would also be possible to provide the apparatus with features for removing only exposed frames of a partially exposed filmstrip, as described in detail in commonly assigned U.S. Pat. No. 5,630,178 (the '178 patent). If the customer's photofinishing instructions have been saved in the camera, the apparatus would read those instructions and forward them to an associated photofinishing system. If no instructions have been saved in the camera and none are available from another apparatus at which the camera was loaded, the apparatus would prompt the customer to enter instructions for photofinishing. The camera would then be unloaded and the exposed film transported directly to the associated photofinishing system. Alternatively, the exposed film could be stored in a transfer cartridge of the type shown in the '178 patent, and later brought to a photofinishing system. After the exposed film has been removed from the camera, the display would provide suitable prompts to the customer, for example, regarding the customer's desire to have the same camera reloaded or returned empty, to have a different type of camera, or simply to wait for completed photographic prints.

Display 26, key pad 22 and function keys 28, 30 also can be used by a retail operator of apparatus 10 during replenishing of the cameras or film. The operator would enter appropriate codes to determine whether new cameras or film need to be added or defective cameras or film need to be removed. The need for replenishing could be determined by routine checks of the apparatus, or the apparatus could display appropriate prompts indicating that the operator should be contacted before a customer attempts to use the apparatus.

Within enclosure 12, as shown in FIGS. 2 to 4, 9 and 10, a robust frame 40 locates an equipment or mechanism support plate 42 on a plurality of vertical supports 44, 46, 48, 50. Beneath support plate 42 may be provided a storage cabinet 52 and a controller housing 54, for example. A turntable source 60 is provided for storing a plurality of photographic cameras to be vended, for receiving cameras after unloading, and for receiving defective cameras. Source 60 includes a lower, disk-like base member 62 which is rotatably supported by frame 40 on a conventional shaft and bearing arrangement, not shown. An upper disk-like member 64 is spaced vertically from base member 62 and a plurality of camera racks 66 are provided between members 62, 64. Six racks 66 are illustrated, though more or fewer could be provided. Each rack 66 comprises a pair of fixed, radially inner guide rods 68, 70 which extend between members 62, 64. The upper ends of rods 68, 70 are visible at member 64 and portions of the rods can be viewed extending between the members. A similar pair of fixed, radially outer guide rods 72, 74 also extends between members 62, 64. Between rods 68, 72 and 70, 74, respectively, of each rack 66 are mounted a pair of fixed conveyor side rails 76, 78 which extend between members 62, 64. The lower ends of side rails 76, 78 also extend through an opening 80 provided through member 62, as best seen in FIGS. 5 to 8 and 10. As shown in FIGS. 5A, 5B, and 6 to 8, below member 62 and next to the lower end of side rail 78 of each rack 66, a bracket 81 supports a drive motor 82 which drives an endless conveyor belt 84 wrapped onto rollers, not shown, extended between the side rails. Spaced regularly along belt 84 are pairs of laterally spaced support members 86, 88 for individual cameras. Support members 86, 88 respectively include enlarged outer ends 90, 92 which engage the outer edge of a camera sitting on the support members to cause the camera to tilt backward to more stable position against belt 84. Each rack 66 further includes a pair of removable inner guide rods 94, 96, only the tops of which are visible in FIGS. 2 to 4 and 9; and a pair of removable outer guide rods 98, 100. To facilitate their removal, rods 94–100 may be supported at their lower ends in sockets, not shown, which are formed in member 62 and at their upper ends in loose-fitting oblong holes through member 64. A motor 102 is mounted on frame 40 near lower member 62 to rotate a drive pinion or friction wheel 104 which engages the periphery of member 62. Thus, rotation of wheel 104 will cause source 60 to rotate to present successive racks 66.

A door or panel, not shown, in exterior enclosure 12 can be opened or removed to enable an operator to gain access to source 60. To reload source 60, the operator simply lifts rods 98, 100 above of the sockets in member 62, swings the lower ends of the rods radially outward, and then slides the rods downward out of the oblong holes in member 64. If necessary, rods 94, 96 can be lifted upward through their respective oblong holes in member 64; however, rods 94, 96 ordinarily would be left in place while the racks are being loaded. With rods 98, 100 removed, the operator can load a plurality of photographic cameras 106 right-side-up onto the exposed support members 86, 88 of conveyor belt 84 of each rack 66. When all of the exposed support members of a given rack have received cameras, motor 82 can be actuated to index conveyor belt 84 upward, or the conveyor can be moved manually, to present a fresh set of support members. The previously loaded cameras are tilted against the conveyor belt by enlarged outer ends 90, 92 and confined within the rack by fixed rods 68–74 and rods 94, 96 as the cameras are indexed over the top of the conveyor and moved up-side-down along the radially inner or back side of the rack. When a desired number of cameras has been loaded, rods 98, 100 are replaced and motor 102 is operated to present the next rack to the operator. If desired, the individual racks can be loaded with different kinds of cameras, such as fixed focus cameras without flash, fixed focus cameras with flash, cameras with zoom lenses, water-proof cameras, and the like. If the cameras are provided with lens covers, the covers would be opened before loading and movement of the lens cover to the open position would actuate a switch in each camera to turn the camera on in the well-known manner. Later a known sleep circuit in the camera would turn the camera off to conserve battery power while the camera is waiting to be vended from the rack. Cameras without lens covers would include a known on-off switch and sleep circuit and would be loaded with the switch in the on position.

Figure 3:
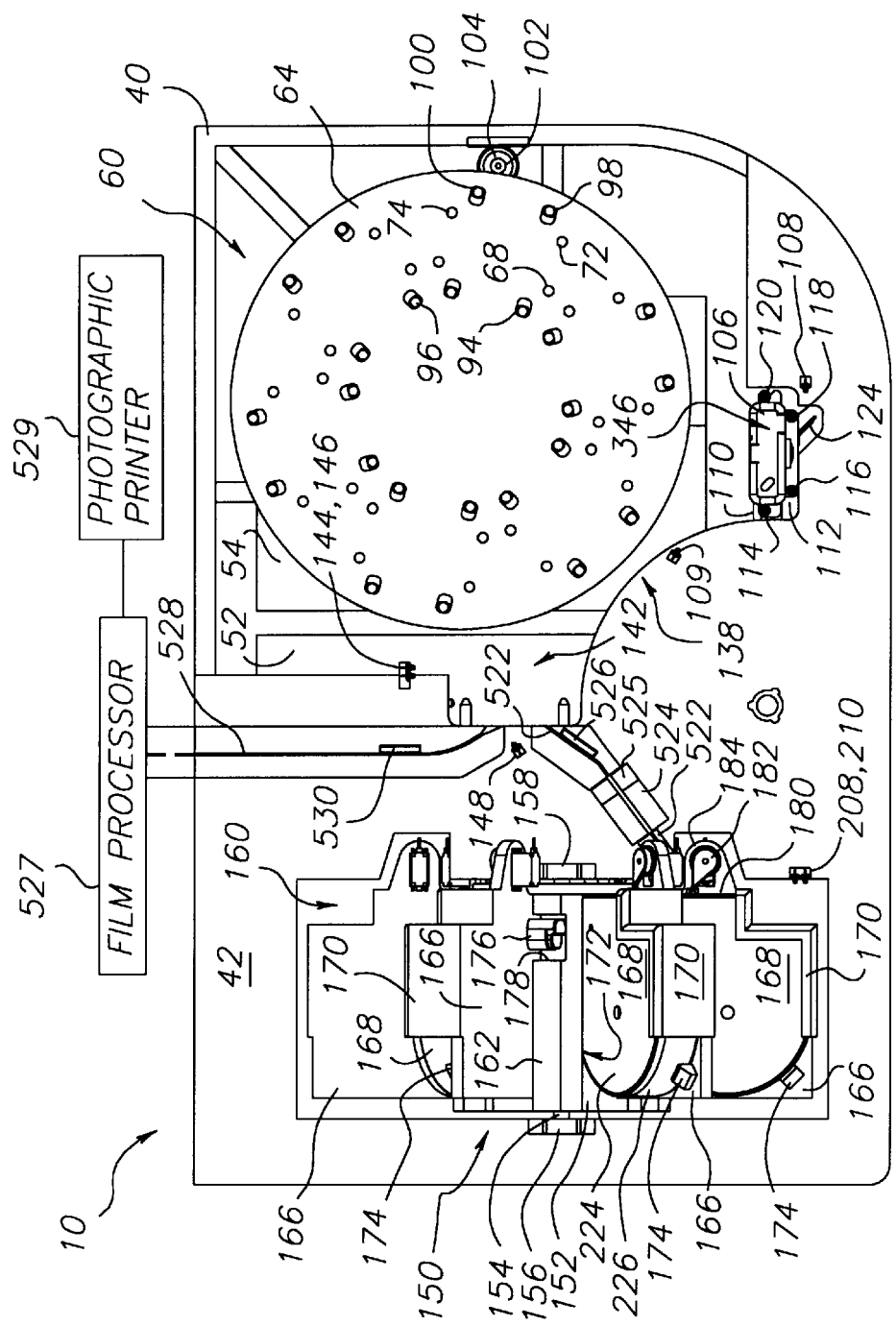
FIG. 3 is a top view of the apparatus of FIG. 2 and also shows schematically a film processor and a film printer connected to receive filmstrips from the apparatus.
Figure 4:
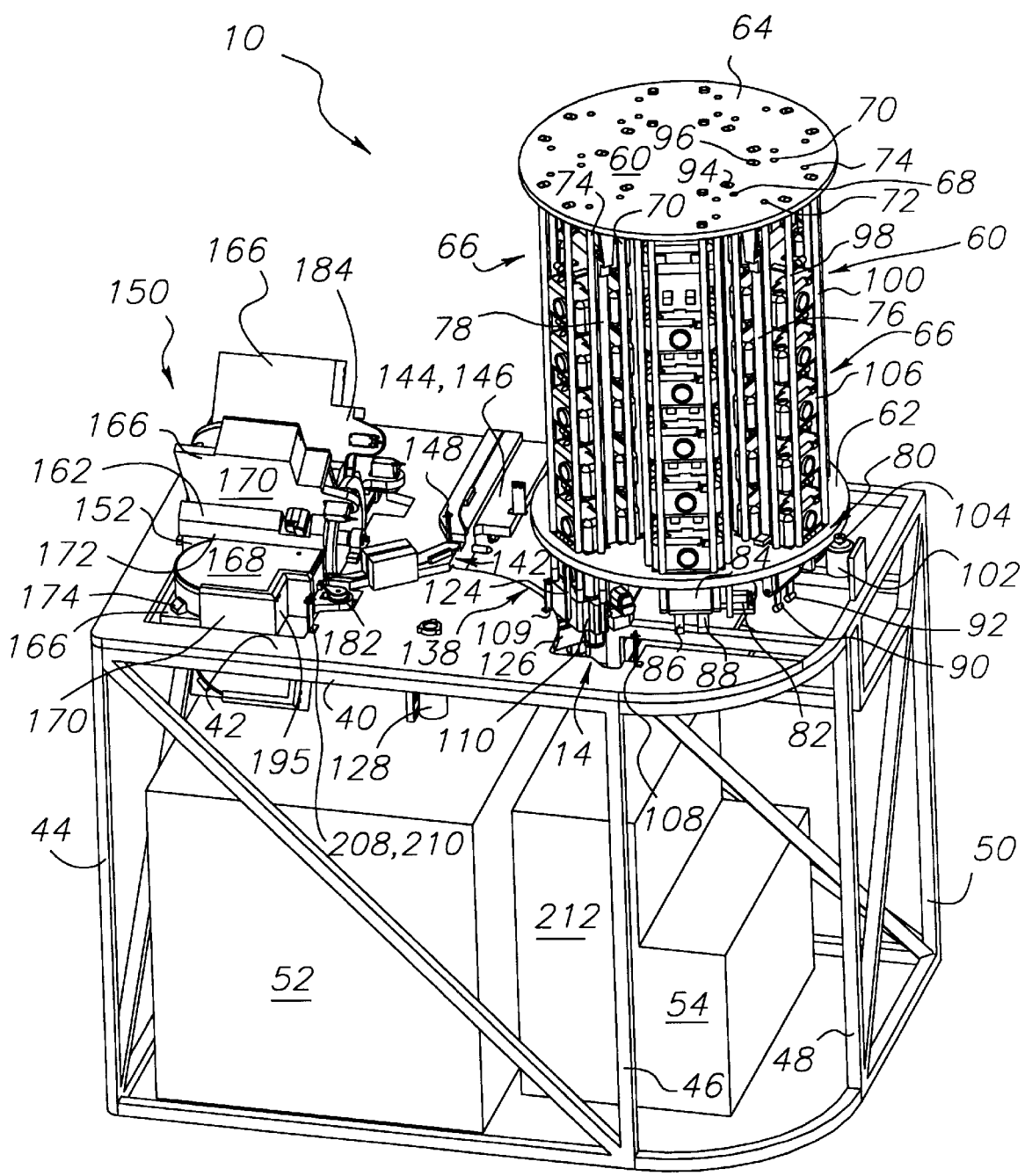
FIG. 4 shows the apparatus of FIG. 1 with its light-tight enclosure removed, but with a camera sitting on a nest at a station for receiving cameras from or returning cameras to a source of a plurality of cameras.
Figure 10:
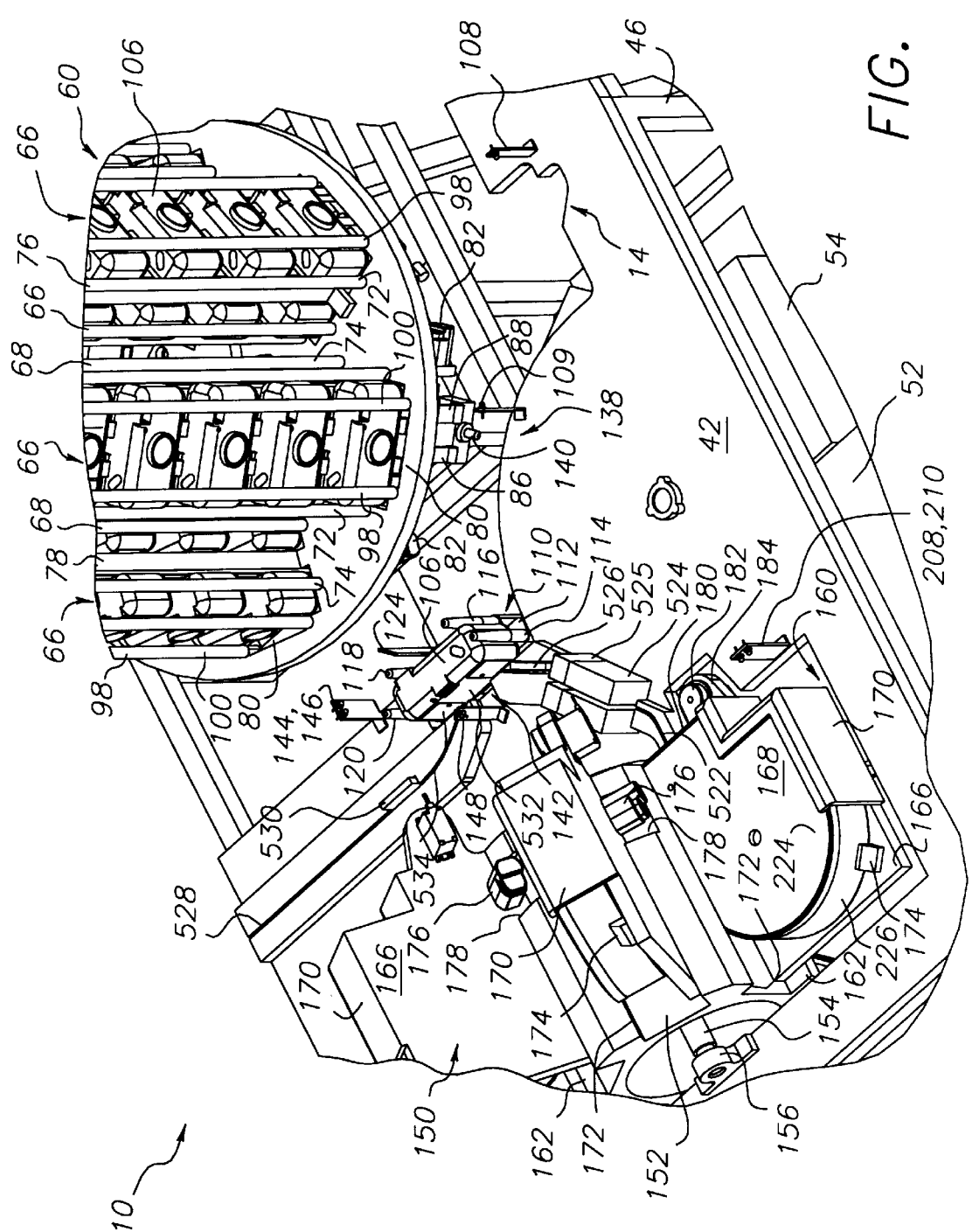
FIG. 10 shows a fragmentary perspective view from the opposite front corner of the apparatus of FIG. 9, indicating details of a source for unexposed photographic film and elements for guiding film to and from a camera supported on the nest.
Figure 17A:
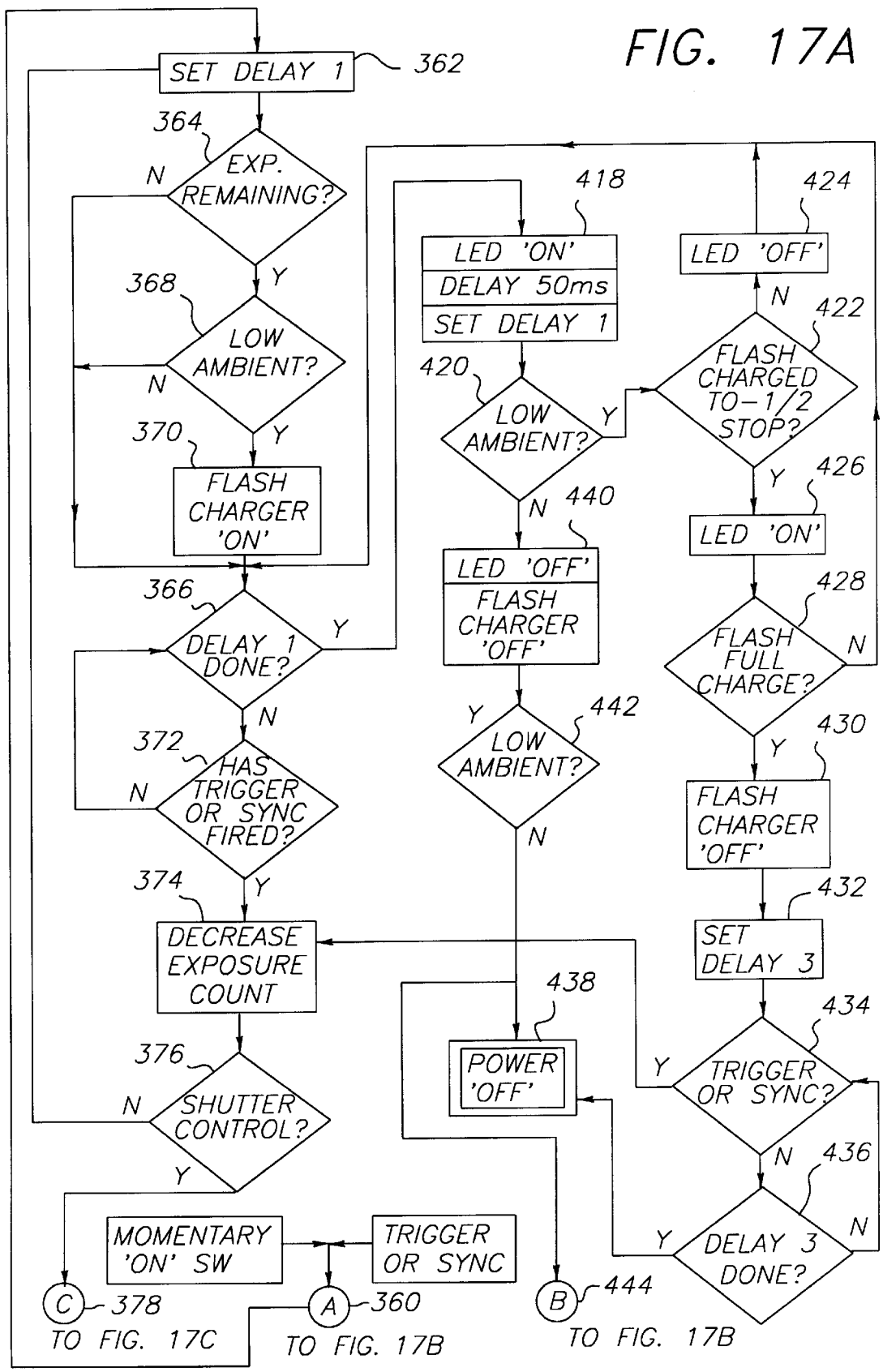
FIGS. 17A to 17D show flow charts of the logic of the controller of the camera when the camera has been placed on the nest of the apparatus.

When a customer places a camera at station 14, its lens cover must be opened to turn the camera on or its on-off switch set to the on position, to configure the camera to communicate with apparatus 10. Alternatively, station 14 could include a suitable mechanism, not shown, for opening a lens cover or actuating an on-off switch to configure the camera. At station 14, an emitter 108, such as a light emitting diode, mounted next to the station as shown best in FIGS. 3 and 10, signals to the camera that the camera has been placed on a nest 110 which will support the camera during subsequent unloading and, if requested by the customer, reloading. Off to the left of station 14, as shown in FIGS. 3 and 10, a sensor 109 is positioned to detect operation of an emitter 346, such as a light emitting diode, on the back of the camera. The cooperation between the camera and emitter 108 and sensor 109 will be explained with regard to FIGS. 17A to 17 D. In this specification, communication between the apparatus and a camera and between the apparatus and a cassette for unexposed film is disclosed as being achieved using pairs of optical light emitters and sensors. However, those skilled in the art will appreciate that such communication could as well be achieved by magnetic emitters and sensors, or by mechanical/electrical connections, or by combinations of optical, magnetic, and mechanical/electrical interfaces, without departing from the scope of the invention.

As best seen in FIGS. 3 and 5 to 8, nest 110 includes a block-like base member 112 which supports an array of upwardly extended, tapered guide members 114–120 for locating a camera on the nest whether the camera is placed by a customer or by the apparatus. Guide members 114, 120 engage opposite ends of a camera, while guide members 116, 118 engage the front of the camera. The camera is held fast on nest 110 by a latch mechanism to be described with regard to FIG. 5B. To reflect signals from emitter 108 to a sensor on each camera, such as a conventional scene light sensor of the camera, a reflector 124 is mounted at an angle to base member 112.

Figure 2:
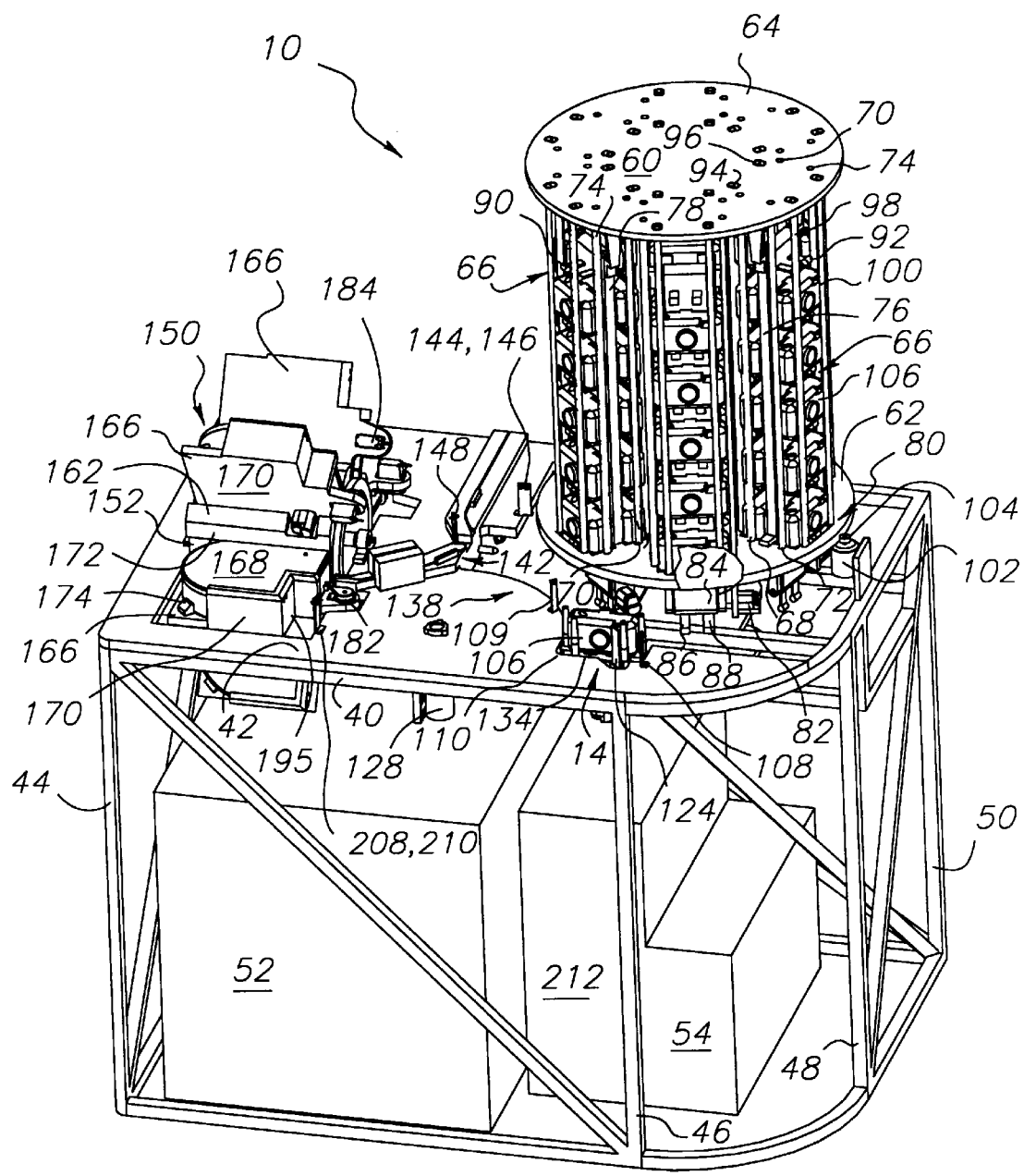
FIG. 2 shows the apparatus of FIG. 1 with its light-tight enclosure removed.

Beneath the base member, an arm 126 is pivoted to the underside of support plate 42 and connected to a motor 128, shown only fragmentarily in FIG. 2, which can swing the arm away from and back to station 14. On an under side of arm 126 is mounted a motor 130 which is connected to base member 112 to rotate the base member relative to arm 126, as necessary to position a camera to be unloaded or returned to source 60. On an under side of base member 112 is mounted a motor 132 which is connected to a rotatable latch member, shown in FIG. 5B, which extends upwardly through the base member to engage a latch recess, also shown in FIG. 5B, on an under surface of the camera to hold the camera securely to the base member.

Figure 5A:
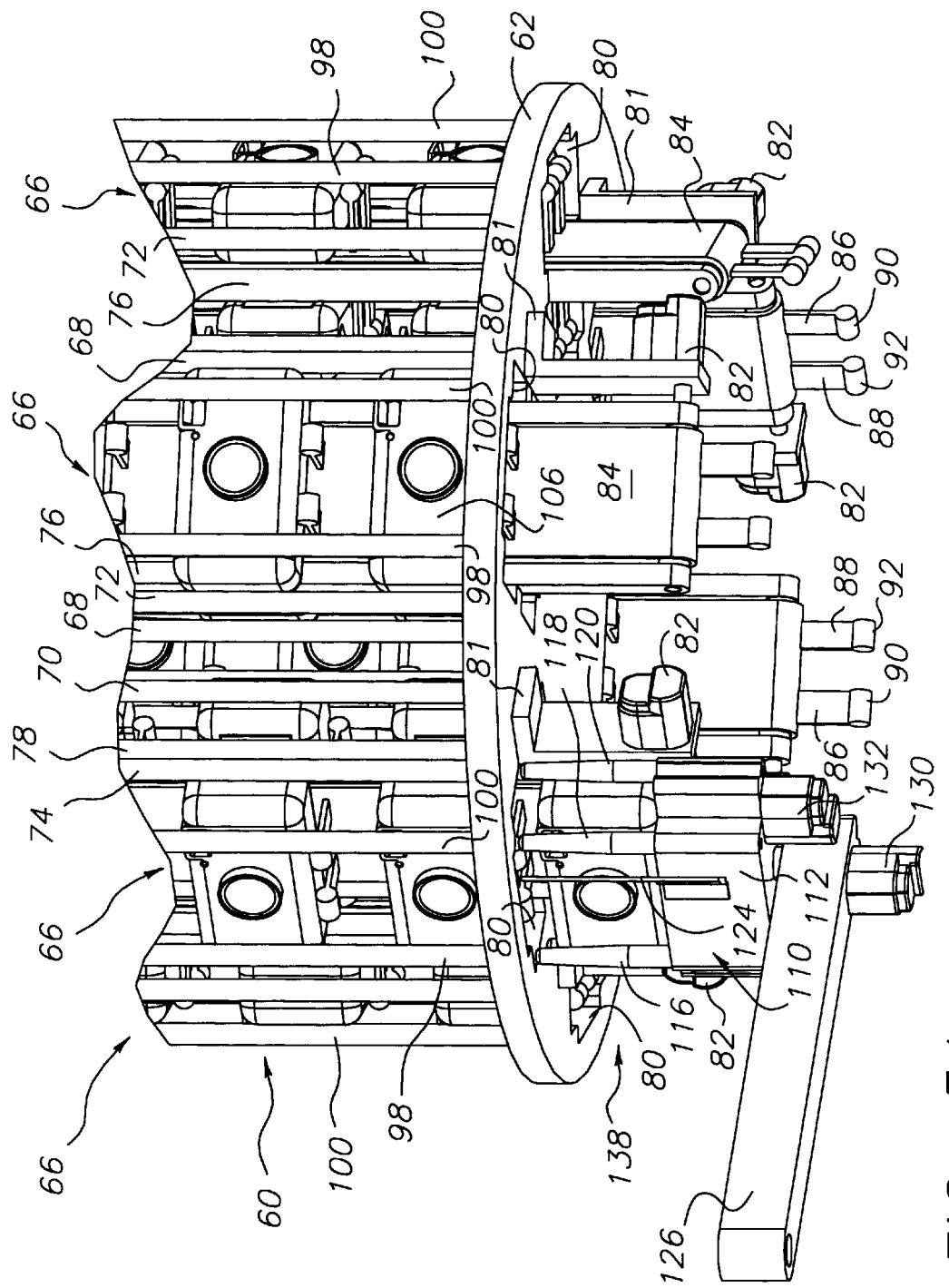
FIG. 5A shows a fragmentary perspective view of the underside of the source of cameras, indicating its cooperation with a nest for receiving cameras at the station for receiving cameras from the source of cameras.
Figure 5B:
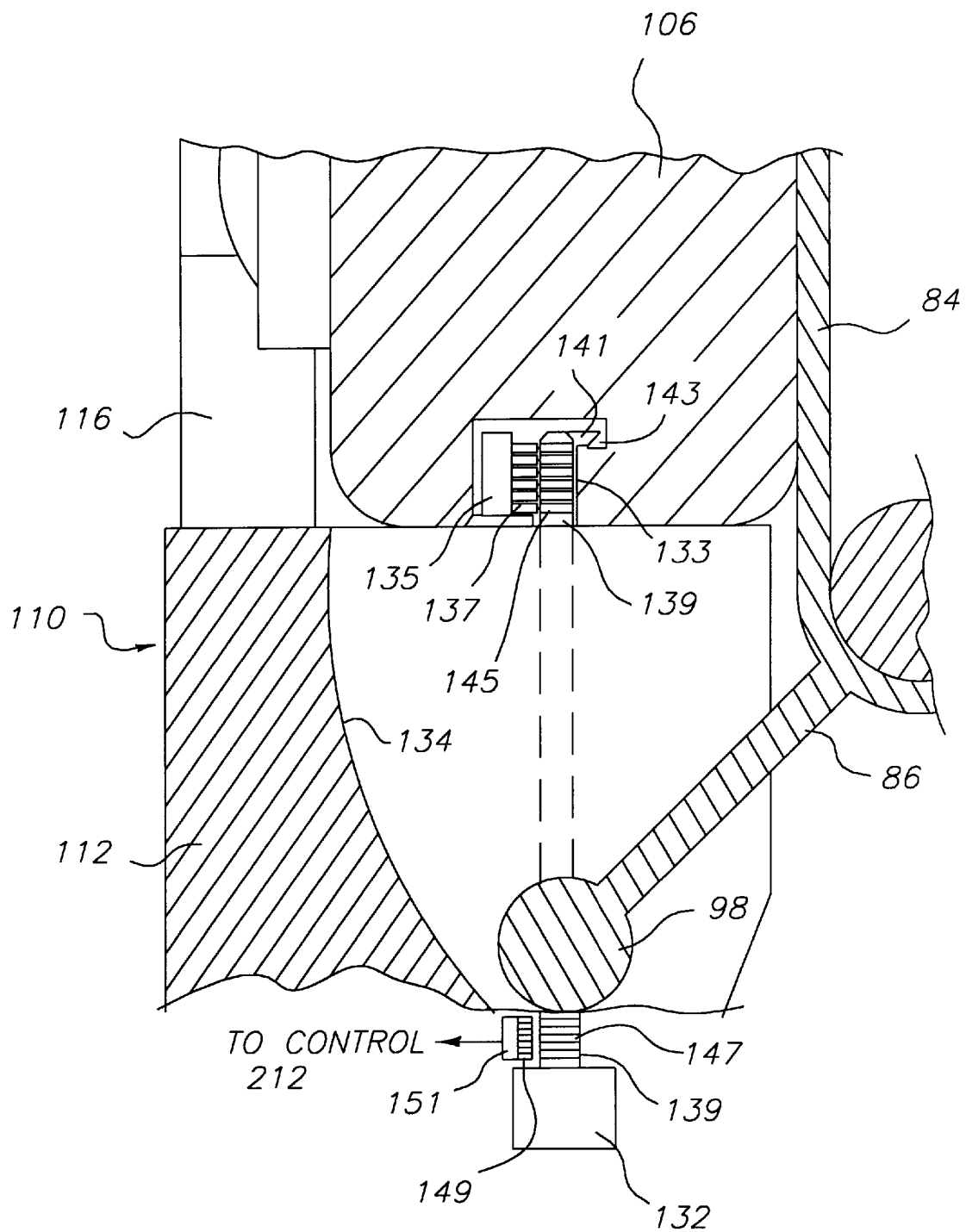
FIG. 5B shows an enlarged, fragmentary and partially broken away view of the apparatus of FIGS. 5A and 5C, indicating how electrical and mechanical connections are established between the nest and the camera when the camera is latched to the nest.
Figure 5C:
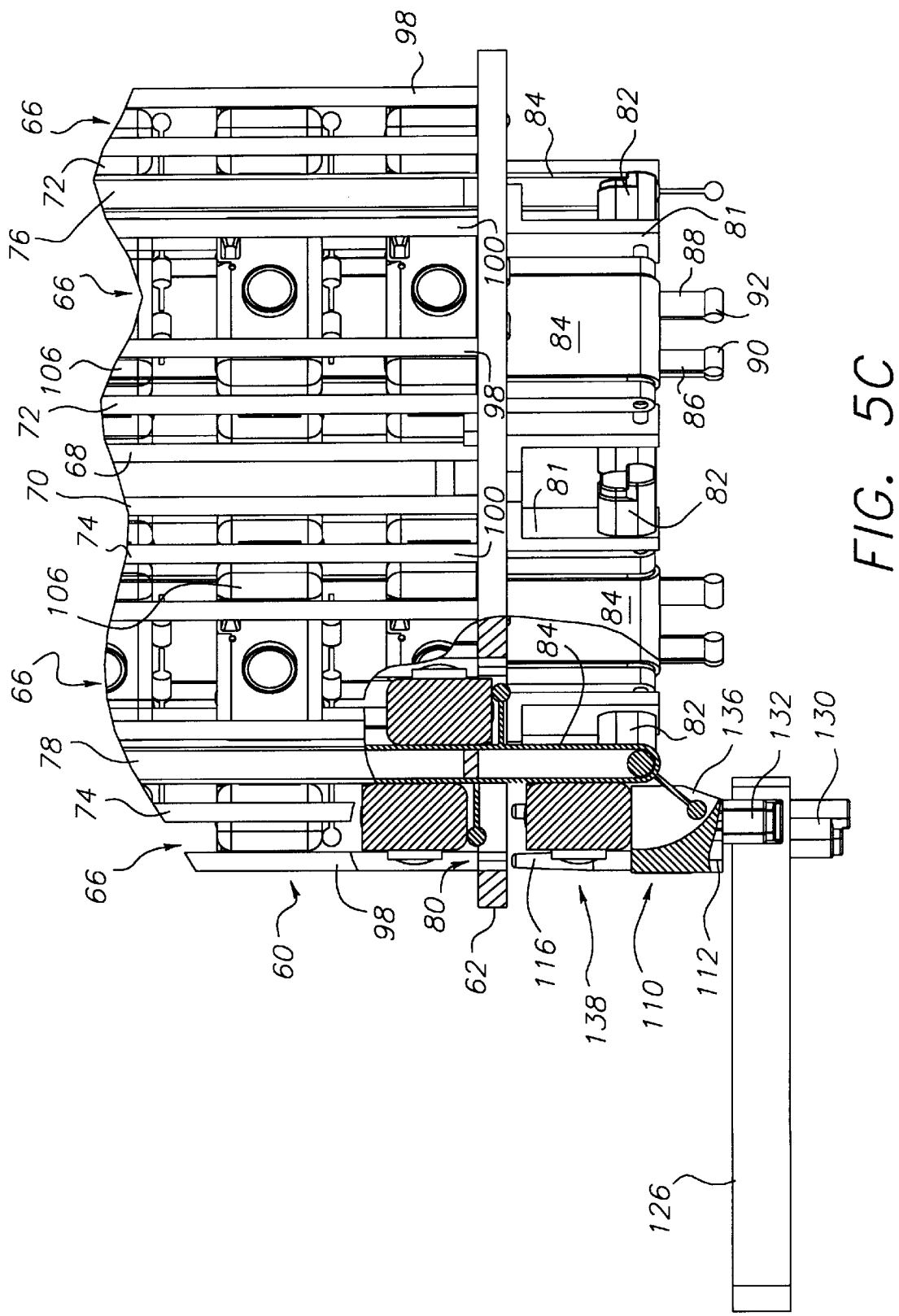
FIG. 5C shows the apparatus of FIG. 5A, partially broken away to indicate how a camera support member on a conveyor of the source of cameras can move through a slot in the nest for receiving cameras.
Figure 11:
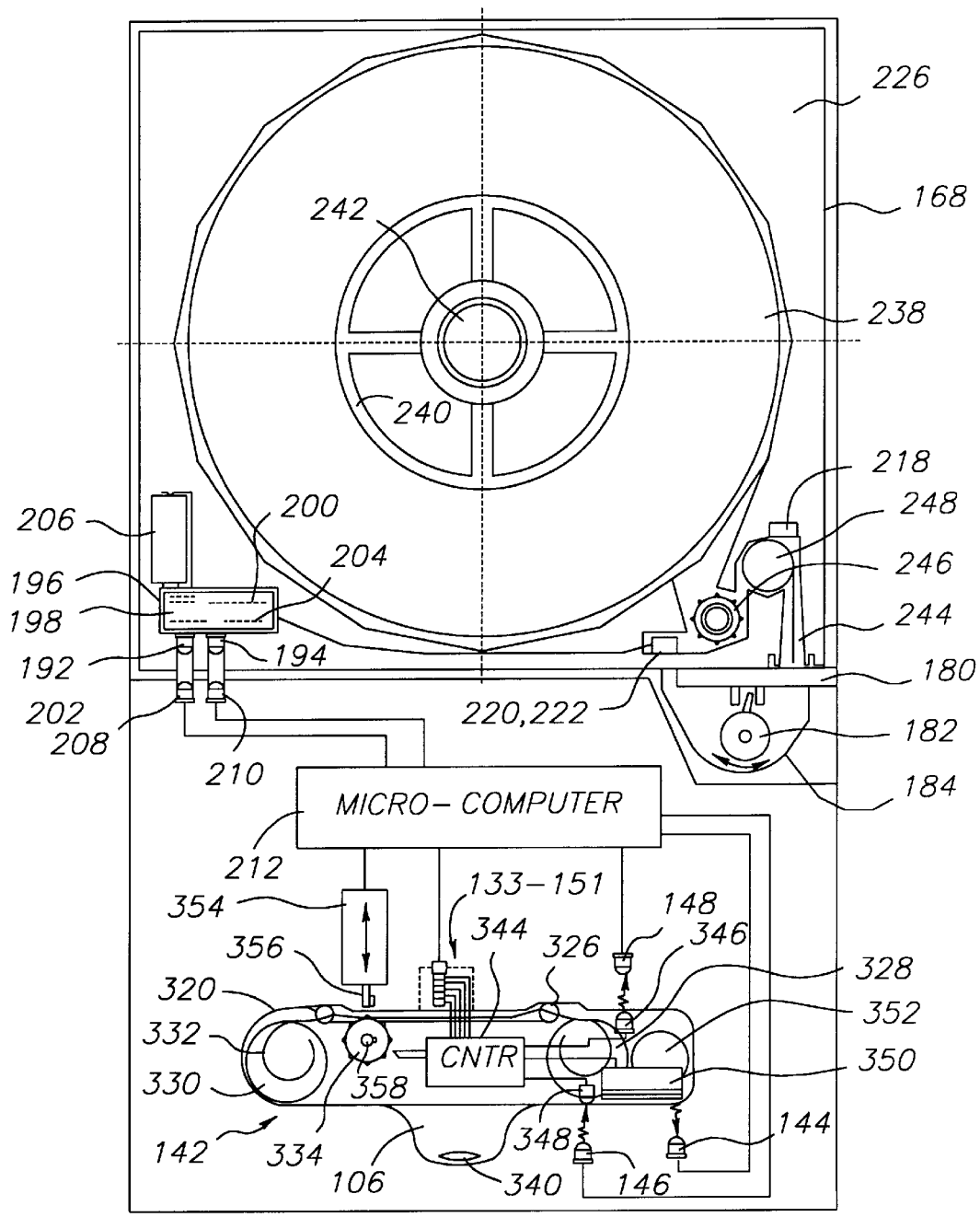
FIG. 11 shows a schematic view of a cassette for dispensing, and a manually driven type of camera for receiving, filmstrips and indicates features which enable the cassette and camera to communicate with a controller for the apparatus.
Figure 16:
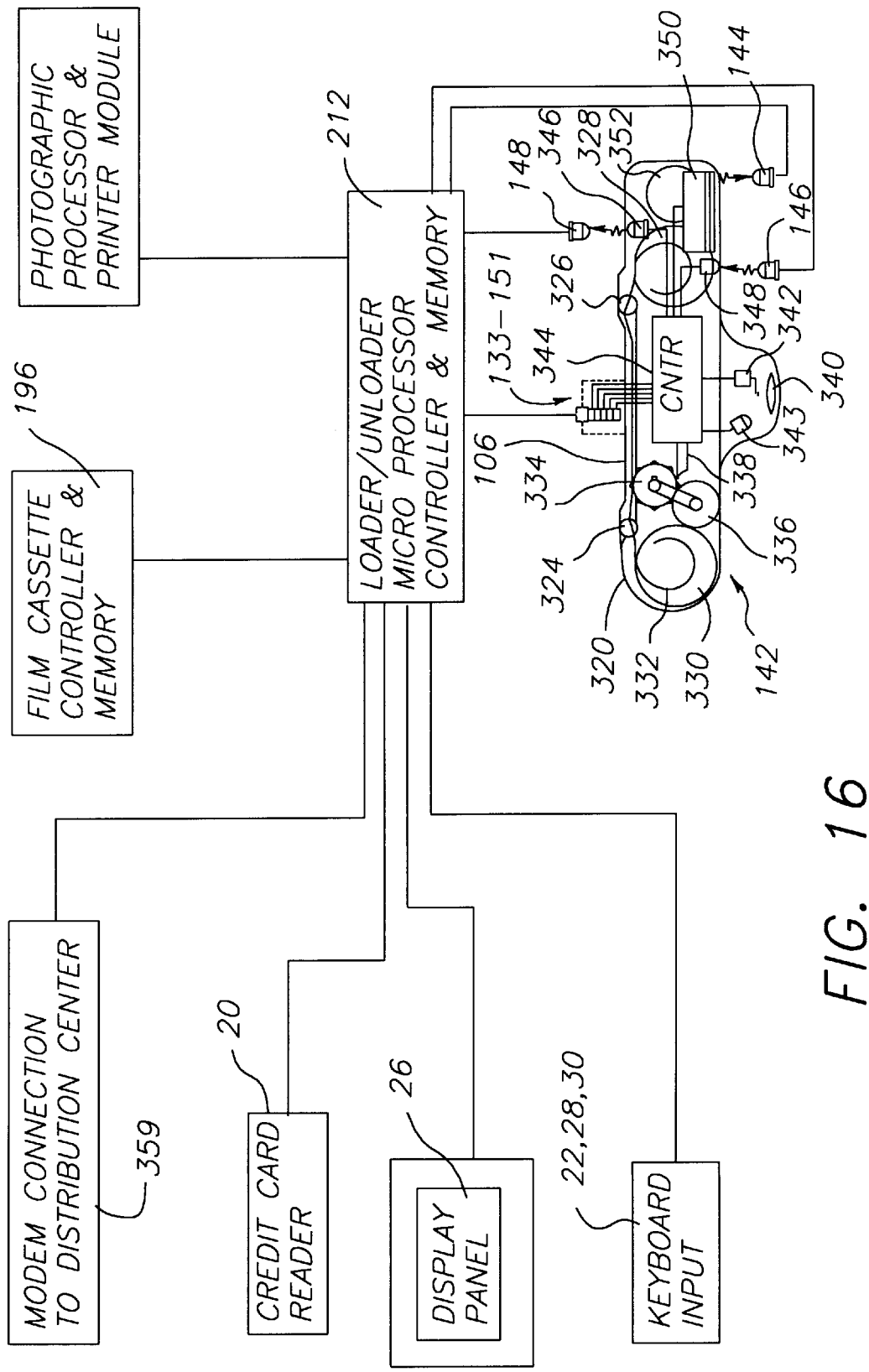
FIG. 16 shows a schematic view of a motor driven type of camera for receiving filmstrips and the controller for the apparatus, indicating features and connections which enable the cassette, the camera, the keypad, the credit card reader and a communications modem to communicate with the controller.

FIG. 5B illustrates schematically an electromechanical latch and communication device by which a camera simultaneously can be latched to nest 110 and placed in electrical communication with a controller of apparatus 10. A recess 133 is provided into an under surface of the camera. Within the recess, an electrical connector module 135, which is electrically connected to the controller of the camera as shown in FIGS. 11 and 16, includes a plurality of contacts 137. A latch shaft 139 is connected for rotation by motor 132 and extends upwardly through base member 112. The upper end of latch shaft 139 includes a laterally extended latching finger 141 which can be rotated into a latch recess 143 extended from recess 133. Latch shaft 139 carries a corresponding plurality of contact elements 145 which engage contacts 137 when motor 132 rotates latch finger 141 into recess 143. Contact elements 145 are connected to conductors, not shown, which extend through the shaft to a plurality of contacts 147 at the lower end of shaft 139. When latch finger 141 has been rotated into recess 143, contacts 147 engage a corresponding plurality of contacts 149 on a connector module 152 which is supported by base member 112 and connected to the controller for apparatus 10. See FIGS. 11 and 16. Thus, when a customer places a camera or source 60 deposits a camera in nest 110, motor 132 is operated to rotate shaft 139 to latch the camera to the nest and to establish electrical communication between the camera and the apparatus. The electrical communication may be used to provide power to a camera whose battery is weak or to communicate information between the camera and apparatus 10.

Figure 6:
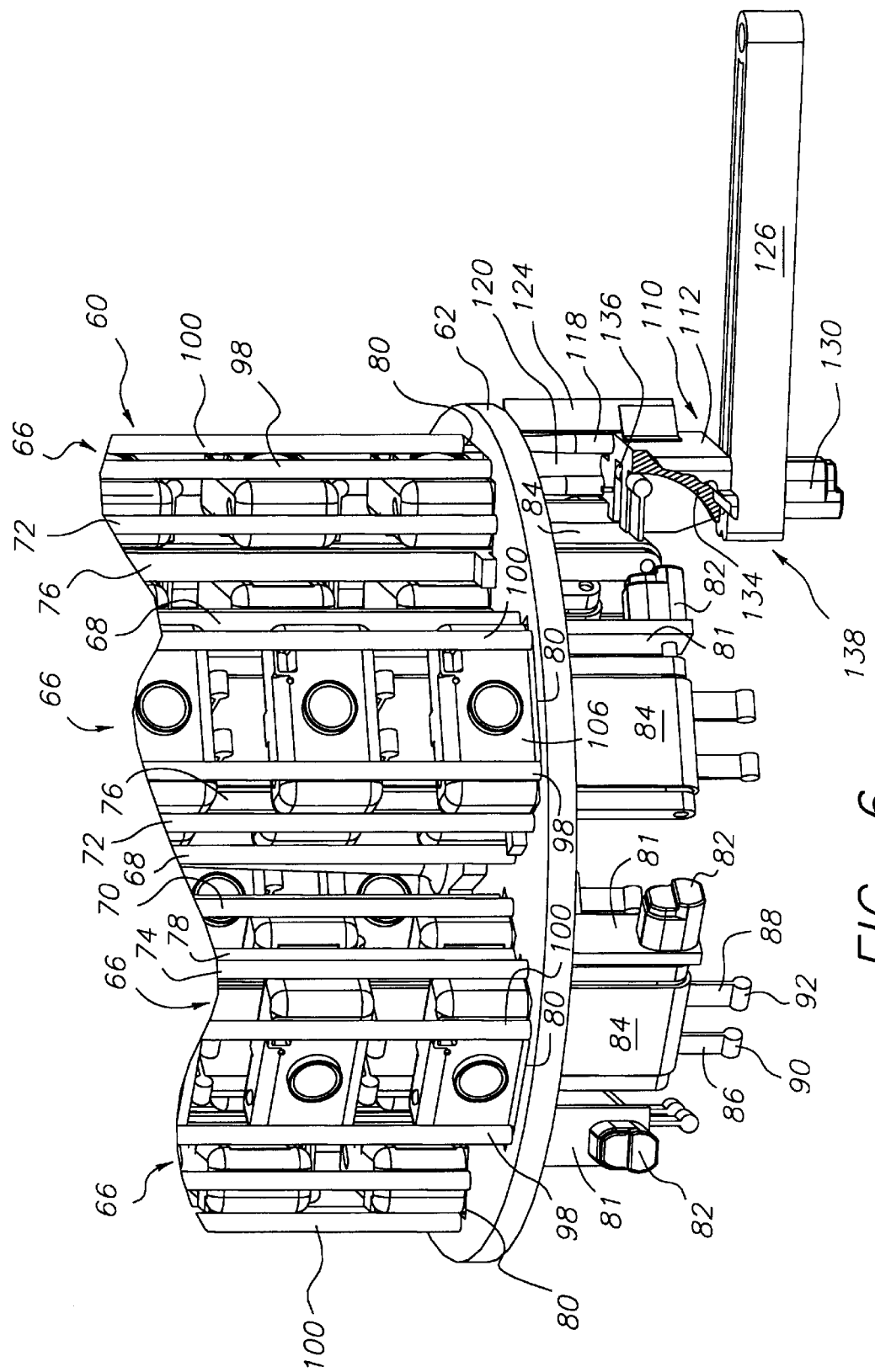
FIGS. 6, 7 and 8 show fragmentary, partially broken away perspective views from the opposite side of the apparatus of FIGS. 5A to 5C, indicating in sequence how the camera support members on the conveyor of the source of cameras can move through slots in the nest for receiving cameras.
Figure 7:
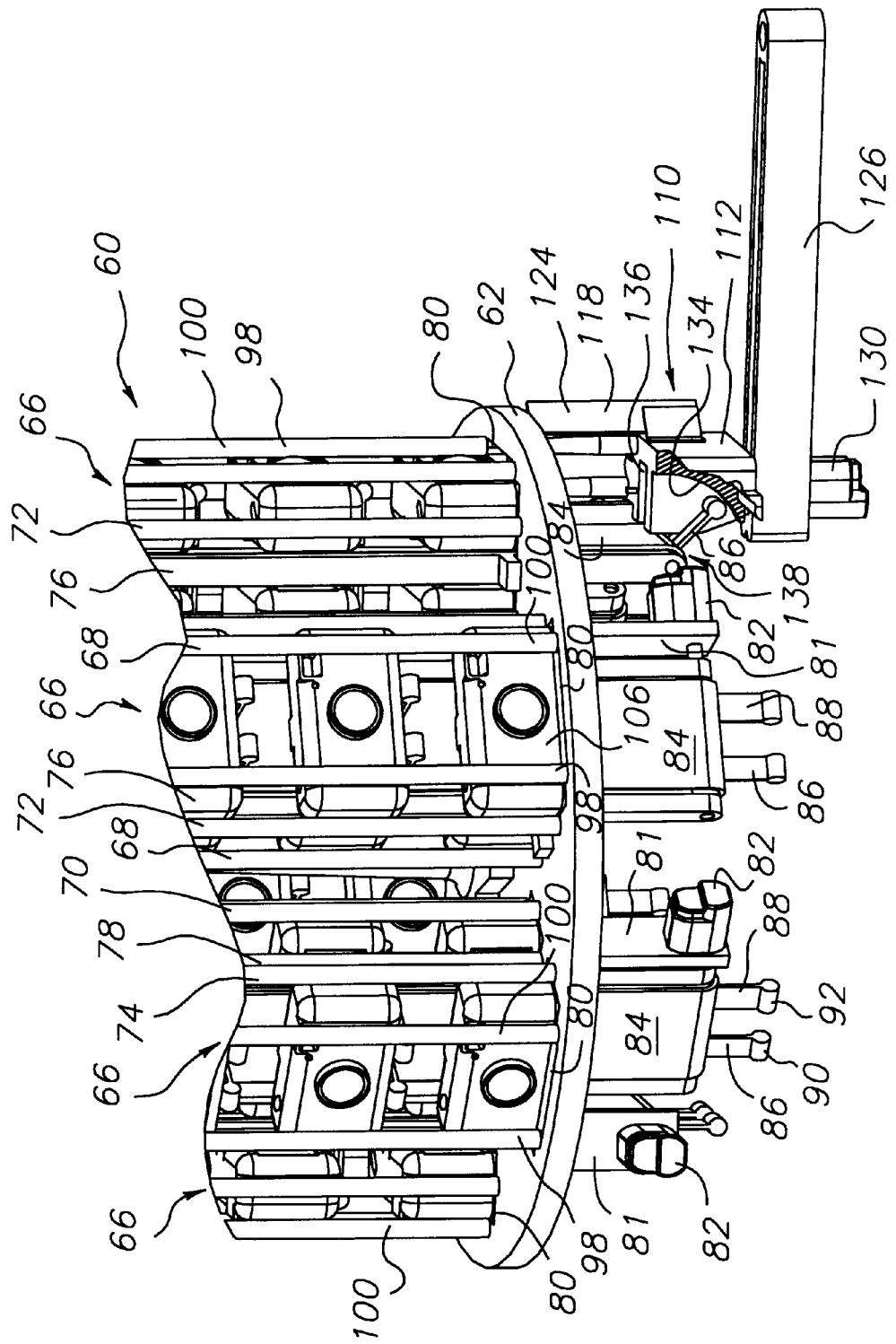
Figure 8:
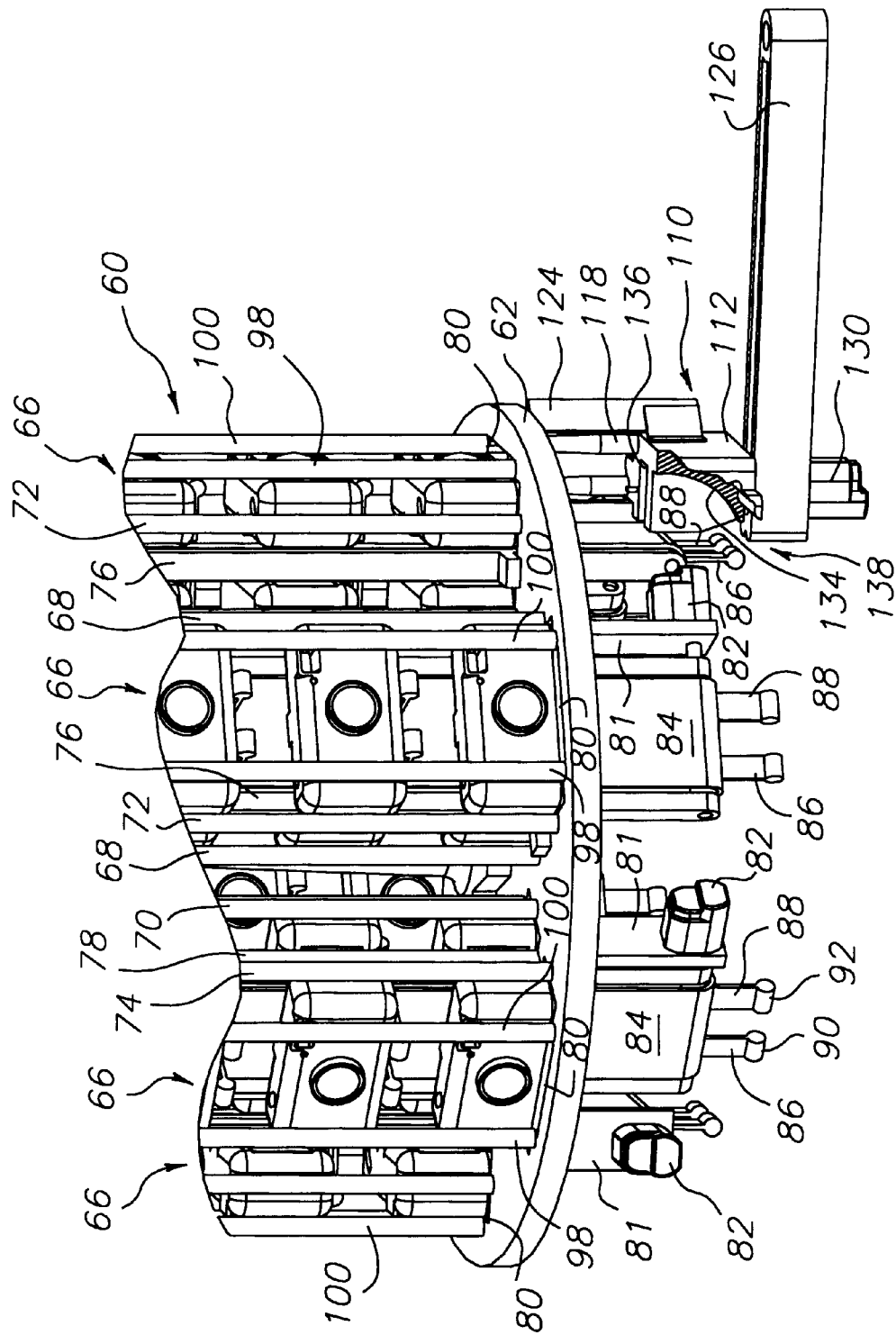
Figure 9:
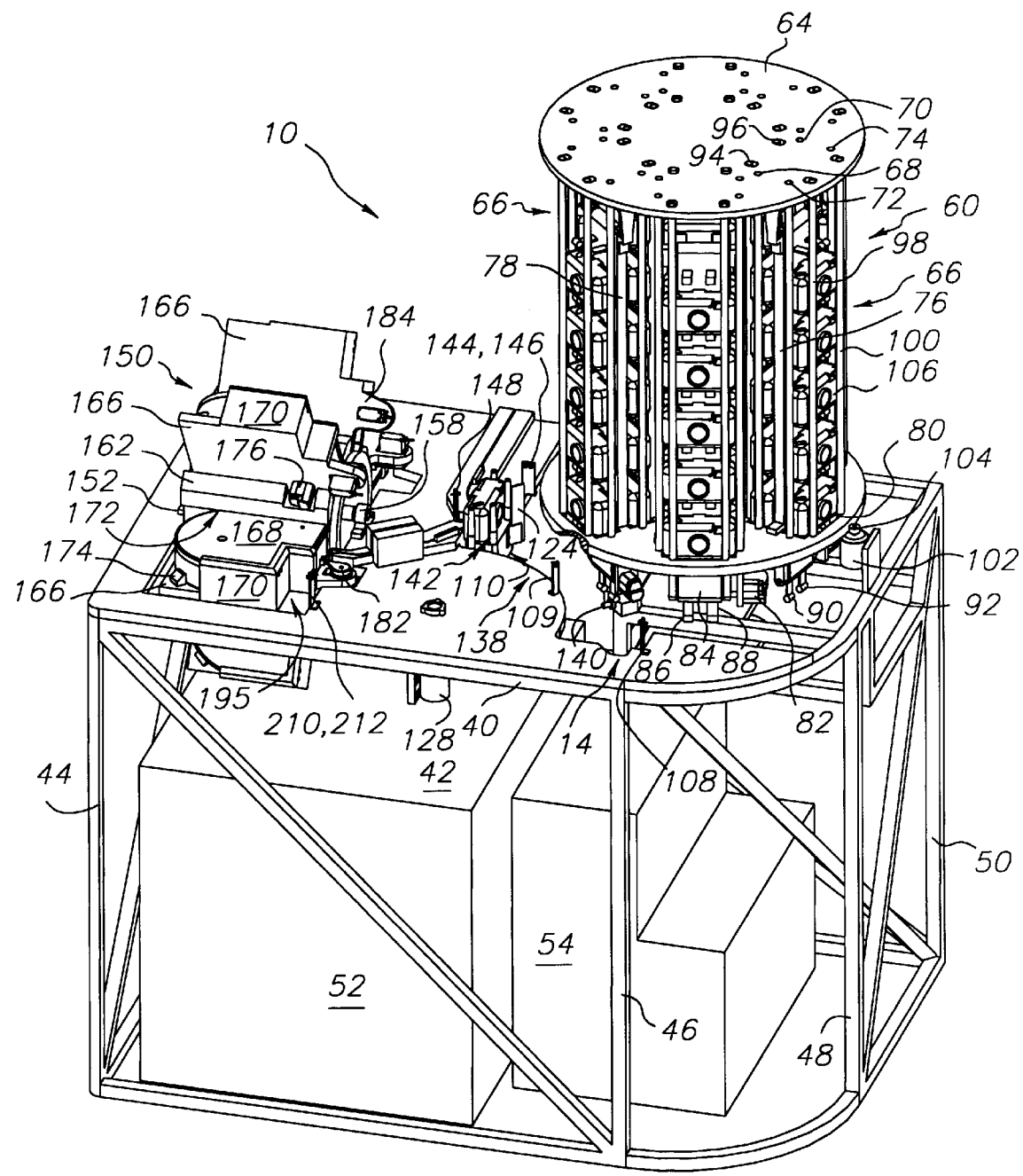
FIG. 9 shows the apparatus of FIG. 1 with its light-tight enclosure removed, but with a camera sitting at a station for loading filmstrips into and unloading filmstrips from cameras supported on the nest.

As shown in FIGS. 2, 5B, 5C, and 6 to 8, base member 112 includes a pair of upwardly and radially inwardly open, downwardly extended arcuate slots 134, 136 which are configured to permit passage of support members 86, 88 when nest 110 has been positioned at a station 138 at which a camera 106 can be placed on or removed from the nest by source 60. Motor 128 is operated to swing arm 126 to station 138 and motor 130 is operated to rotate nest 110 to locate slots 134, 136 in the path of support members 86, 88. As indicated in FIG. 10, below camera source 60 a spring-biased plunger 140 and a linear actuator, not shown, are mounted on frame 40. As nest 110 approaches station 138, the linear actuator is operated to retract plunger 140 to allow the nest to pass and then to release plunger 140 to extend into an aperture in base member 112, thereby positioning the nest at station 138. FIG. 6 shows the position of the support members just after conveyor belt 84 has been moved by motor 82 to lower a camera onto nest 110; however, the camera has been omitted from the figure for ease of illustration. FIGS. 7 and 8 show how the support members move through slots 134, 136 to complete delivery of a camera to the nest. When a camera has been delivered to nest 110 at station 138, motor 132 is operated to latch the camera to the nest and establish electrical communication in the manner previously described.

Once the support members reach the position of FIG. 8, motor 128 is operated to swing arm 126 to a station 142 at which the camera can be loaded with a discrete filmstrip, or unloaded. Simultaneously, motor 130 is operated to rotate nest 110 to a proper position for station 142. A spring-biased plunger and actuator, similar to plunger 140, also may be provided at station 142, to position nest 110 at station 142. As seen in FIGS. 9, 10, 11 and 16, next to station 142 are positioned a sensor 144 for detecting operation of a flash unit of the camera and an emitter 146, such as a light emitting diode, for sending signals to the camera in a manner similar to that of emitter 108. Reflector 124 directs light between camera 106, and sensor 144 and emitter 146. At the back of station 142, a sensor 148 is positioned to receive signals from emitter 346 of the camera. Such signals could be generated, for example, by pulsing a conventional flash-ready light emitting diode of the camera. The information to be communicated between camera 106 and apparatus 10 will be discussed in greater detail later in this description.

As best shown in FIGS. 2, 3 and 10, a source 150 of unexposed photographic film is supported by mechanism support plate 42. Source 150 includes a central support drum 152 having an axle 154 supported for rotation by a pair of bearing blocks 156, 158 mounted on an upper surface of support plate 42. Between the bearing blocks, drum 152 can rotate within an opening 160 through the support plate. A plurality of radially and axially extended mounting flanges 162 are provided on an exterior of drum 152, there being six such flanges in the illustrated embodiment. A corresponding plurality of radially extended cassette support platforms 166 are mounted to flanges 162. Each of platforms 166 supports a cassette 168 for unexposed photographic film. Different types of film may be provided in the individual cassettes, or all the cassettes may contain the same type of film. Cassettes 168 may be of the type disclosed in the '178 patent. An angled retainer wall 170 extends from each platform 166 to engage radially outer surfaces of each cassette, while a retainer surface 172 on each flange 162 engages a radially inner edge of each cassette. One or more removable stops 174 are provided to hold each cassette in position on its platform. To install a cassette, the operator would remove stop 174, slide the cassette beneath retainer surface 172 into contact with retainer wall 170, and replace the stop.

Beneath each platform 166 is mounted a cassette drive mechanism, such as a motor 176 having an axially movable drive shaft, not illustrated, of the type shown in the '178 patent. Motor 176 extends partially into a notch 178 provided in the adjacent flange 162. As disclosed in the '178 patent, cassette 168 includes a film cutter mechanism 180, shown only schematically in FIGS. 3, 10 and 11. An actuator 182 is provided for cutter mechanism 180 and is supported on an extension 184 of support platform 166. In the manner shown in the '178 patent, actuator 182 also may operate a linkage, not illustrated, to retract the drive shaft of motor 176 to facilitate installation of a cassette and to extend the drive shaft into driving engagement with the cassette following installation. A drive ring 186 is mounted at one end of rotating support drum 152 and is driven by a motor and drive wheel or pinion, not shown, which are mounted beneath support plate 42. The motor and drive wheel thus can rotate the support drum to position a selected cassette to deliver film, just as motor 102 and drive wheel 104 rotate source 60. Electrical connections for power to the several cassette drive motors 176 and actuators 182 may be provided for each platform 166 by individual sets of contacts, not shown, on the face of drive ring 186. Each set of contacts would engage a corresponding set of contacts, also not shown, mounted on frame 40 or support plate 42 when support drum 152 is positioned to present a cassette 168 for delivery of film. Such electrical connections in rotary equipment are known to those skilled in the art and thus need not be disclosed in detail.

Figure 12:
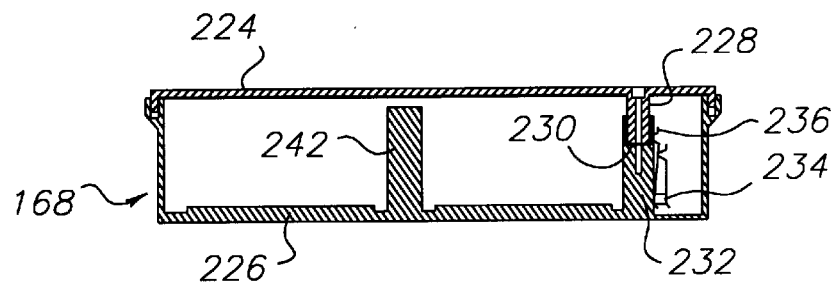
FIG. 12 shows a schematic sectional view through a cassette for dispensing filmstrips, with the cover of the cassette closed and an interlock switch closed.
Figure 13:
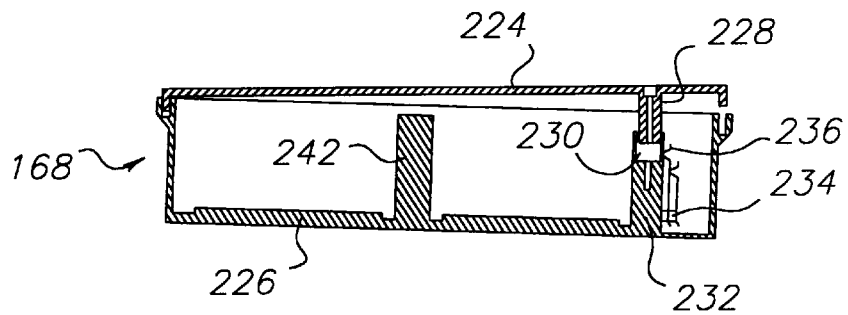
FIG. 13 shows the cassette of FIG. 12 with the cover opened and the interlock switch opened.
Figure 14:
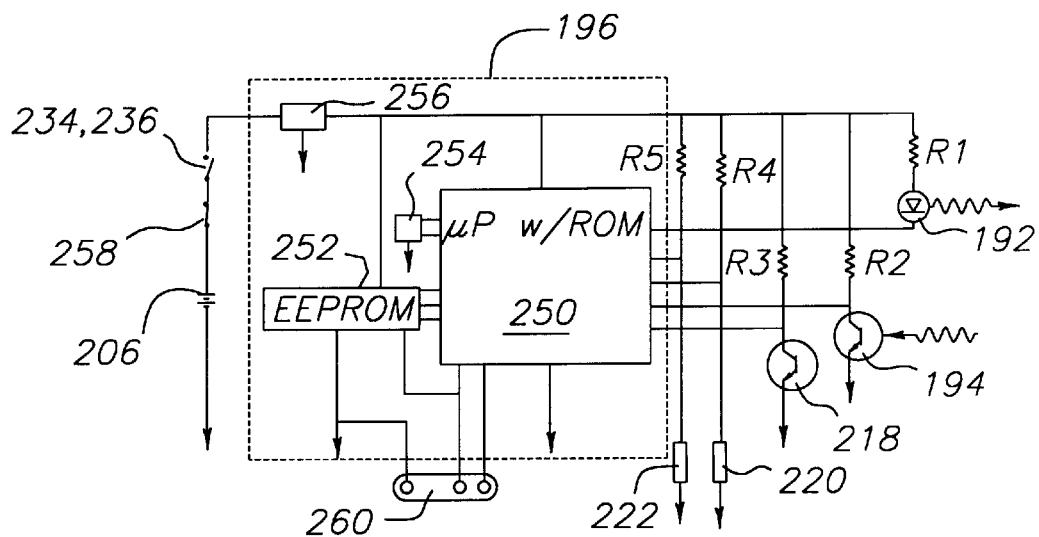
FIG. 14 shows details of a monitor circuit for the cassette for dispensing filmstrips.

FIGS. 11 to 14 illustrate schematically various features of cassette 168 which are not disclosed by the '178 patent. An emitter 192, such as a light emitting diode, and a sensor 194 are provided in a front wall of the cassette to enable the cassette to send signals to and receive signals from apparatus 10. When emitter 192 and sensor 194 are optical, retainer wall 170 may be provided with apertures for passing such signals, as indicated schematically at 195 in FIGS. 2, 4 and 9. Within the cassette, a monitor circuit 196, such as shown schematically in FIG. 14, is connected to emitter 192, sensor 194 and a display 198, such as a liquid crystal display. A microprocessor within circuit 196 may be programmed to cause display 198 to show the number of frames or exposures remaining in the cassette as indicated at 200, the type of film within the cassette as indicated at 202, and the expiration date of the unexposed film as indicated at 204. A battery 206 is connected to circuit 196. As seen in FIGS. 2 to 4 and 9 to 11, a sensor 208 and an emitter 210, such as a light emitting diode, are mounted on support plate 42 and connected to a micro-controller 212 of apparatus 10, respectively to receive signals from emitter 192 and to emit signals to sensor 194, thereby enabling cassette 168 and apparatus 10 to communicate.

As shown in FIGS. 11 to 14, cassette 168 also includes a set of internal features for monitoring conditions or events which would indicate that the unexposed film should not be used. A sensor 218 is connected to monitor circuit 196 to detect leakage of light into the cassette which could damage the unexposed film. A humidity sensor 220 and a temperature sensor 222 are connected to monitor circuit 196 to detect any temperature or level of humidity within the cassette which equals or exceeds a predetermined limit at which the film should no longer be used. As shown in FIGS. 12 and 13, cassette 168 includes a cover or lid 224 and a hollow housing 226 which is closed by the lid. A post 228 is formed on an under side of lid 224 in a position to extend into a socket 230 formed in a post 232 formed on an inner bottom surface of housing 226. An interlock switch 234 is mounted adjacent post 232 and connected to monitor circuit 196. Switch 234 includes a movable actuator contact 236 which is deflected when post 228 enters socket 230 as lid 224 is installed, thereby actuating the switch. Within housing 226, a roll of unexposed film 238 is supported by a central core 240 which is rotatably mounted on a support shaft 242. The unexposed film may be perforated along one edge to engage a film metering sprocket in a camera and the perforations may, for example, be in 35 mm or APS format. The unexposed film may be provided at regular intervals with partially completed leading and trailing end preparations which can be separated by cutter mechanism 180. In the latter instance, several cassettes 168 could be provided in apparatus 10, each cassette having a different length of film between end preparations, to allow the apparatus to load filmstrips of the different lengths. An exit slit 244 from housing 226 leads to cutter mechanism 180. A leading end of the film is engaged by a sprocket roller 246 driven by motor 176 and then wraps around an idler roller 248 before passing to exit slit 244.

FIG. 14 shows various details of monitor circuit 196. A micro-processor 250 with read only memory is connected to an electronically programmable read only memory 252 and a clock 254. A voltage regulator 256 adjusts the voltage coming from battery 206 via a reset switch 258 accessible externally of housing 226 and interlock switch 234. When cassette 168 has been loaded with a fresh roll of unexposed film, reset switch 258 is closed. If reset switch 258 thereafter is opened, power to the micro-processor is lost and monitor circuit 196 resets to indicate that there is no film installed in the cassette. A programming port 260 is connected to micro-processor 250 and memory 252 to allow the necessary programs and information to be loaded in the familiar manner.

Figure 15:
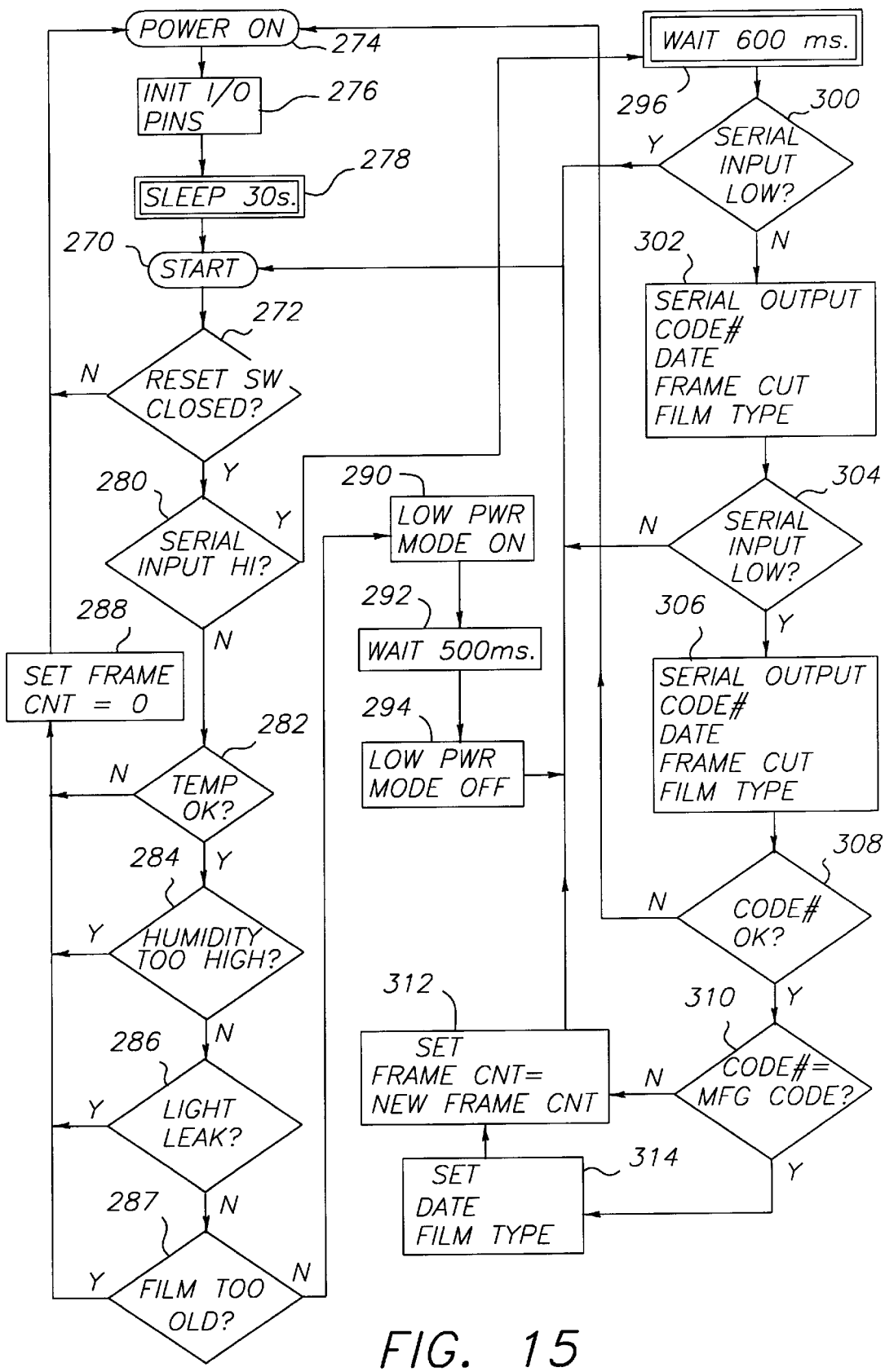
FIG. 15 shows a flow chart of the logic of the monitor circuit of the cassette for dispensing filmstrips.

FIG. 15 shows the logic or mode of operation of cassette 168. When the cassette has been loaded with roll 238 and lid 224 has been installed, interlock switch 234 will be closed. If an unauthorized opening or reloading of the cassette should occur, switch 234 will open, thereby causing the monitor circuit to lose power and setting the exposure count to zero, which prevents reuse of the cassette. Reset switch 260 will be closed. Port 260 then is used to load the necessary operating programs and information into microprocessor 250 and memory 252 to configure monitor circuit 196 for operation. The operating process of cassette 168 starts at step 270 when the cassette is first loaded and lid 224 is installed. If reset switch 258 is open, steps 270, 272, 274, 276, 278, in a sense, are running; but micro-processor 250 actually is without power. When reset switch 258 eventually is closed, step 280 determines whether emitter 210 is signaling with pulses of light to sensor 194, which causes the serial input to be high. If the serial input is not high at step 280, step 282 checks the output of sensor 222 to determine whether a temperature limit has been equaled or exceeded. If the temperature is not acceptable, step 288 sets the frame or exposure count to zero to prevent film from being dispensed from the cassette. If the temperature is acceptable, step 284 checks the output of sensor 220 to determine whether a humidity limit has been equaled or exceeded. If the humidity is not acceptable, step 288 sets the frame or exposure count to zero. If the humidity is acceptable, step 286 checks the output of sensor 218 to determine if there has been a light leak into the cassette. If a light leak has occurred, step 288 sets the frame or exposure count to zero. If no light leak has occurred, step 287 checks to determine if the film is too old to be dispensed. If the film is too old, step 288 sets the frame counter to zero. If the film is not too old, step 290 sets the monitor circuit to a low power mode and step 292 waits 500 ms, for example, after which step 294 turns off the low power mode to allow the monitor circuit to perform. Since the time required for the monitor circuit to perform is on the order of a millisecond or so, steps 290 to 294 help to conserve battery 206. A step also could be included to check whether switch 234 has been opened since the cassette was originally loaded, indicating perhaps that an unauthorized reloading has occurred. If switch 234 has been opened, then power has been removed and the frame or exposure count automatically is set to zero.

If the serial input is high at step 280 to indicate that an associated apparatus is signaling the cassette, step 296 waits for 600 ms, for example. The associated apparatus could be a camera loading apparatus 10 of the type shown in FIG. 1 or could be an apparatus, not illustrated, used by a film manufacturer or authorized reloader of cassettes to place fresh rolls of unexposed film into a cassette. To be sure that the associated apparatus is still signaling, step 300 determines if the serial input has become low. If the serial input has become low, the earlier high signal is ignored and the process returns to step 270. If the serial input is still high, the process proceeds to step 302, where micro-processor 250 and memory 252 output to emitter 192 signals corresponding to a code number of the cassette, the date film was last loaded into the cassette, the number of exposures remaining in the cassette, and the type of film last loaded into the cassette. Emitter 192 sends corresponding signals to sensor 208 of apparatus 10 where the signals are provided to micro-controller 212. A similar sensor and controller, not illustrated, would be provided on an apparatus for reloading cassettes. If the cassette has signaled that no exposures are remaining, at a step not shown micro-controller 212 would instruct source 150 to move another cassette into position to dispense film. If the serial input is now low at step 304, the process proceeds to step 306 where micro-controller 212 outputs to emitter 210 signals corresponding to a code number for apparatus 10, the current date, the number of exposures which will remain in the cassette after loading of a filmstrip into a camera, and the type of film of the cassette. If the associated apparatus is a cassette reloader, step 306 would signal the date, the new number of exposures and the film type to be loaded. If the serial input at step 304 is still high, the earlier signals are ignored and the process returns to step 270. At step 308, micro-processor 250 checks to determine that the code of the associated apparatus is a correct code for an apparatus to which the cassette has been programmed to dispense film or from which the cassette has been programmed to receive film. If the code is correct, at step 310, micro-processor 250 checks to determine whether the correct code also corresponds to an approved film manufacturer or authorized reloader which is going to load or has loaded the cassette with a fresh roll of unexposed film. If step 310 determines that the correct code corresponds instead to an approved apparatus 10 for loading cameras, at step 312 micro-processor 250 sets a new number of remaining exposures, as received at step 306. If the correct code is for an approved manufacturer or authorized reloader, at step 314 micro-processor 250 will reset the date and film type of the cassette and at step 312 will reset the frame count, as received at step 306.

FIGS. 11 and 16 illustrate schematically two variations of camera 106 which can be used in apparatus 10. Camera 106 incorporates many of the features of the cameras disclosed in the '054 and '178 patents. The camera comprises an external light-tight housing 320. In the embodiments of FIGS. 11 and 16, a single movable closure 322, 324 may be provided for loading a discrete filmstrip into the camera and unloading the filmstrip from the camera. Alternatively, in both embodiments, a second movable closure 326 may be provided for unloading the filmstrip from the camera. Each embodiment comprises a film chamber 328 for unexposed film and a film chamber 330 for exposed film. To load the cameras, closure 322, 324 is opened and a discrete filmstrip 332 is driven into the camera into engagement with a film metering sprocket 334 within the camera.

In the embodiment of FIG. 11, sprocket 334 is rotated during loading of the camera by an external mechanism of the type disclosed in the '178 patent, thereby drawing the filmstrip into the camera and into chamber 328, where a scroll of film is formed. For example, the external mechanism could comprise a motor 354 having a key shaft 356 which engages a key slot 358 in sprocket 334 to rotate the sprocket. In the embodiment of FIG. 16, sprocket 334 is connected to be driven by a film drive motor 336 within the camera, thus eliminating the need for an external mechanism of the type required for the embodiment of FIG. 11. In both embodiments, a film metering switch 338 is provided to indicate the passage of each frame of film. A taking lens 340 is provided in each embodiment and, in the embodiment of FIG. 16, an electronically actuated shutter mechanism 342, rather than a mechanical shutter mechanism as would be used with the embodiment of FIG. 11. A sensor 343 may be provided within the camera to detect operation of the shutter mechanism 342 and provide a signal. A camera controller 344, including suitable logic and memory features, is provided in both embodiments and is connected to receive signals from the sensors and to control the various electronic components of the camera.

In the cameras of FIGS. 11 and 16, an emitter 346 such as a light emitting diode is provided for communicating or sending signals from the camera to sensor 148 of apparatus 10. Emitter 346 is connected to controller 344 and may double as a conventional flash ready indicator lamp of the camera. For ease of use when emitter 346 also serves as a flash ready indicator, the emitter preferably is located at the back or on the top of the camera; however, any convenient site may be selected. A sensor 348 is provided in the camera for receiving communication signals from emitter 146 of apparatus 10 to the camera. Sensor 348 is connected to controller 344 and may double as a conventional scene light sensor of the camera, in which case the sensor necessarily is located on the front of the camera. An electronic flash unit 350 is connected to controller 344. When camera 106 is installed in apparatus 10 at station 142 and flash unit 350 is tested, light from unit 350 is detected by sensor 144. Each embodiment of camera 106 also includes a battery 352 for operation of the various electrical components just described.

During use of the cameras of FIGS. 11 and 16, filmstrip 332 is metered frame by frame from chamber 328 to chamber 330 until all exposures have been made. To unload the embodiment of FIG. 11 when only closure 322 is provided, the camera is operated by external mechanism 354, 356 to drive the filmstrip back to chamber 328. Closure 322 is then opened and the camera is operated to drive the filmstrip past closure 322 to the exterior of the camera. To unload the embodiment of FIG. 11 when closure 326 is provided and to unload the embodiment of FIG. 16, closure 326 is opened and the camera is operated to drive the exposed film from chamber 330 past closure 326 to the exterior of the camera.

As shown schematically in FIG. 16, apparatus 10 may include a modem 359 connected to controller 212 to permit communication to a distribution center. This would permit remote daily tracking of the status of the apparatus and estimating of service and replenishment requirements. The modem could be used to make calls for service or assistance in emergency situations, such as an attempt to break into the apparatus. The modem would also permit apparatus 10 to communicate with a service bureau to check the validity of the customer's credit or debit card. Also, when a customer returns a camera to a second apparatus from an initial apparatus at which the camera was loaded, the security code of the apparatus, as discussed with regard to FIG. 17B, can be used to establish communication with the initial apparatus to credit the photo-finisher at the second apparatus and debit the film loader at the initial apparatus. And, if the customer's photofinishing instructions were stored at the initial apparatus, modem 359 would enable them to be downloaded to the second apparatus.

FIGS. 17A to 17D show the logic or mode of operation of the cameras of FIGS. 11 and 16 when in use by the customer and when installed in apparatus 10 for loading, unloading, reloading and other procedures. If the camera is in use by the customer, the operating process starts at step 360 when the shutter release or trigger is pressed by the customer or the synchronization switch of the shutter mechanism closes. If the camera has been installed in apparatus 10, step 360 occurs upon a signal via latch and communication device 133–151. Step 360 could occur at station 14 in response to a signal from emitter 108 or at station 142 in response to a signal from emitter 146. Or, step 360 can occur upon actuation of the shutter release or trigger by a mechanism of apparatus 10, such as will be described with regard to FIG. 18. A time delay #1 of about 0.2 seconds is set at step 362 to time the flashing of emitter 346. At step 364, controller 344 checks to see if exposures remain. If there are none, the process goes to step 366. If there are exposures remaining, at step 368 sensor 348 is used to check whether the ambient light level is low. If the ambient level is high, the process goes to step 366. If the ambient level is low, the flash charger is turned on at step 370.

At step 366, controller 344 checks whether delay #1 is completed. If the delay is not completed, step 372 checks whether the trigger or synchronization switch has been actuated. If no actuation has occurred, the process returns to step 366 until delay #1 is completed or the trigger or synchronization switch is actuated. If the trigger or synchronization switch is actuated, the process proceeds to step 374 where controller 344 counts down the exposure. When zero exposures remain, the camera will be disabled. At step 376, controller 344 checks whether the shutter or motor of the camera are electronically controlled. If not, the process returns to step 362. If the shutter or motor of the camera is electronically controlled, the process continues at step 378 in FIG. 17C.

At step 380, controller 344 turns on emitter 346, which also doubles as the flash ready light. At step 382, the shutter coil is turned on, followed by a 2 ms delay to allow the shutter to open before flash unit 350 is actuated. At step 384, sensor 348 again checks for low ambient light. If the light level is low, flash unit 350 is fired at step 386 and step 388 delays for 2 ms which, combined with the previous delay at step 382, allows for nearly 1/250 sec. If the light level is high, the process goes to step 388 and no flash is fired. At step 390, controller 344 uses sensor 348 to determine if the light level is high and, if so, turns off the shutter coil at step 392 after 1/250 sec of open shutter. If the light level at step 390 was low, at step 394 a delay of 4 ms allows more light for proper exposure. At step 396, controller 344 uses sensor 348 to determine if the light level is average and, if so, proceeds to step 392 after 1/120 sec of open shutter. At step 398, a delay of 8 ms allows still more light for proper exposure. At step 392, the shutter coil is turned off to close shutter 342 and end the exposure.

At step 400, controller 344 checks for the presence of film wind motor 336. If there is no motor, emitter 346 is turned off at step 402 and the process returns to step 360. If motor 336 is present, it is turned on at step 404 to advance the film; and a delay #2 of about 1.5 sec is set. At step 406, controller 344 checks whether meter switch 338 remains closed to signal that the filmstrip is being advanced by one frame. At step 408, controller 344 checks whether delay #2 has ended. When delay #2 ends, the speed of motor 336 is reduced to slow at step 410. At step 412, controller 344 checks for opening of the metering switch. If the switch has opened to indicate a film advance is complete, controller 344 checks whether delay #2 has ended at step 414. If the delay has ended, the controller turns off motor 336 at step 416 and turns off emitter 346 at step 402. The process then returns to step 360.

Referring again to FIG. 17A and step 366, if delay #1 ends before a trigger actuation or synchronization switch closure occurs, at step 418 controller 344 will turn on emitter 346, delay for 50 ms and reset delay #1 of 0.2 sec. Then at step 420, sensor 348 measures the ambient light level and signals controller 344. If the ambient light level is low, at step 422 controller 344 determines if the flash circuit is within one half stop of full charge. If not, emitter 346 is turned off at step 424 and the process returns to step 366 until delay #1 is completed, at which time the process returns to step 418. Thus, emitter 346 is pulsed for 50 ms every 200 ms until the flash circuit is within one half stop of full charge. Then, at step 426, controller 344 turns on emitter 346, which remains on to indicate flash readiness. At step 428, if the flash circuit has not reached full charge, the process returns to step 366. If full charge has been reached, at step 430 the controller turns off the flash charger. At step 432, the controller sets a delay #3 of about 1 min, a period for which the camera will remain awake before going to sleep. At step 434, the controller checks for trigger or synchronization switch actuation. If an actuation has occurred, the process returns to step 374. If no actuation has occurred, the controller checks at step 436 for completion of delay #3. When delay #3 is complete, at step 438 the controller turns off the power and puts the camera to sleep or low power mode.

If at step 420, sensor 348 detects high ambient light level, either because the camera is installed in apparatus 10 and emitter 146 is on, or because the camera is in use in sufficiently high ambient light, at step 440 the controller turns off emitter 346 and turns off the flash charger. As will be discussed with regard to FIGS. 19A to 19F, in response to the turning off of emitter 346 when the camera is installed in apparatus 10, controller 212 of apparatus 10 turns off emitter 146 to indicate a request for a mode check. At step 442, sensor 348 checks ambient light level. If the ambient light level is not low at step 442, the camera goes to sleep at step 438. If the ambient light level is low, controller 344 will deduce that the camera has been installed in apparatus 10 and will proceed to a mode check at step 444 in FIG. 17B, to determine what further process steps are appropriate for the camera. Controller 344 may incorrectly deduce that the camera has been installed in apparatus 10 if sensor 348 is blocked, such as by the user's finger, just when emitter 348 is turned off; however, nothing further will happen since emitter 146 will not be present to signal the camera to proceed with the process of FIG. 17B.

Figure 17B:
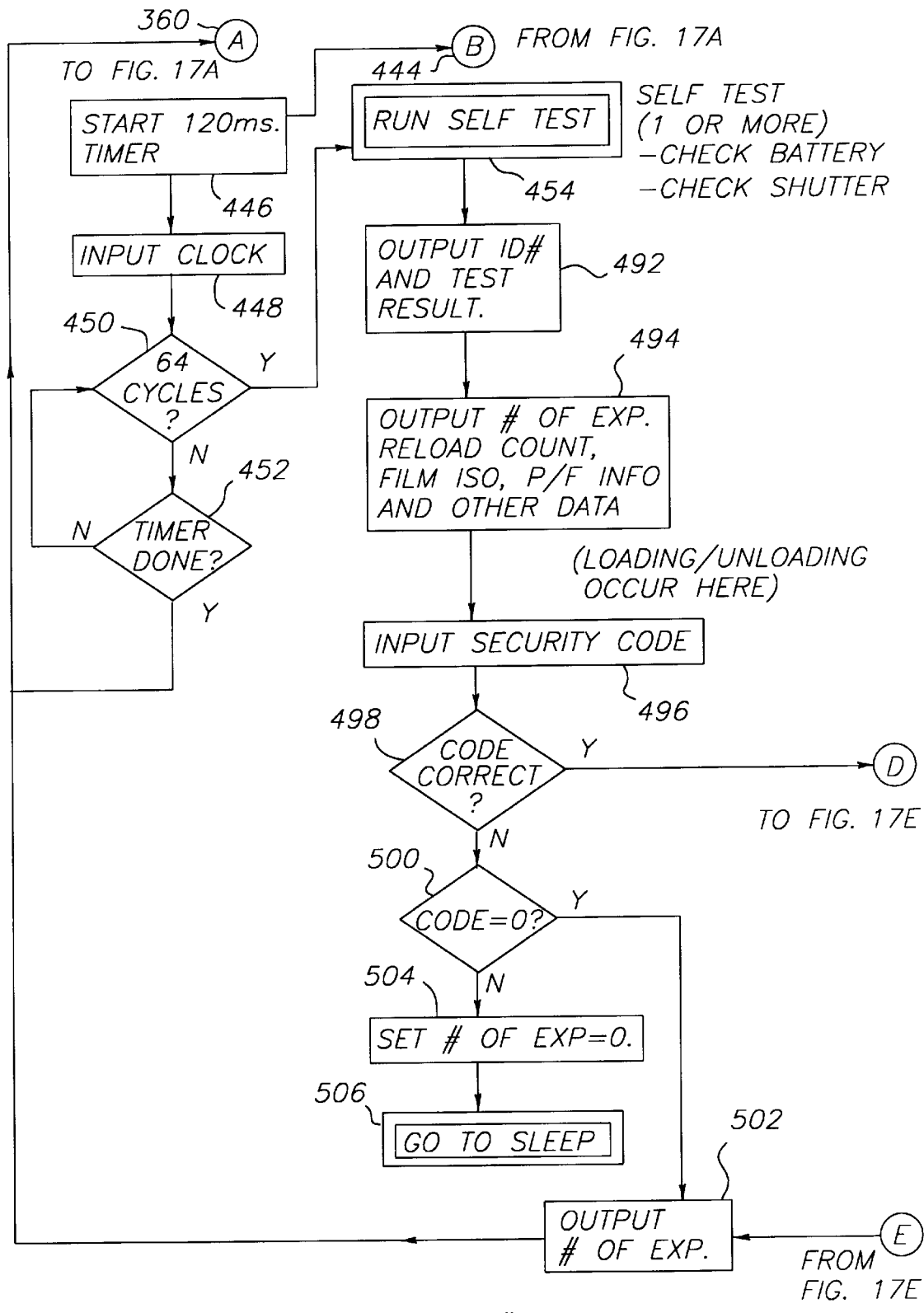
Figure 17C:
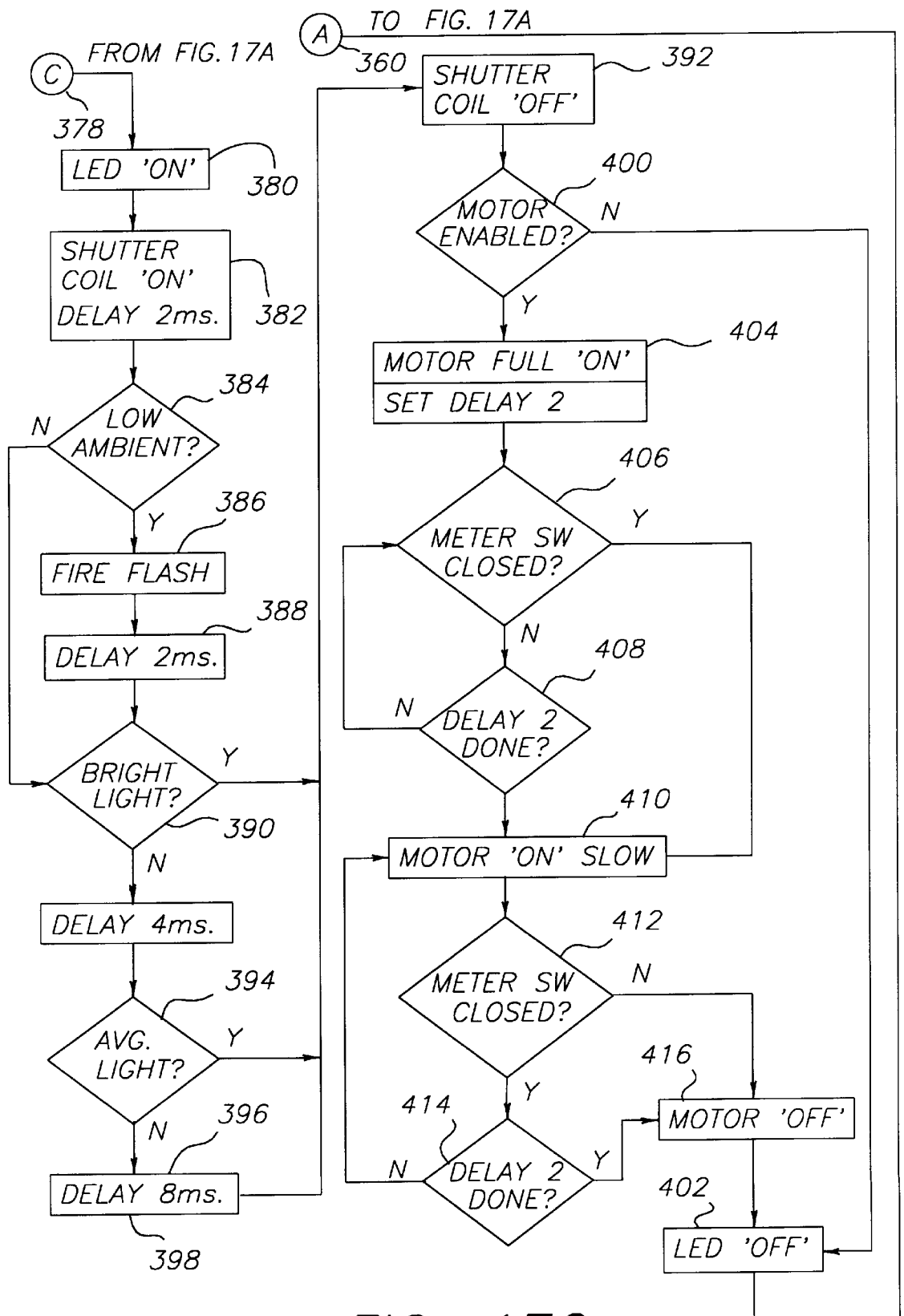

As shown in FIG. 17B, a mode check starts at step 446 when a 120 ms timer is started. At step 448, an input clock signal is provided from emitter 146 to sensor 348. At step 450, controller 344 counts up to 64 cycles of the input clock signal. If the timer of step 446 times out before 64 cycles are counted, step 452 returns the process to step 360 of FIG. 17A. If 64 cycles are counted within the period of step 446, the process continues with step 454 at which time a self test as shown in FIG. 17D is conducted, which will occur only when the camera is installed in apparatus 10.

Figure 17D:
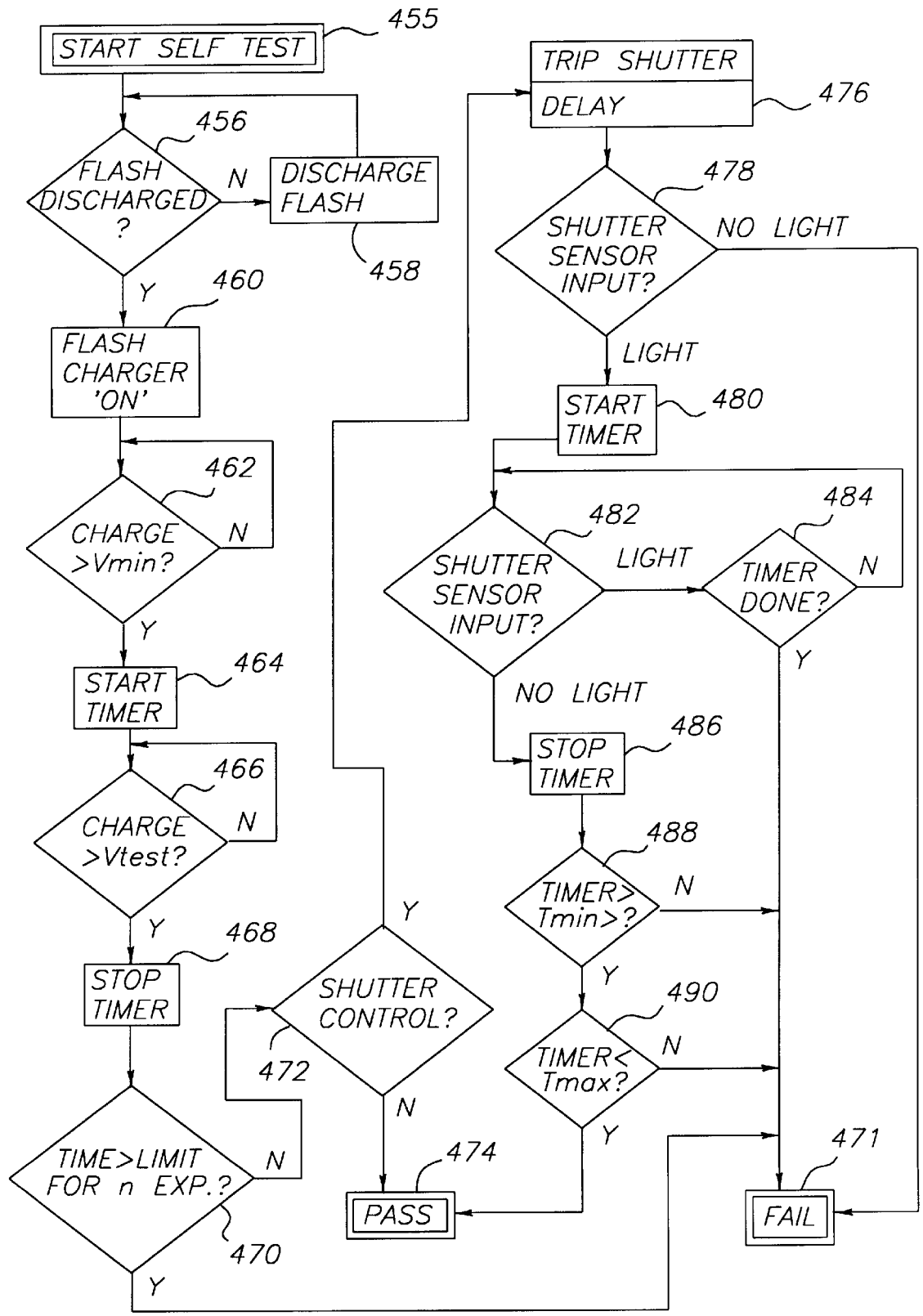
Figure 17E:
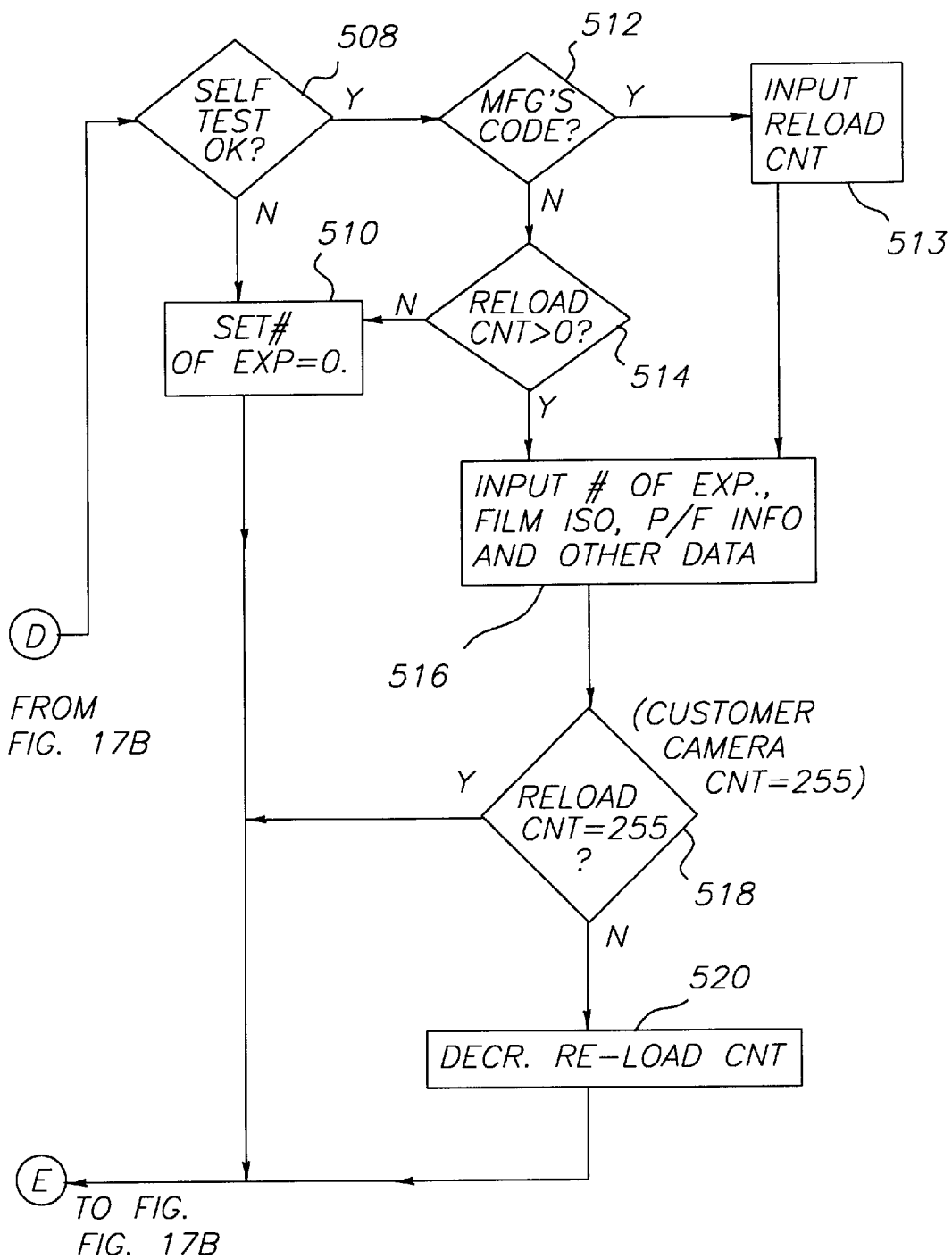

As shown in FIG. 17D, at step 456 controller 344 determines whether the flash circuit has been discharged. If not, the circuit is discharged at step 458 by electronically firing the flash. At step 460 controller 344 turns on the flash circuit and at step 462 measures whether the charge voltage has reached a preselected lower limit Vmin, which may be around 50 v, for example. When Vmin has been reached, controller 344 starts a timer at step 464. At step 466, controller 344 measures whether the charge voltage has reached a preselected test limit Vtest, which may be around 250 v, for example. At step 468, the controller stops the timer of step 464. At step 470, the controller compares the measured time to reach Vtest to an acceptable charge time of about 15 sec, for example, for a selected maximum number of exposures. If the measured time exceeds the limit, the camera fails the self test at step 471 and step 454 of FIG. 17B is completed. If the measured time does not exceed the limit, at step 472 the controller checks for the presence of electronically controlled shutter 342 in the camera. If there is no electronically controlled shutter, the camera passes the self test at step A4 and step 454 of FIG. 17B is completed.

If electronically controlled shutter 342 is present, at step 476 the controller trips the shutter and sets a delay long enough to allow the shutter to open. At step 478, sensor 343 within the camera checks for the presence of light to confirm that the shutter opened. If there is no light present, the camera fails the self test at step 471. If there is light present, at step 480 the controller starts a timer to measure how long the shutter remains open after the delay of step 476. If at step 482 light continues to be present, at step 484 the controller checks whether the time of step 480 has ended. If the time has ended before the shutter closes, the camera fails the self test at step 471. If at step 482 light is not present since the shutter has closed, at step 486 the controller stops the timer. At steps 488, 490, the controller checks whether the shutter time is within acceptable lower and upper limits. If the shutter closes too fast, the camera fails; if too slow, the camera fails. Otherwise, the camera passes at step 474 and the process returns to step 454 of FIG. 17B.

Once the self test has been completed, at step 492 in FIG. 17B controller 344 uses emitter 346 to output a serial identification number and the results of the self test to sensor 148 of apparatus 10. The identification number of the camera may indicate to apparatus 10 the type of camera, the features of the camera and a preferred type of film for the camera. At step 494, controller 344 again uses emitter 346 to output to sensor 148 the length of the filmstrip in the camera, the number of exposures completed, the reload count (permitted number of times the camera may be reloaded), the film type and speed, the dates and times of exposures, previously stored photofinishing instructions, and other data. Controller 344 also may use emitter 346 to signal apparatus 10 concerning other camera features such as flash guide number, f-stop, and zoom range. The camera is now loaded or unloaded, if the customer has so requested. At step 496, controller 212 of apparatus 10 uses emitter 146 to output a security code to sensor 348 to re-enable the camera. An identification number of apparatus 10 also may be stored in memory by controller 344, to permit later identification of the apparatus which served the camera, such as in a case when the customer takes the camera to a different apparatus for its next service. If payment adjustments become necessary at the different apparatus, having the security code of the previous apparatus should facilitate accounting among the customer and the owners of the two apparatus. At step 498, controller 344 checks whether the security code is valid for loading or unloading the camera, as the case may be; or is valid for a test only (that is, nothing else will be done now); or is not valid for any purpose. If the security code is not valid for loading or unloading, at step 500 controller 344 checks for a zero code, which would be indicative of a test mode only, such as when the customer just wants to know if the camera is in operating condition, as determined at step 454. If the code is zero, at step 502 controller 344 uses emitter 346 to output the number of exposures loaded and remaining and the process returns to step 360 of FIG. 17A. If the code is not zero and therefore not valid for any purpose, controller 344 sets the number of exposures to zero in the camera to disable the camera at step 504 and puts the camera to sleep at step 506. The camera is disabled in this instance on the assumption that the associated apparatus is not authorized for unloading or reloading or that an attempt is being made to discover the security code of the camera.

If at step 498 the code is correct for loading or unloading, at step 508 the controller checks whether the camera passed its self test and, if not, sets the number of exposures to zero at step 510, which disables controller 344 to prevent the camera's being reloaded. If the camera passed its self test, at step 512 controller 344 checks whether the code is a manufacturer's or authorized camera reloader's code. If not, at step 514 controller 344 checks whether the reload count is greater than zero, since a zero count would indicate that the camera should not be reloaded. If not, step 510 sets the number of exposures to zero. If the reload count is greater than zero, at step 516 controller 212 uses emitter 146 to input to the camera information about the reloaded film as selected by the customer, such as the length of the filmstrip, the type and speed of film, time and date request for each exposure, photofinishing instructions, and other data. At step 518, controller 344 checks whether the reload count is 255, for example, an arbitrary number chosen to indicate that the camera is owned by the customer. If so, the process goes to steps 502 and 360. If not, at step 520 controller 344 reduces the reload count of the camera by one; and the process goes to steps 502 and 360. If at step 512 the code is a manufacturer's or reloader's code, then at step 513 controller 212 inputs a new reload count and the process continues at step 516.

Referring again to FIGS. 3 and 10, the features for guiding film to and from a camera at station 142 can be understood. A filmstrip driven from cassette 168 is guided toward station 142 by a member such as a film infeed or loading guide track 522 mounted on support plate 42. Guide track 522 may be of the type disclosed in the '178 patent in which a filmstrip is guided at its edges by upper and lower guide slots and pivoted film guide ramps, not shown in the present specification, are provided at station 142 to direct the filmstrip into and from the camera. Those skilled in the art will appreciate, however, that a system of film drive rollers or belts or similar members could be used, rather than guide slots, without departing from the scope of the invention. For ease of illustration, only the lower guide slot is shown in FIGS. 3 and 10. As the film moves along guide track 522, it may pass through a film end punch assembly 524, shown only schematically, which may be included if the ends of the filmstrips, as prepared by cutter 180, should need reshaping to a desired geometry for a particular film format, such as that used for the recently introduced Advanced Photo System cameras. For example, the ends of the filmstrip could be shaped using a punch and die cutter of the type disclosed in commonly assigned European Patent Application No. 96/420124.8, published Oct. 30, 1996. Also, an optical film writer assembly 525, shown only schematically, may be provided for optically encoding the film with latent images of information, such as photofinishing instructions. Closer to station 142, a magnetic film writer assembly 526, shown only schematically, may be provided for encoding information onto modem films which include transparent magnetic layers, such as the recently introduced Advanced Photo System films. Thus, rather than storing information in a memory feature of the camera as described in the preceding paragraph, the same information could be optically or magnetically recorded onto the film.

Downstream of station 142, a member such as a film outfeed or unloading guide track 528 is mounted on support plate 42 to guide film from station 142, also in the manner of the '178 patent. A magnetic reader/writer 530 may be provided along guide track 528 for encoding information onto film removed from a camera. For cameras having only one closure for loading and unloading film, a dual purpose loading and unloading guide track could be used, as disclosed in the '178 patent. As shown schematically in FIG. 3, guide track 528 may guide each filmstrip directly into a conventional film processor 527 which in turn directs the processed filmstrip to a conventional photographic printer 529. Printer 529 may be directly connected to delivery mechanism 32 of FIG. 1; so that, a customer's prints can be returned directly to apparatus 10 for pickup.

Figure 18:
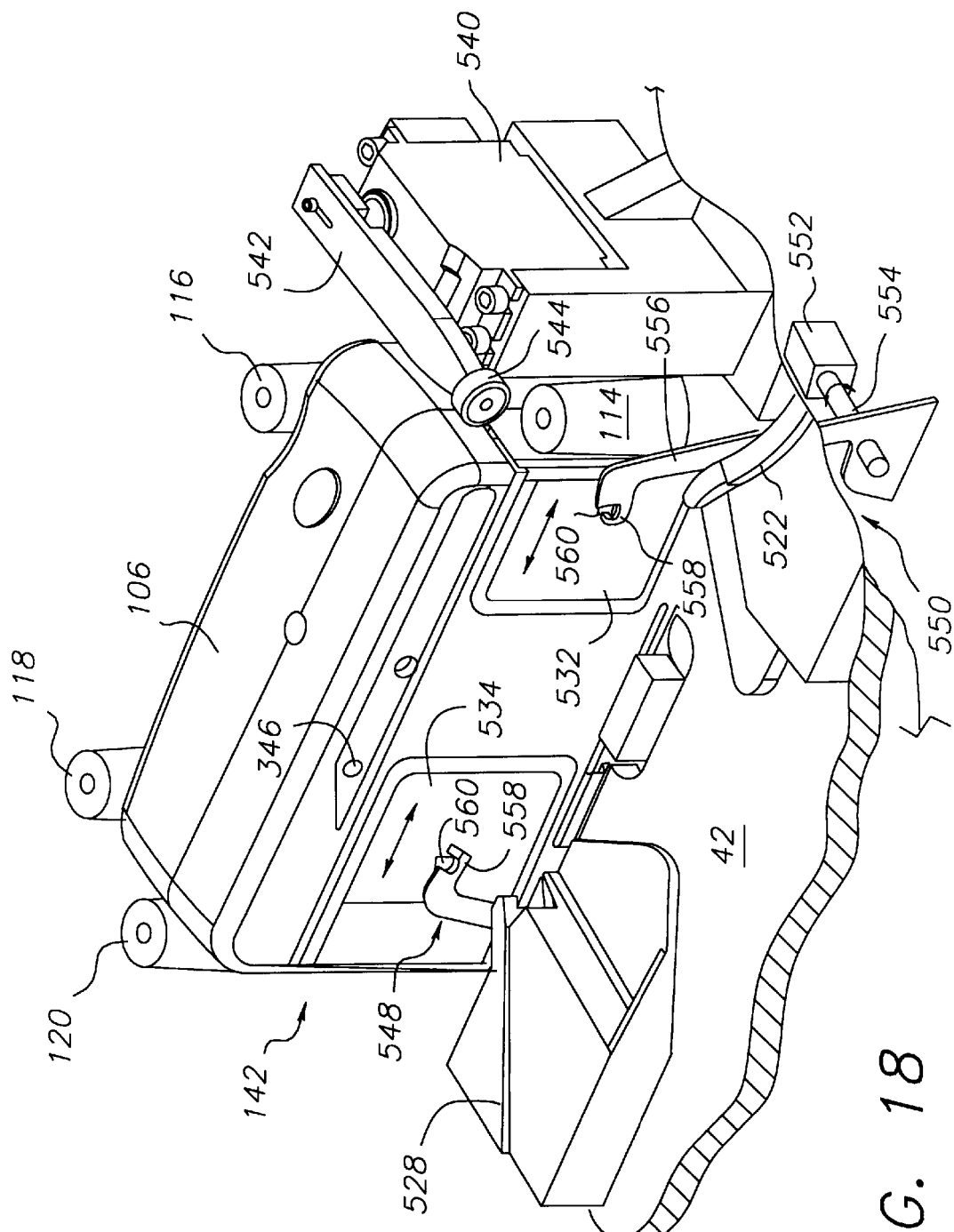
FIG. 18 shows a fragmentary perspective view of a back side of a camera supported on the nest at the station of FIG. 9 and fragmentarily indicates mechanisms for opening and closing the movable closures of the camera and for depressing a shutter button of the camera.

As shown in FIG. 10, camera 106 may include a movable, sliding closure 532 for loading film into the camera, of the type shown in the '178 patent, and an essentially mirror image movable, sliding closure 534 for unloading film from the camera. FIG. 18 shows a similar camera 106 in which the shutter mechanism is mechanically actuated, rather than electronically. A rotary actuator 540 is mounted on support plate 42 next to station 142. An arm 542 is mounted to an output shaft of actuator 540 and at its outer end carries a roller 544. When actuator 540 rotates clockwise as viewed in FIG. 18, roller 544 eventually engages and depresses a trigger or shutter button 546 on the camera to actuate the shutter mechanically. Also shown schematically in FIG. 18 are mechanisms 548, 560 for opening and closing closures 532, 534. These mechanisms may be of the type shown in the '178 patent. Each mechanism 548, 560 includes a rotary actuator 552 which may be mounted on the underside of support plate 42. An output shaft 554 supports an arm 556 having at its outer end a door engaging hook 558. Each of sliding closures 532, 534 includes a notch 560 which can be engaged by one of hooks 558 when the camera is located at station 142. Thus, rotation of arms 556 causes the closures to open to provide access to the interior of the camera for loading or unloading of a filmstrip.

FIGS. 19A to 19F show the overall logic or mode of operation of apparatus 10 in cooperation with a camera 110 and cassette 168. At step 570, the customer approaches the apparatus. If no keyboard input is made at step 572, the apparatus waits. When a keyboard input occurs, at steps 574, 576, 578 and 580, the controller checks respectively to determine whether the customer wants to unload a camera, load a camera, test a camera, or just pick up prints previously ordered. If prints are to be picked up, at step 582 controller 212 prompts the customer via display 26 to insert a credit or debit card or enter an order identification number previously provided. If at step 584 the identification number is correct, at step 586 controller 212 directs delivery mechanism 32 to move the customer's order to the drop slot and at step 588 signals the customer via display 26 that the print order is ready to be removed. When the controller detects at step 590 that the order has been removed, the process returns to step 570. If at step 584 an incorrect identification number was entered, controller 212 at step 592 will again ask for an identification number and again check the number at step 594. If the customer is unable to provide a correct identification number, at step 596 controller 212 will prompt the customer via display 26 to call a help number.

Figure 19B:
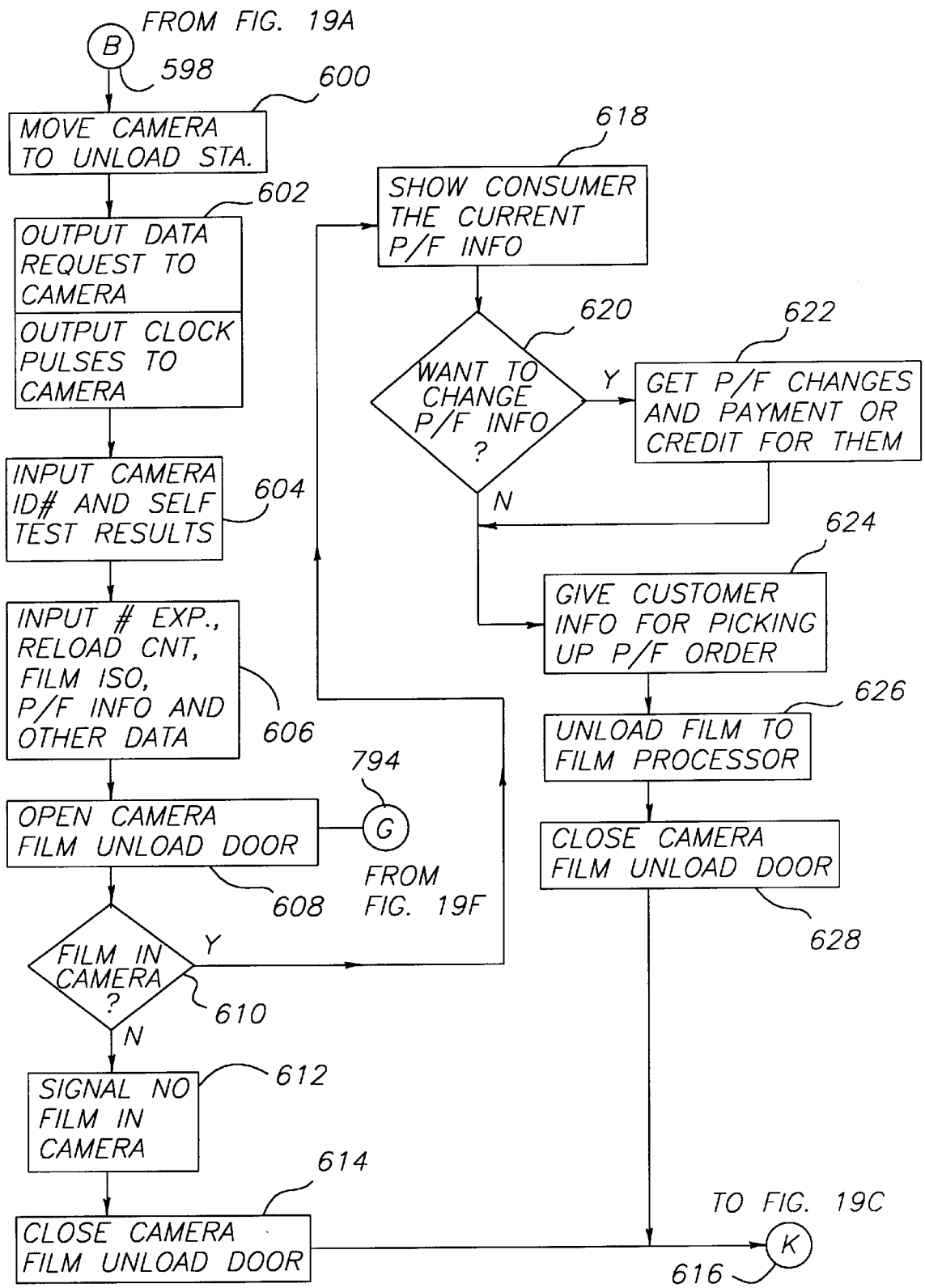

If at step 574 of FIG. 19A a camera is to be unloaded, the process continues at step 598 of FIG. 19B, when the customer places a camera loaded with exposed film in nest 110 at station 14. At station 14, emitter 108 and sensor 108 could be used to confirm that the camera is present and also to initiate the self test process; however, self testing preferably is done at station 142. At step 600, controller 212 operates motors 128 and 130 to move nest 110 and the camera to station 142, where the camera will be tested and unloaded. At step 602, controller 212 operates emitter 146 to request data from the camera, by outputting clock pulses which are detected by sensor 348 of the camera, as in steps 446–450. At step 604, controller 344 of the camera operates emitter 346 to input to apparatus 10 a camera identification number and self test results by outputting clock pulses which are detected by sensor 148 of apparatus 10, as in steps 454–492. At step 606, the camera inputs its number of exposures of the current filmstrip, total number of exposures made since the camera was first loaded, camera orientation at each current exposure, reload count, film type, photofinishing instructions, advance payment for photofinishing, and other data, as in steps 494–498, 502, and 508–520. 48. Camera closure 534 then is opened by operating actuator 552 at step 608. When closure 534 has opened, the previously mentioned pivoted film guide ramps of the '178 patent swing into the camera. As disclosed in the '178 patent, if film is present in the camera, movement of the guide ramps into the camera will be limited by the film; whereas, if no film is present, the guide ramps will move into the camera to a maximum extent. Thus, sensors, not shown, are provided to detect the position of the guide ramps. At step 610, controller 212 determines whether film is present. If the camera is empty, at step 612 display 26 is operated to signal the customer that there is no film in the camera. Closure 534 then is closed at step 614 and the process continues at step 616 of FIG. 19C.

If the camera is not empty at step 610, controller 212 operates display 26 at step 618 to show the customer the current photofinishing instructions. At step 620, the customer is asked if he or she wishes to change the default photofinishing instructions or apparatus 10 or the photofinishing instructions entered by the customer when the camera was previously loaded. If new or changes instructions are desired, at step 622 the instructions are received and payment or credit for the change is applied. If no changes desired, the process continues at step 624 where the customer receives information, such as a unique code number and a time for picking up the completed photographic prints. Then at step 626 controller 212 operates motor 336 or motor 354, depending on whether the camera of FIG. 11 or that of FIG. 16 is present. The filmstrip is driven from the camera into outfeed guide track 528 which guides the film to processor 527 and printer 529. Or, an intermediate cartridge may be provided for receiving the film, as disclosed in the '178 patent. As the filmstrip moves along track 528, magnetic write head 530 may be operated to record information onto the filmstrip, such as the photofinishing instructions, date and time of each exposure, and the like. When the filmstrip has exited the camera, closure 534 is closed at step 628. The process then continues with reloading of the camera at step 616 of FIG. 19C.

Figure 19C:
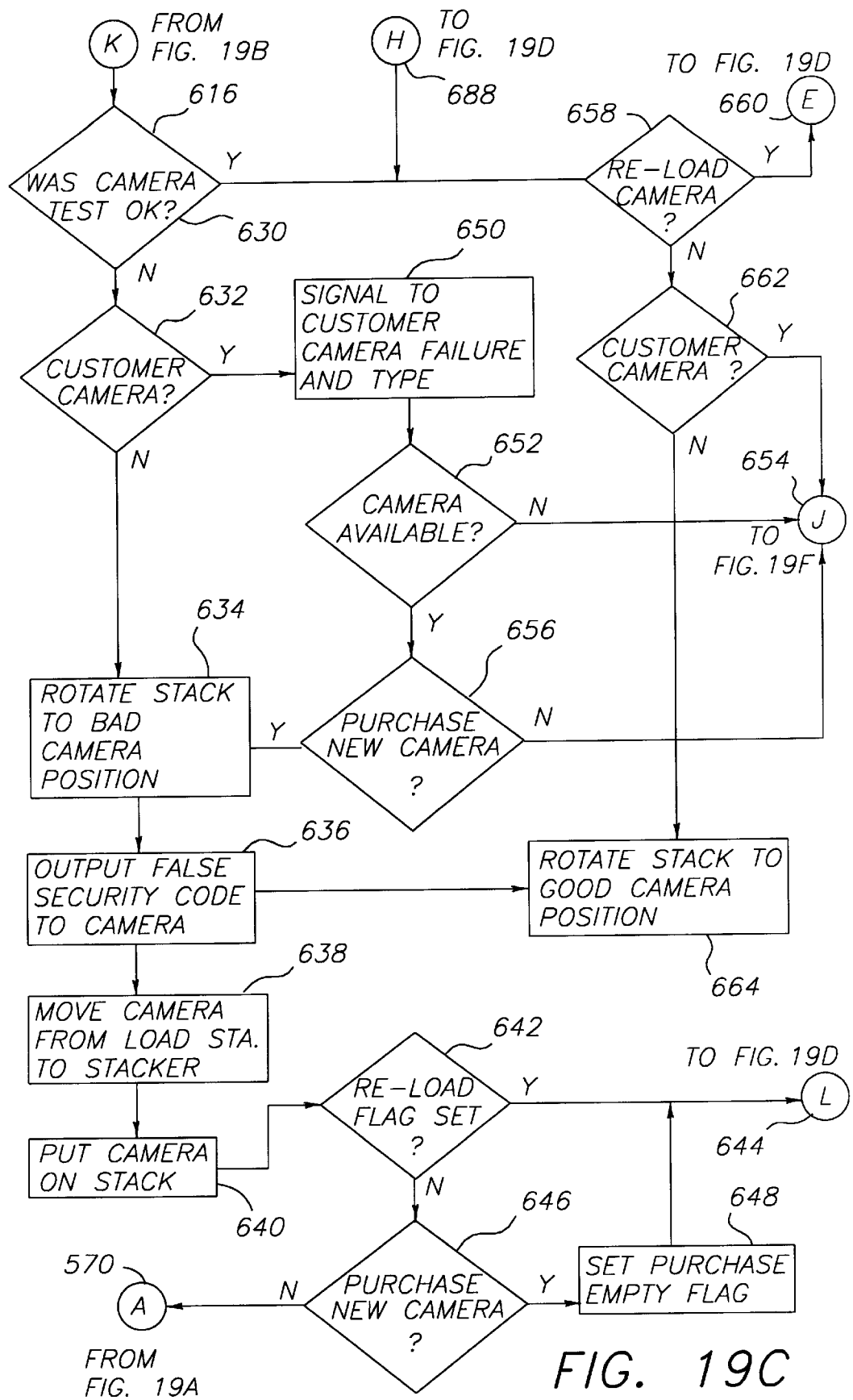

As shown in FIG. 19C, at step 630 controller 212 checks whether the camera passed its self test. If the camera failed, at step 632 the controller checks the information received from the camera to determine if the customer owns the camera, as indicated by a reload count of 255 as in step 518. If the camera is a rental camera, at step 634 controller 212 rotates source 60 to present at station 138 a rack 66 for receiving defective cameras. Controller 212 also operates emitter 146 at step 636 to provide the camera with a false security code to indicate that it is defective and prevent its being reloaded. Motors 128 and 130 are then operated at step 638 to move the defective camera to station 138, where source 60 is operated at step 640 to remove the defective camera from nest 110. At step 642, controller 212 checks again whether the customer wanted the camera to be reloaded. If a reload was desired, the process continues at step 644 of FIG. 19D where a new camera is selected. If a reload was not desired, the controller uses display 26 at step 646 to ask the customer if he or she desires to purchase a new, empty camera. If a new camera is desired, controller 212 sets a "Purchase Empty" flag at step 648 and the process continues at step 644. If a new camera is not desired, the process returns to step 570 of FIG. 19A.

If at step 632 the defective camera belonged to the customer, then at step 650 the controller uses display 26 to signal to the customer that the camera is defective and why.

For example, the customer's camera may only need new batteries, or its shutter may be defective. At step 652, controller 212 checks whether a camera is available in source 60 to replace the customer's defective camera. If no replacement camera is available, the process continues at step 654 of FIG. 19F where the camera will be returned to the customer. If a replacement camera is available, at step 656 the controller uses display 26 to ask the customer if he or she desires to purchase a new, empty camera. If not, the process continues at step 654. If the customer wants a new camera, the process continues at step 634.

If at step 630 the camera has passed its self test, controller 212 checks again at step 658 whether the customer wants the camera to be reloaded. If so, the process continues at step 660 of FIG. 19D where fresh film will be loaded into the camera. If the customer does not want the camera to be loaded, at step 662 the controller checks whether the customer owns the camera. If so, the process continues at step 654. If the customer does not own the camera, controller 212 at step 664 rotates source 60 to present at station 138 a rack 66 for receiving good cameras and the process continues at step 636.

Figure 19D:
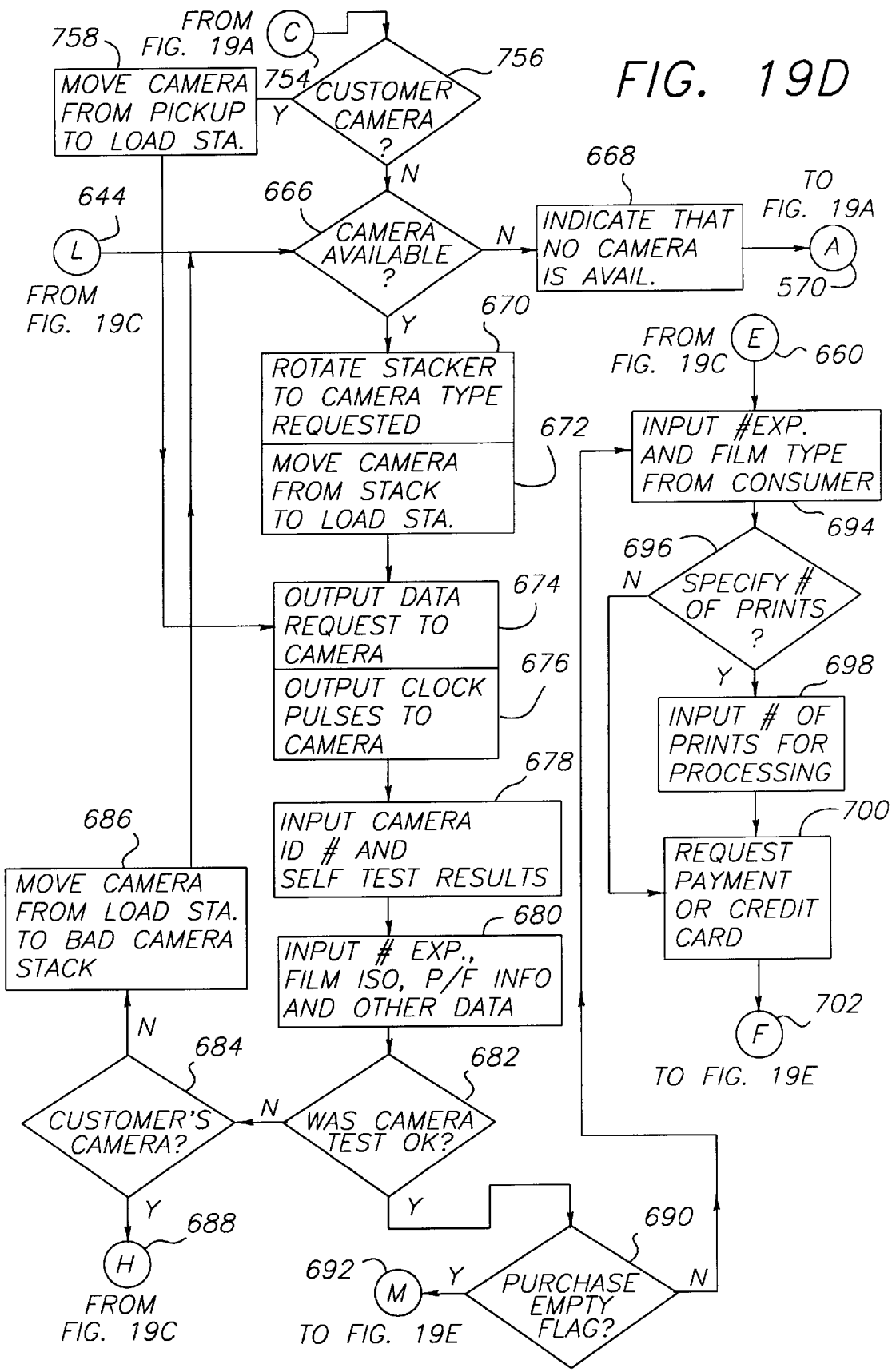

If at steps 642, 644 the customer wanted a new camera to be loaded, at step 666 of FIG. 19D controller 212 checks whether source 60 has the desired type of camera. If not, display 26 is used at step 668 to signal the customer that no camera is available and the process returns to step 570. If a camera is available, at step 670 controller 212 causes source 60 to rotate to present at station 138 a rack 66 carrying the desired type of camera. At step 672, source 60 is operated to deliver a camera to nest 110 at station 138, after which motors 128, 130 are operated to move the camera to station 142 for loading. At step 674, controller 212 operates emitter 146 to request data from the camera, by outputting clock pulses at step 664, which are detected by sensor 348 of the camera, as in steps 446–450. At step 678, controller 344 of the camera operates emitter 346 to input to apparatus 10 a camera identification number and self test results by outputting clock pulses which are detected by sensor 148 of apparatus 10, as in steps 454–492. At step 680, the camera inputs its number of exposures, reload count, film type, photofinishing instructions and other data, as in steps 494–498, 502, and 508–520. At step 682, the controller checks whether the camera passed its self test. If not, at step 684 the controller checks whether the customer owns the defective camera. If not, the defective camera is moved at step 686 from station 142 back to station 138 where the defective camera is removed, as in steps 634–644. If the customer owns the defective camera, the process continues at step 688 of FIG. 19C, where the camera is replaced or returned, as in steps 650–656.

If at step 682 the camera was found to have passed its self test, then at step 690 the controller checks to determine whether a "Purchase Empty" flag was set at step 648. If so, the process continues at step 692 of FIG. 19E, where the camera is delivered to the customer. If the customer wants the camera to be loaded, at step 694 controller 212 uses display 26 to request from the customer information regarding the desired number of exposures and film type to be loaded into the camera, which the customer then enters using the key pad or function keys, or both. At step 696, the customer is prompted via display 26 to enter a number of prints to be made of each exposure; and at step 698 the customer enters the desired number. If the customer does not wish to select a number of prints or has entered a desired number, at step 700 the controller uses display 26 to advise the customer of the charges for the camera, film and photofinishing. The process then continues at step 702 of FIG. 19E.

Figure 19E:
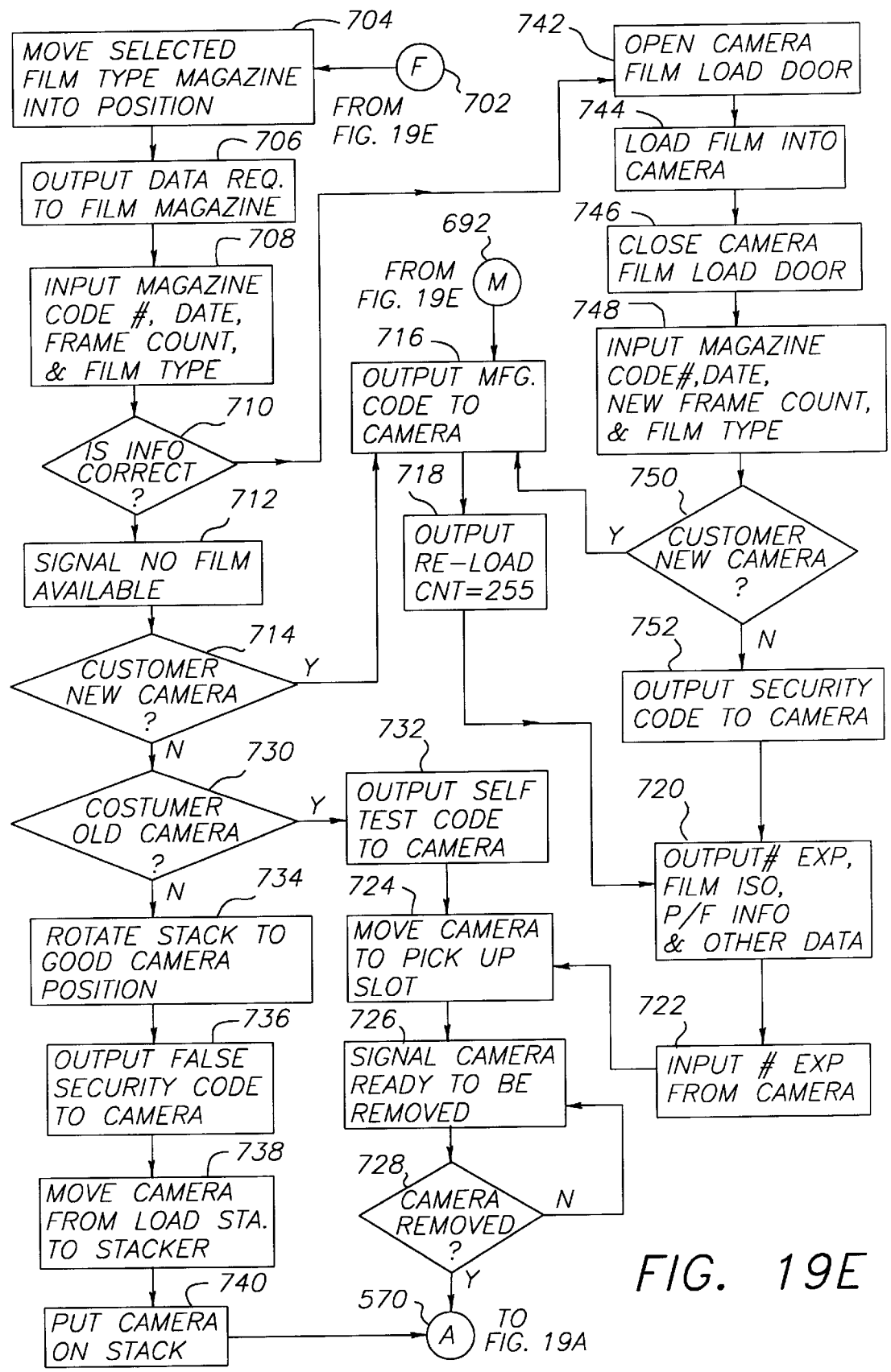

Now that the customer's choices have been entered, at step 704 of FIG. 19E controller 212 operates source 150 to move a cassette 168 having the desired film type into position to dispense film into infeed guide track 522. At step 706, controller 212 operates emitter 210, as at steps 280, 300, 304, to send pulses of light to sensor 194 in cassette 168, seeking information about the cassette and its contents. At step 708, monitor circuit 196 operates emitter 192, as at step 302, to send pulses of light to sensor 208 indicating the code for cassette 168, the date, the remaining frame count and the film type within the cassette. If a condition of the cassette or the film has reached or exceeded a predetermined limit, the remaining frame count will be zero, as at step 288. At step 710, controller 212 checks whether the proper film type has been presented and whether there are enough frames remaining to fill the customer's order. If there is no suitable film available, at step 712 controller 212 uses display 26 to signal as much to the customer.

At step 714, controller 212 checks whether the customer decided at step 690 to purchase a new, loaded camera. If so, at step 716, controller 212 operates emitter 146 to output to sensor 348 a manufacturer's code for the camera; and at step 718, a reload count of 255 to indicate that the camera is owned by the customer. At step 720, controller 212 outputs a number of exposures, film type, photofinishing instructions and other data to be stored in memory in the camera; and at step 722, the camera outputs the number of exposures just received from controller 212, simply to confirm loading. At step 724, controller 212 operates motors 128, 130 to move nest 110 to station 14, where the customer can remove the empty camera. At step 726, the controller uses display 26 to signal to the customer that the camera is ready to be removed. When at step 728 the controller determines that the new, empty camera has been removed, the process returns to step 570.

If at step 714 controller 212 determined that the customer had not decided to purchase a new, loaded camera, then at step 730 controller 212 checks whether the camera is the customer's previously purchased, old camera. If so, at step 732 the controller uses emitter 146 to signal sensor 348 with a self test code for the camera. The process then continues with step 724 to return the camera to the customer. If at step 730 the camera is determined not to be the customer's old camera, then at step 734 controller 212 rotates source 60 to present at station 138 a rack 66 for receiving good cameras. Controller 212 also operates emitter 146 at step 736 to provide the camera with a false security code. Motors 128 and 130 are then operated at step 738 to move the camera to station 138, where source 60 is operated at step 740 to remove the camera from nest 110. The process then returns to step 570.

If at step 710 the correct film is available, sliding closure 634 is opened at step 742, a discrete filmstrip is driven from cassette 168 into the camera at step 744, and the sliding closure is closed at step 746. Cutter 180 is operated to cut the discrete filmstrip when the proper length has been dispensed from cassette 138. At step 748, controller 212 operates emitter 146 to send pulses to sensor 348 indicating the code number of cassette 168, the date of loading, the new frame count and the type of film, for storage in memory in the camera. At step 750, the controller checks whether the camera is the customer's new camera; and, if so, the process continues at step 716. If the camera is not the customer's, at step 752 the controller outputs a security code to the camera; and the process continues at step 720. If at steps 658, 660 of FIG. 19C the customer desires the camera to be reloaded, the process continues at step 694 as previously discussed.

If at step 576 of FIG. 19A an empty camera is to be loaded, the process continues at step 754 of FIG. 19D when the customer places an empty camera in nest 110 at station 14. At step 756, controller 212 uses emitter 108 to send pulses to sensor 348 asking whether the camera belongs to the customer. Sensor 109 receives the response from the camera. If the camera is not the customer's, the process continues at step 666. If the camera is the customer's, at step 758 the controller operates motors 128, 130 to move nest 110 and the camera to station 142, after which the process continues at step 674.

Figure 19F:
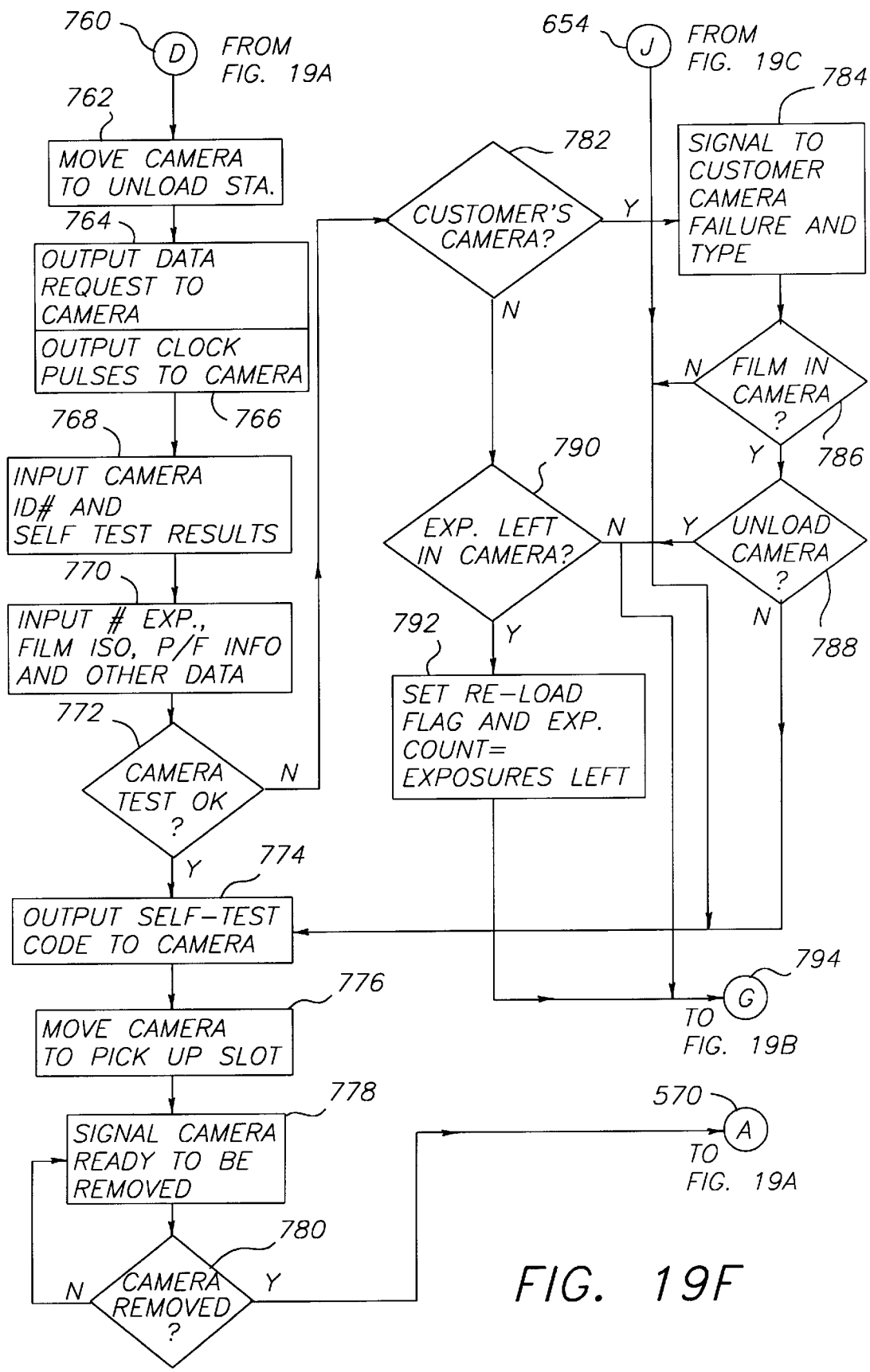

If at step 578 of FIG. 19A a camera only is to be tested, the process continues at step 760 of FIG. 19F. At step 762, controller 212 operates motors 128, 130 to move the camera to station 142. At step 764, controller 212 operates emitter 146 to request data from the camera, by outputting clock pulses at step 766, which are detected by sensor 348 of the camera, as in steps 446–450. At step 768, controller 344 of the camera operates emitter 346 to input via sensor 148 of apparatus 10 a camera identification number and self test results. Clock pulses are outputted which are detected by sensor 148, as in steps 454–492. At step 770, the camera inputs its number of exposures, film type, photofinishing instructions and other data, as in steps 494–498, 502, and 508–520. At step 772, controller 212 checks whether the camera passed its self test. If the camera passed, at step 774 the controller outputs a self test code to the camera and at step 776 moves the camera back to station 14. At step 778, the controller uses display 26 to signal the customer that the camera is ready for pickup; and at step 780, after the camera is removed, the process returns to step 570. If the camera did not pass its self test, at step 782 the controller checks whether the customer owns the defective camera. If so, at step 784 controller 212 uses display 26 to signal the customer that the camera is defective and why. At step 786, the controller checks whether there is film in the defective camera. If not, the process continues at step 774 and the defective camera is returned to the customer. If there is film in the defective camera, at step 788 the controller checks whether the customer wishes to unload the camera. If not, the process continues at step 774 and the defective camera is returned to the customer. If the customer at step 788 wishes to unload the defective camera, the process continues at step 794 of FIG. 19B, where the camera is unloaded and replaced. If at step 782 the defective camera is not the customer's, the process continues at step 790 where the controller signals the camera to determine whether there are any exposures remaining to be made. If there are none, the process continues at step 794; and the camera is unloaded and replaced. If there are exposures still to be made, at step 792 controller 212 sets a "Reload" flag and sets the exposure count to the number remaining to be made. The process then continues at step 794.

FIGS. 20 and 21 show schematically another embodiment of the invention, a compact apparatus 800 for loading and unloading discrete filmstrips. Since apparatus 800 includes numerous common elements with apparatus 10, these have been numbered alike but will not be discussed further. Those skilled in the art will appreciate that apparatus 800 may include a single cassette 168, as shown, or a source 150 with multiple cassettes as previously described. A light-tight external enclosure 802 surrounds a single station 804 at which cameras can be received, unloaded, reloaded, and returned or retained. Station 804 comprises a guide channel 806 which is configured to permit insertion of camera 106 in only one orientation and to closely embrace the camera as it is inserted by a customer. Thus, guide channel 806 comprises side slots 808, 810 which guide the opposite ends of the camera during movement into the guide channel, to ensure that the camera is properly positioned transversely in the channel for service. To limit movement of a camera into the guide channel and to accurately locate the camera for unloading or loading, a stop element 812 is provided which can be moved along the guide channel by a conventional conveyor cable or cord 814 to which stop element 812 is attached. A motor 813 is provided to drive the conveyor cable. A latching device 815 is mounted on stop element 812 to secure the camera to the stop element. Device 815 may be similar to the combination of motor 132 and latch 139, 141 which engage recess 132 in the camera as shown in FIG. 5B or may be an electrically actuated magnet. A light-tight sliding door 816 is provided to close the guide channel during loading or unloading of film.

In use of apparatus 800, the customer simply slides the camera into the guide channel until stop element 812 is encountered and then raises door 816 to provide a light-tight environment. Clamping device 815 is actuated to secure the camera to the stop element. The camera is then self tested, unloaded and reloaded in the manner previously described. Filmstrips unloaded from cameras may be directed to a processor and printer, not shown in FIGS. 20 and 21, in the manner previously described. If the camera is defective or the customer does not want it to be reloaded, a diverter door 818 is rotated downward by an actuator, not shown, from the position shown in FIG. 21. Motor 813 is operated to move stop element 812 and pull the camera from station 804 to an angled discharge chute 824 which leads to a suitable collection system, not shown. The latching device is then released to allow the camera to move down chute 824. Diverter door 818 is then raised back to its illustrated position. If the camera is ready to be returned to the customer, the controller prompts the customer to open door 816 and remove the camera.

If the customer does not have a camera or if a replacement camera is to be provided, a source 826 of cameras is provided within enclosure 802. The cameras may be pre-tested and ready for loading, or may be tested at station 804 prior to loading. Source 826 includes a conveyor 828 similar to that of source 60, to lower the cameras one by one into position to be moved into guide channel 806. Latching device 815 is operated to secure the camera to the stop element. Finally, motor 813 is operated to push the camera from source 826 along the guide channel to station 804. The camera is then loaded by the apparatus and the latching device is released to permit the camera to be removed by the customer. A plurality of parallel sources 826 may be provided for different types of cameras, in which case conveyor cable 814 would be lengthened appropriately. The embodiment of FIGS. 20 and 21 provides advantages of simpler construction and operation due to its having only one station 804 at which all camera servicing operations can be performed.

The invention has been described in detail with particular reference to certain preferred embodiments thereof, but it will be understood that variations and modifications can be effected within the spirit and scope of the invention.

PARTS LIST

10 . . . apparatus for loading and unloading discrete filmstrips

12 . . . external, light-tight enclosure

14 . . . station to receive camera from or deliver camera to customer

16 ... light-tight closure for 14
18 ... customer interface
20 ... access slot for credit card reader
22 ... key pad
24 ... dispense slot for receipt
26 ... display
28a, b, c, d ... function keys
30a, b, c, d ... function keys
32 ... delivery mechanism for completed prints
34 ... access door for print pick-up
40 ... frame
42 ... equipment or mechanism support plate
44, 46, 48, 50 ... vertical supports
52 ... storage cabinet
54 ... controller housing
60 ... source for plurality of cameras
62 ... lower, disk-like base member
64 ... upper, disk-like member
66 ... racks for holding pluralities of cameras
68, 70 ... fixed radially inner guide rods
72, 74 ... fixed, radially outer guide rods
76, 78 ... conveyor side rails
80 ... opening through 62
81 ... bracket for motor
82 ... motor
84 ... conveyor belt
86, 88 ... spaced support members for cameras
90, 92 ... enlarged outer ends of 84, 86
94, 96 ... removable inner guide rods
98, 100 ... removable outer guide rods
102 ... motor
104 ... drive wheel or pinion to engage 62
106 ... photographic cameras
108 ... emitter at station 14
109 ... sensor at station 14
110 ... nest to support camera
112 ... base member
114, 116, 118, 120 ... tapered guide members
124 ... angled reflector
126 ... pivoted arm
128 ... motor for arm 126
130 ... motor for base member 112
132 ... motor for latch to camera
133 ... recess in under side of 106
134, 136 ... arcuate slots for 86, 88
135 ... connector module
137 ... contacts of 135
138 ... station at which camera can be received by nest 110 from source 60
139 ... latch shaft
140 ... spring loaded plunger
141 ... latch finger
142 ... station at which cameras can be unloaded or loaded
143 ... latch recess
144 ... first sensor at 142 for flash
145, 147 ... contacts on 139
146 ... first emitter at 142 for communication
148 ... second sensor at 142 for communication
149 ... contacts on 151
150 ... source of unexposed photographic film
151 ... connector module
152 ... support drum
154 ... axle
156, 158 ... bearing blocks
160 ... opening through 42
162 ... radially and axially extended mounting flange
166 ... cassette support platform
168 ... cassette for unexposed film
170 ... retainer wall
172 ... retainer surface on 162
174 ... removable stop
176 ... drive motor for 168
178 ... notch in 162 for 176
180 ... film cutter
182 ... actuator for 180
184 ... extension of 166 for 182
186 ... drive ring for 152
192 ... emitter to send signal from 168
194 ... sensor to receive signal to 168
195 ... apertures in 170 for light signals
196 ... monitor circuit for 168
198 ... liquid crystal display
200 ... frame/exposures remaining
202 ... film type
204 ... expiration date
206 ... battery
208 ... sensor for signal from 168
210 ... emitter to send signal to 168
212 ... micro-controller of 10
218 ... sensor for light leak
220 ... sensor for humidity
222 ... sensor for temperature
224 ... cover or lid of 168
226 ... hollow housing of 168
228 ... post on 224
230 ... socket
232 ... post on 226
234 ... interlock switch
236 ... movable actuator contact of 234
238 ... roll of film
240 ... central core of 238
242 ... support shaft for 240
244 ... exit slit from 226
246 ... driven sprocket roller
248 ... idler roller
250 ... micro-processor with rom
252 ... electronically programmable rom
254 ... clock
256 ... voltage regulator
258 ... reset switch
260 ... programming port
270–314 ... process steps to operate and reload 168
320 ... external housing of 106
322 ... movable closure to load/unload filmstrips
324 ... movable closure to load filmstrips
326 ... movable closure to unload filmstrips
328 ... unexposed film chamber
330 ... exposed film chamber
332 ... discrete film strip
334 ... film metering sprocket
336 ... film drive motor
338 ... metering switch
340 ... taking lens
342 ... shutter mechanism
344 ... controller for 106
346 ... emitter to send signal from 106
348 ... sensor to receive signals to 106
350 ... flash unit
352 ... battery
354 ... motor
356 ... key shaft
358 ... key slot
359 ... modem
360–520 ... process steps to operate camera 522 ... film infeed guide track from 150 to 142
524 ... film end punch assembly
525 ... optical film writer
526 ... magnetic film writer
527 ... photographic film processor
528 ... film outfeed guide track
529 ... photographic printer
530 ... magnetic reader/writer
532 ... movable, sliding closure for loading
534 ... movable, sliding closure for unloading
540 ... rotary actuator
542 ... arm
544 ... roller
546 ... trigger/shutter button
548, 550 ... open/close mechanism
552 ... rotary actuator
554 ... shaft
556 ... arm
558 ... door engaging hook
560 ... notch in 532, 534 for 558
570–794 ... process steps to operate overall apparatus
800 ... compact apparatus for loading and unloading discrete filmstrips
802 ... external enclosure
804 ... station to receive, unload & load cameras
806 ... guide channel
808, 810 ... side slots of 806
812 ... stop
813 ... motor for 814
814 ... conveyor cable or cord
815 ... latching device
816 ... sliding door
818 ... diverter
824 ... discharge chute
826 ... source of cameras
828 ... conveyor of 826

What is claimed is:

1. Apparatus for loading film into and vending photographic cameras, the cameras including an external housing having at least one movable closure which, in an open position of the closure, enables a discrete photographic filmstrip to be loaded from an exterior of the camera into the camera, said camera includes a memory feature for storing and communicating information about an appropriate photographic film for the camera, said apparatus comprising:

a frame;

a nest to support a camera to be loaded and vended;

a first source supported by said frame for a plurality of cameras to be loaded and vended;

a first station supported by said frame at which a camera can be received from said first source;

a second station supported by said frame at which a camera can be loaded with a discrete filmstrip;

a first mechanism supported by said frame and connected to said nest to position said nest at said first station to receive a camera from said first source and at said second station to receive a filmstrip;

a second source supported by said frame for at least one type of unexposed photographic film;

a film loading member supported by said frame and extended between said second source and said second station for guiding film from said second source to a camera;

a second mechanism supported by said frame for driving film from said second source, via said film loading member, and to a camera; and means supported by said frame for communicating with a camera to receive from the memory feature a first signal corresponding to a type of film appropriate for the camera; and means responsive to said first signal for controlling said second source and second mechanism to deliver the appropriate film to the camera.

2. Apparatus according to claim 1, further comprising:

a third station supported by said frame at which a camera can be vended to a customer; and wherein said first mechanism also positions said nest at said third station.

3. Apparatus according to claim 2, wherein the at least one movable closure of the camera alternatively enables a discrete filmstrip to be unloaded from the camera to the exterior; a camera also can be unloaded at said second station; said third station also can receive a camera from a customer; and said first mechanism can position said nest at said third station to receive a camera and at said second station to load or unload a filmstrip, further comprising:

a film unloading member supported by said frame and extended away from said second station for guiding a filmstrip from a camera.

4. Apparatus according to claim 1, wherein said means for communicating with a camera is positioned at said second station.

5. Apparatus according to claim 1, further comprising:

a third station supported by said frame at which a camera can be received from a customer;

wherein said first mechanism also positions said nest at said third station; and wherein said means for communicating with a camera is positioned at said third station.

6. Apparatus according to claim 1, further comprising:

a mechanism for opening and closing the movable closure on the camera.

7. Apparatus according to claim 1, wherein said second source provides a plurality of types of unexposed photographic film, further comprising:

a customer interface supported by said frame for inputting a first signal corresponding to a desired type of film for the camera; and means supported by said frame and responsive to said first signal for controlling said second source and said second mechanism to deliver the desired film to the camera.

8. Apparatus according to claim 1, further comprising a light-tight enclosure supported by said frame for said second station, said second source, and said film loading member.

9. Apparatus according to claim 8, further comprising:

a third station supported by said frame at which a camera can be vended to a customer, wherein said first mechanism also positions said nest at said third station; and a light-tight closure for said third station.

10. Apparatus according to claim 1, further comprising:

a customer interface supported by said frame for inputting a first signal corresponding to a desired number of exposures for a filmstrip to be loaded into a camera; and means supported by said frame and responsive to said first signal for controlling said second source and said second mechanism to deliver to a camera a filmstrip having the desired number of exposures.

11. Apparatus according to claim 1, wherein said first source provides a plurality of camera types, further comprising:

a customer interface supported by said frame for inputting a first signal corresponding to a desired type of camera; and means supported by said frame and responsive to said first signal for controlling said first source and said first mechanism to deliver said desired type of camera to said nest.

12. Apparatus according to claim 11, wherein said second source provides a plurality of types of unexposed photographic film, further comprising:

a customer interface supported by said frame for inputting a second signal corresponding to a desired type of film for the camera; and means supported by said frame and responsive to said second signal for controlling said second source and said second mechanism to deliver said desired type of film to a camera.

13. Apparatus according to claim 11, wherein said means for communicating is positioned at said second station.

14. Apparatus according to claim 11, further comprising:

a third station supported by said frame at which a camera can be received from a customer;

wherein said first mechanism also positions said nest at said third station; and wherein said means for communicating is positioned at said third station.

15. Apparatus according to claim 1, wherein said memory feature for storing and communicating includes information about a film type and a number of frames loaded in the camera, further comprising:

said means supported by the frame for communicating with a camera is supported by said nest to receive from the memory feature a first signal about a film type and second signal about a number of frames loaded in the camera;

means for processing a filmstrip removed from a camera;

means for printing photographs from a processed filmstrip received from said means for processing; and means supported by said frame for communicating said first and second signals to said means for processing, or said means for printing, or both.

16. Apparatus according to claim 1, wherein the at least one movable closure of the camera alternatively enables a discrete filmstrip to be unloaded from the camera to the exterior; a camera can be unloaded at said second station; said third station also can receive a camera from a customer; and said first mechanism can position said nest at said third station to receive a camera and at said second station to load or unload a filmstrip, further comprising:

a film unloading member supported by said frame and extended away from said second station for guiding a filmstrip away from a camera;

means for processing a filmstrip received from said film unloading member; and means for printing photographs from a processed filmstrip received from said means for processing.

17. Apparatus according to claim 16, wherein the camera includes a memory feature for storing and communicating information, further comprising:

a customer interface supported by said frame for inputting to the memory feature of a camera at least one signal about a desired manner of photofinishing;

means supported by said frame for communicating with said customer interface and a camera to transmit to or receive from the camera information about a desired manner of photofinishing; and means supported by said frame for communicating said information about a desired manner of photofinishing to said means for processing, or said means for printing, or both.

18. Apparatus according to claim 17, wherein said customer interface inputs said information about a desired manner of photofinishing at a time when unexposed film is loaded into a camera.

19. Apparatus according to claim 18, wherein said means for communicating receives said information about a desired manner of photofinishing at a time when film is unloaded from a camera.

20. Apparatus according to claim 16, further comprising:

means supported by said frame and located between said nest and said source, for shaping an end of a filmstrip to a desired geometry when a camera is loaded with unexposed film.

21. Apparatus according to claim 20, wherein:

said means for shaping simultaneously forms leader and trailer end geometries of successive filmstrips.

22. Apparatus according to claim 1, further comprising:

means supported by said frame for providing latent images on at least one edge of a filmstrip, during loading into a camera.

23. Apparatus according to claim 1, wherein the camera includes a memory feature for storing and communicating information about a desired manner of photofinishing, further comprising:

a customer interface supported by said frame for inputting at least one signal about a desired manner of photofinishing;

means for communicating with the camera to transmit to or receive from the camera information about the desired manner of photofinishing.

24. Apparatus accorded to claim 1, wherein said second source provides a plurality of types of unexposed photographic film, further comprising:

means responsive to said first signal for displaying to a customer a selection of appropriate film types available from said second source; and a customer interface for signaling to said second source and said second mechanism to deliver one of said selection of film types to the camera.

25. Apparatus according to claim 1, wherein said first source comprising:

at least one rack sized to hold a plurality of cameras; and at least one third mechanism for moving cameras along said at least one rack to dispense a camera to said nest at said first station.

26. Apparatus according to claim 25, wherein there are a plurality of said racks, each having such a third mechanism, further comprising:

a fourth mechanism for moving each rack to said first station.

27. Apparatus according to claim 26, further comprising:

a base member rotatably supported by said frame, said racks being supported vertically on said base member; and said fourth mechanism comprises a drive for rotating said base member to bring each rack to said first station.

28. Apparatus according to claim 26, wherein each of said third mechanisms comprises:

a conveyor for moving cameras along said rack, said conveyor having a plurality of spaced members for separating and supporting the cameras on said conveyor; and a motor for moving said conveyor.

29. Apparatus according to claim 28, wherein said nest comprises a base member for supporting a camera, said base member comprising at least one passage through which said spaced members for supporting a camera can move as a camera is dispensed to or removed from said nest.

30. Apparatus according to claim 28, wherein said racks are vertically oriented and said spaced members extend outwardly from said conveyor, each spaced member having an enlarged outer end for engaging the cameras with said conveyor.

31. Apparatus according to claim 26, further comprising:
a base member rotatably supported by said frame;
a top member spaced above said base member;
each of said racks being defined by a plurality of spaced rods extended vertically between said base member and said top member; and
said fourth mechanism comprises a drive for rotating said base member to bring each rack to said first station.

32. Apparatus according to claim 31, wherein at least one of said spaced rods is removable from each of said racks to facilitate loading cameras into said racks.

33. Apparatus according to claim 27, wherein said base member comprises a through opening beneath each of said racks, each camera passing through said opening at said first station.

34. Apparatus according to claim 1, wherein said nest comprises:
a base member;
a plurality of guide members extended upwardly from a periphery of said base member, thereby defining among said guide members a space for receiving a camera.

35. Apparatus according to claim 34, further comprising a reflector supported by said base member for reflecting flash illumination from a camera on said nest toward a sensor supported by said frame at said second station.

36. Apparatus according to claim 34, wherein said first mechanism comprises:
an arm pivotably mounted to said frame, said base member being supported by said arm; and
a motor for moving said arm between said first and second stations.

37. Apparatus according to claim 36, wherein said base member is rotatably supported by said arm, further comprising a motor for rotating said base member to orient said nest for said first and second stations.

38. Apparatus according to claim 34, further comprising means for latching a camera to said base member.

39. Apparatus according to claim 38, wherein the camera comprises a first electrical connector module for communicating with said apparatus; said apparatus comprises a second electrical connector module for communicating with said camera; and said means for latching comprises a rotatable latch shaft having contacts for connecting said first and second electrical connector modules when a camera is latched to said base member.

40. Apparatus according to claim 1, wherein said second source comprises:
a plurality of cassettes, each cassette comprising a hollow housing having an exit slit, a roll of unexposed photographic film mounted for rotation within said housing, and means for engaging a leading end of said film to drive the film through said exit slit;
a support for said plurality of cassettes, said support being movably supported by said frame; and
means for moving said support to present each cassette to drive said film to said film loading member.

41. Apparatus according to claim 40, wherein said cassettes contain different types of photographic films.

42. Apparatus according to claim 40, wherein said support comprises:

a drum rotatably supported by said frame;
a plurality of cassette platforms extended radially from said drum, there being one platform for each of said cassettes; and
said second mechanism comprises a plurality of drive motors, one mounted on each of said platforms, for engaging and operating said means for driving of each said cassette to drive film via said loading member to a camera.

43. Apparatus according to claim 42, wherein each of said cassettes comprises a cutter for said film; further comprising a plurality of cutter actuators, one mounted on each of said platforms, for engaging and operating said cutters.

44. Apparatus according to claim 40, wherein each of said cassettes comprises:
means for sending first signals corresponding to a type of film within said cassette, or a length of film remaining within said cassette, or both;
further comprising:
means supported by said frame for receiving said first signals; and
a customer interface supported by said frame for inputting second signals corresponding to a desired type of film for a camera or a desired number of exposures for a filmstrip to be loaded into a camera, or both; and
a controller responsive to said first and second signals to control said second source to deliver to a camera a desired type of film, or a desired number of exposures, or both.

45. Apparatus according to claim 40, wherein the camera comprises a memory feature for storing and communicating information about at least one type of film appropriate for the camera; and each of said cassettes comprises:
means for sending first signals corresponding to a type of film within said cassette, or a length of film remaining within said cassette, or both;
further comprising:
means supported by said frame for communicating with a camera to receive a second signal corresponding to a type of film appropriate for the camera;
means supported by said frame for receiving said first signals;
a customer interface supported by said frame for inputting a third signal corresponding to a desired number of exposures for a filmstrip to be loaded into a camera, or both; and
a controller responsive to said first, second and third signals to control said second source to deliver to a camera a desired type of film, or a desired number of exposures, or both.

46. Apparatus according to claim 1, wherein the camera includes a feature for self-testing one or more functions of the camera and for producing a signal indicative of results of the self-testing, further comprising a sensor supported by said frame for receiving said signal and a controller for controlling loading of the camera in response to said signal.

47. Apparatus according to claim 1, wherein the camera includes a feature for tracking a number of permitted times for the camera to be reloaded and for producing a signal indicative of said number, further comprising a sensor supported by said frame for receiving said signal and a controller for controlling loading of the camera in response to said signal.

48. An apparatus for loading a photographic camera including an external housing having at least one movable closure which, in an open position of the closure, enables a discrete filmstrip to be loaded from an exterior of the camera into the camera, the camera further including a memory feature for storing and communicating information, said apparatus comprising:

a frame;

a source supported by said frame for at least one type of unexposed photographic film;

a nest for receiving a camera to be loaded;

a film loading member supported by said frame and extended between said source and said nest for guiding film from said source to a camera;

a controller for said apparatus;

a mechanism supported by said frame and responsive to said controller for driving film from said source, via said film loading member, into a camera;

first means associated with said source for sending to said controller at least one first signal corresponding to at least one characteristic of said unexposed photographic film;

second means responsive to said controller for sending to the memory feature of the camera at least one second signal corresponding to a characteristic of a discrete filmstrip to be loaded into the camera from said source;

third means for receiving from the memory feature and passing to said controller at least one third signal corresponding to at least one condition of the camera; and a customer interface supported by said frame for inputting to said controller at least one fourth signal corresponding to a desired characteristic of a filmstrip to be loaded into a camera.

49. Apparatus according to claim 48, wherein said first means sends a signal corresponding to at least one of film type, number of frames remaining in said source, and date said source was loaded with film.

50. Apparatus according to claim 48, further comprising film unloading means for guiding film from the camera.

51. Apparatus according to claim 48, wherein said second means sends said second signal corresponding to at least one of film type to be loaded, number of exposures to be loaded, and need for flash feature on camera.

52. Apparatus according to claim 48, wherein said third means passes said third signal corresponding to at least one of film type and number of exposures.

53. Apparatus according to claim 48, wherein said customer interface inputs said fourth signal corresponding to at least one of film type, number of exposures, camera type, and photofinishing instructions.

54. Apparatus according to claim 48, wherein said second means is associated with said nest.

55. Apparatus according to claim 48, wherein said third means is associated with said nest.

56. A method for loading or unloading a photographic camera which includes an external housing having at least one movable closure which, in an open position of the closure, enables a discrete filmstrip to be loaded from an exterior of the camera into the guide track within the camera or a discrete film strip to be unloaded from the camera to the exterior, comprising steps of:

providing a source of at least one type of unexposed photographic film;

providing a camera to be loaded or unloaded;

opening said closure of said camera;

communicating from said source a first signal corresponding to a condition of said film in said source;

communicating to said camera a second signal corresponding to a characteristic of a discrete filmstrip to be loaded into the camera;

communicating from said camera a third signal corresponding to at least one of film type suitable for said camera, numbers of exposures that have been made, number of times said camera has been reloaded, or photofinishing instructions;

communicating a fourth signal corresponding to a number of frames of film to be loaded into said camera;

loading film into said camera or unloading film from said camera; and controlling said loading or said unloading in response to said first, second, third, and/or fourth signals.

57. A method according to claim 56, wherein the camera includes a feature for self-testing one or more functions of the camera and for producing a fifth signal indicative of results of the self-testing, further comprising a step of controlling loading of the camera in response to said fifth signal.

58. A method according to claim 56, wherein the camera includes a feature for tracking a number of permitted times for the camera to be reloaded and for producing a fifth signal indicative of said number, further comprising a step of controlling loading of the camera in response to said fifth signal.

59. Apparatus for loading film into and vending photographic cameras, the cameras including an external housing having at least one movable closure which, in an open position of the closure, enables a discrete filmstrip to be loaded from an exterior of the camera into the camera, said camera includes a memory feature for storing and communicating information about the appropriate photographic film for the camera; said apparatus comprising:

a frame;

a station to support a camera to be loaded, or vended, or both;

a first source supported by said frame for a plurality of cameras to be loaded, or vended, or both;

a guide for moving a camera from said first source to said station;

a second source supported by said frame for at least one type of unexposed photographic film;

a film loading member supported by said frame and extended between said second source and said station for guiding film from said second source to a camera;

a mechanism supported by said frame for driving film from said second source, via said film loading member, and to a camera;

means supported by said frame for communicating with a camera to receive from the memory feature a first signal corresponding to a type of film appropriate for the camera; and means responsive to said first signal for controlling said second source and said mechanism to deliver the appropriate film to the camera.

60. Apparatus according to claim 59, wherein the at least one movable closure of the camera alternatively enables a discrete filmstrip to be unloaded from the camera to the exterior, further comprising a film unloading member supported by said frame and extended away from said station for guiding a filmstrip from a camera.

61. Apparatus according to claim 59, further comprising:

a mechanism for opening and closing the movable closure on the camera.

62. Apparatus according to claim 59, wherein said second source provides a plurality of types of unexposed photographic film, further comprising:

a customer interface supported by said frame for inputting a first signal corresponding to a desired type of film for the camera; and means supported by said frame and responsive to said first signal for controlling said second source and said second mechanism to deliver the desired film to the camera.

63. Apparatus according to claim 59, further comprising:
a customer interface supported by said frame for inputting a first signal corresponding to a desired number of exposures for a filmstrip to be loaded into a camera; and
means supported by said frame and responsive to said first signal for controlling said second source and said mechanism to deliver to a camera a filmstrip having the desired number of exposures.

64. Apparatus according to claim 59, wherein the camera includes a memory feature for storing and communicating information about a film type and a number of frames loaded in the camera, further comprising:
means supported by the frame for communicating with a camera at said station to receive from the memory feature a first signal about a film type and second signal about a number of frames loaded in the camera;
means for processing a filmstrip removed from a camera;
means for printing photographs from a processed filmstrip received from said means for processing; and
means supported by said frame for communicating said first and second signals to said means for processing, or said means for printing, or both.

65. Apparatus according to claim 59, wherein the at least one movable closure of the camera alternatively enables a discrete filmstrip to be unloaded from the camera to the exterior, further comprising:
a film unloading member supported by said frame and extended away from said station for guiding a filmstrip away from a camera;
means for processing a filmstrip received from said film unloading member; and
means for printing photographs from a processed filmstrip received from said means for processing.

66. Apparatus according to claim 65, wherein the camera includes a memory feature for storing and communicating information, further comprising:
a customer interface supported by said frame for inputting to the memory feature of a camera at least one signal about a desired manner of photofinishing;
means supported by said frame for communicating with said customer interface and a camera to transmit to or receive from the camera information about a desired manner of photofinishing; and
means supported by said frame for communicating said information about a desired manner of photofinishing to said means for processing, or said means for printing, or both.

67. Apparatus according to claim 59, wherein the camera includes a memory feature for storing and communicating information about a desired manner of photofinishing, further comprising:
a customer interface supported by said frame for inputting at least one signal about a desired manner of photofinishing;
means for communicating with the camera to transmit to or receive from the camera information about the desired manner of photofinishing.

68. Apparatus according to claim 59, wherein the camera includes a memory feature for storing and communicating information about appropriate photographic film for the camera; and said second source provides a plurality of types of unexposed photographic film, further comprising:
means supported by said frame for communicating with a camera to receive from the memory feature a first signal corresponding to a type of film appropriate for the camera;
means responsive to said first signal for displaying to a customer a selection of appropriate film types available from said second source; and
a customer interface for signaling to said second source and said second mechanism to deliver one of said selection of film types to the camera.

69. Apparatus according to claim 59, wherein said second source comprises:
a plurality of cassettes, each cassette comprising a hollow housing having an exit slit, a roll of unexposed photographic film mounted for rotation within said housing, and means for engaging a leading end of said film to drive the film through said exit slit;
a support for said plurality of cassettes, said support being movably supported by said frame; and
means for moving said support to present each cassette to drive said film to said film loading member.

70. Apparatus according to claim 69, wherein said cassettes contain different types of photographic films.

71. Apparatus according to claim 69, wherein said support comprises:
a drum rotatably supported by said frame;
a plurality of cassette platforms extended radially from said drum, there being one platform for each of said cassettes; and
said mechanism comprises a plurality of drive motors, one mounted on each of said platforms, for engaging and operating said means for driving of each said cassette to drive film via said loading member to a camera.

72. Apparatus according to claim 71, wherein each of said cassettes comprises a cutter for said film; further comprising a plurality of cutter actuators, one mounted on each of said platforms, for engaging and operating said cutters.

73. Apparatus according to claim 69, wherein each of said cassettes comprises:
means for sending first signals corresponding to a type of film within said cassette, or a length of film remaining within said cassette, or both;
further comprising:
means supported by said frame for receiving said first signals; and
a customer interface supported by said frame for inputting second signals corresponding to a desired type of film for a camera or a desired number of exposures for a filmstrip to be loaded into a camera, or both; and
a controller responsive to said first and second signals to control said second source to deliver to a camera a desired type of film, or a desired number of exposures, or both.

74. Apparatus according to claim 69, wherein the camera comprises a memory feature for storing and communicating information about at least one type of film appropriate for the camera; and each of said cassettes comprises:
means for sending first signals corresponding to a type of film within said cassette, or a length of film remaining within said cassette, or both;
further comprising:
means supported by said frame for communicating with a camera to receive a second signal corresponding to a type of film appropriate for the camera;
means supported by said frame for receiving said first signals;
a customer interface supported by said frame for inputting a third signal corresponding to a desired number of exposures for a filmstrip to be loaded into a camera, or both; and a controller responsive to said first, second and third signals to control said second source to deliver to a camera a desired type of film, or a desired number of exposures, or both.

75. Apparatus according to claim 59, wherein the camera includes a feature for self-testing one or more functions of the camera and for producing a signal indicative of results of the self-testing, further comprising a sensor supported by said frame for receiving said signal and a controller for controlling loading of the camera in response to said signal.

76. Apparatus according to claim 59, wherein the camera includes a feature for tracking a number of permitted times for the camera to be reloaded and for producing a signal indicative of said number, further comprising a sensor supported by said frame for receiving said signal and a controller for controlling loading of the camera in response to said signal.

77. Apparatus for loading film into and vending photographic cameras, the cameras including an external housing having at least one movable closure which, in an open position of the closure, enables a discrete filmstrip to be loaded from an exterior of the camera into the camera, the camera further includes a memory feature for storing and communicating information about a film type and a number of frames loaded in the camera, said apparatus comprising:

a frame;

a nest to support a camera to be loaded and vended;

a first source supported by said frame for a plurality of cameras to be loaded and vended;

a first station supported by said frame at which a camera can be received from said first source;

a second station supported by said frame at which a camera can be loaded with a discrete filmstrip;

a first mechanism supported by said frame and connected to said nest to position said nest at said first station to receive a camera from said first source and at said second station to receive a filmstrip;

a second source supported by said frame for at least one type of unexposed photographic film;

a film loading member supported by said frame and extended between said second source and said second station for guiding film from said second source to a camera;

a second mechanism supported by said frame for driving film from said second source, via said film loading member, and to a camera;

means supported by the frame for communicating with a camera supported by said nest to receive from the memory feature a first signal about a film type and second signal about a number of frames loaded in the camera;

means for processing a filmstrip removed from a camera;

means for printing photographs from a processed filmstrip received from said means for processing; and means supported by said frame for communicating said first and second signals to said means for processing, or said means for printing, or both.

78. Apparatus for loading film into and vending photographic cameras, the cameras including an external housing having at least one movable closure which, in an open position of the closure, enables a discrete filmstrip to be loaded from an exterior of the camera into the camera, said camera includes a memory feature for storing and communicating information about a desired manner of photofinishing, said apparatus comprising:

a frame;

a nest to support a camera to be loaded and vended;

a first source supported by said frame for a plurality of cameras to be loaded and vended;

a first station supported by said frame at which a camera can be received from said first source;

a second station supported by said frame at which a camera can be loaded with a discrete filmstrip;

a first mechanism supported by said frame and connected to said nest to position said nest at said first station to receive a camera from said first source and at said second station to receive a filmstrip;

a second source supported by said frame for at least one type of unexposed photographic film;

a film loading member supported by said frame and extended between said second source and said second station for guiding film from said second source to a camera;

a second mechanism supported by said frame for driving film from said second source, via said film loading member, and to a camera;

a customer interface supported by said frame for inputting at least one signal about a desired manner of photofinishing; and means for communicating with the camera to transmit to or receive from the camera information about the desired manner of photofinishing.

79. Apparatus for loading film into and vending photographic cameras, the cameras including an external housing having at least one movable closure in an open position of the closure, enables a discrete filmstrip to be loaded from an exterior of the camera into the camera, the camera further includes a memory feature for storing and communicating information about a film type and a number of frames loaded in the camera, said apparatus comprising:

a frame;

a station to support a camera to be loaded, or vended, or both;

a first source supported by said frame for a plurality of cameras to be loaded, or vended, or both;

a guide for moving a camera from said first source to said station;

a second source supported by said frame for at least one type of unexposed photographic film;

a film loading member supported by said frame and extended between said second source and said station for guiding film from said second source to a camera;

a mechanism supported by said frame for driving film from said second source, via said film loading member, and to a camera;

means supported by the frame for communicating with a camera at said station to receive from the memory feature a first signal about a film type and second signal about a number of frames loaded in the camera;

means for processing a filmstrip removed from a camera;

means for printing photographs from a processed filmstrip received from said means for processing; and means supported by said frame for communicating said first and second signals to said means for processing, or said means for printing, or both.

80. Apparatus for loading film into and vending photographic cameras, the cameras including an external housing having at least one movable closure which, in an open position of the closure, enables a discrete filmstrip to be loaded from an exterior of the camera into the camera, wherein the at least one movable closure of the camera alternatively enables a discrete filmstrip to be unloaded from the camera to the exterior, said apparatus comprising:

a frame;

a station to support a camera to be loaded, or vended, or both;

first source supported by said frame for a plurality of cameras to be loaded, or vended, or both;

a guide for moving a camera from said first source to said station;

a second source supported by said frame for at least one type of unexposed photographic film;

a film loading member supported by said frame and extended between said second source and said station for guiding film from said second source to a camera;

a mechanism supported by said frame for driving film from said second source, via said film loading member, and to a camera;

a film unloading member supported by said frame and extended away from said station for guiding a filmstrip away from a camera;

means for processing a filmstrip received from said film unloading member; and means for printing photographs from a processed filmstrip received from said means for processing.

* * * * *